(12) United States Patent
Takano

(10) Patent No.: US 9,152,462 B2
(45) Date of Patent: Oct. 6, 2015

(54) PARALLEL PROCESSING DEVICE, PARALLEL PROCESSING METHOD, OPTIMIZATION DEVICE, OPTIMIZATION METHOD AND COMPUTER PROGRAM

(75) Inventor: Fumiyo Takano, Tokyo (JP)

(73) Assignee: NEC CORPORATION, Tokyo (JP)

(*) Notice: Subject to any disclaimer, the term of this patent is extended or adjusted under 35 U.S.C. 154(b) by 137 days.

(21) Appl. No.: 14/118,283

(22) PCT Filed: May 18, 2012

(86) PCT No.: PCT/JP2012/063405
§ 371 (c)(1),
(2), (4) Date: Nov. 18, 2013

(87) PCT Pub. No.: WO2012/157786
PCT Pub. Date: Nov. 22, 2012

(65) Prior Publication Data
US 2014/0089935 A1    Mar. 27, 2014

(30) Foreign Application Priority Data
May 19, 2011 (JP) .................. 2011-112331

(51) Int. Cl.
G06F 9/46 (2006.01)
G06F 9/50 (2006.01)

(52) U.S. Cl.
CPC ............. *G06F 9/50* (2013.01); *G06F 9/5027* (2013.01); *G06F 2209/5017* (2013.01)

(58) Field of Classification Search
CPC .................. G06F 9/50; G06F 9/5027
See application file for complete search history.

(56) References Cited

U.S. PATENT DOCUMENTS

| | | | |
|---|---|---|---|
| 5,724,512 A * | 3/1998 | Winterbottom | 709/226 |
| 6,272,486 B1 * | 8/2001 | Garth et al. | 1/1 |
| 7,526,634 B1 * | 4/2009 | Duluk et al. | 712/216 |
| 7,788,468 B1 | 8/2010 | Nickolls et al. | |

(Continued)

FOREIGN PATENT DOCUMENTS

| | | |
|---|---|---|
| JP | 2007-200288 A | 8/2007 |
| JP | 2008-276740 A | 11/2008 |

OTHER PUBLICATIONS

Kazuhisa Ishizaka et al., "Cache Optimization for Coarse Grain Task Parallel Processing using Inter-Array Padding", [Online], 2004, pp. 1-13, [Retrieved from Internet on May 30, 2015], <https://parasol.tamu.edu/lcpc03/informal-proceedings/Papers/13.pdf>.*

(Continued)

*Primary Examiner* — Thuy Dao
*Assistant Examiner* — Ziaul A Chowdhury
(74) *Attorney, Agent, or Firm* — Sughrue Mion, PLLC

(57) ABSTRACT

A parallel processing device improves operation rates of cores in a computation device having a plurality of processor cores in a process in which there are a large number of tasks that can be processed in parallel even though parallelism within the tasks is low. The device acquires tasks into which an application has been divided, sets the number of simultaneously executed tasks in each thread array, sets the number of threads in each thread array, sets the total number of arrays, generates the threads and thread arrays, secures a resource for the number of simultaneously executed tasks in each of the thread arrays, determines the task to be processed by each thread and causes the task thus determined to be executed by each of the threads.

18 Claims, 38 Drawing Sheets

(56) References Cited

U.S. PATENT DOCUMENTS

| | | | |
|---|---|---|---|
| 7,925,860 B1* | 4/2011 | Juffa et al. | 712/10 |
| 8,336,056 B1* | 12/2012 | Gadir | 718/104 |
| 2006/0212868 A1* | 9/2006 | Takayama et al. | 718/100 |
| 2009/0064168 A1* | 3/2009 | Arimilli et al. | 718/105 |
| 2009/0307704 A1 | 12/2009 | Munshi et al. | |
| 2012/0110586 A1* | 5/2012 | Coon et al. | 718/102 |
| 2013/0090907 A1* | 4/2013 | Maliassov | 703/10 |
| 2014/0013153 A1* | 1/2014 | Chittigala et al. | 714/4.11 |

OTHER PUBLICATIONS

Alberto Cano et al., "Speeding up the evaluation phase of GP classi_cation algorithms on GPUs", [Online], 2012, pp. 1-16, [Retrieved from Internet on May 30, 20158], <http://sci2s.ugr.es/keel/pdf/keel/articulo/articulo.pdf>.*

Pedro V. Artigas et al., "High Performance Numerical Computing in Java: Language and Compiler Issues", [Online], 2000, pp. 1-17, [Retrieved from Internet on May 30, 2015], <http://download-v2.springer.com/static/pdf/652/chp%253A10.1007%252F3-540-44905-1_1.pdf>.*

Tomas Kalibera, "Replicating Real-Time Garbage Collector", [Online], 2010, pp. 1-21, [Retrieved from Internet on May 30, 2015] , <http://www.cs.kent.ac.uk/pubs/2011/3159/content.pdf>.*

Guo, Ping et al., "Auto-Tuning CUDA Parameters for Sparse Matrix-Vector Multiplication on GPUs", Computational and Information Sciences (ICCIS), 2010 International Conference on, pp. 1154-1157, Dec. 2010.

M. Guevara et al., "Enabling Task Parallelism in the CUDA Scheduler", Workshop on Programming Models for Emerging Architectures, Sep. 2009.

Nvidia Corporation, "NVIDIA CUDA C Programming Guide", version 3.2, Sep. 8, 2010.

International Search Report for PCT Application No. PCT/JP2012/063405, mailed on Aug. 7, 2012.

Erik Lindholm et al., "NVIDIA Tesla: A Unified Graphics and Computing Architecture", IEEE Micro, IEEE Service Center, CA, US, vol. 27, No. 2, Mar. 1, 2008, pp. 39-55, XP011214835, ISSN: 0272-1732, p. 49-p. 50.

Shane Ryoo et al., "Optimization principles and application performance evaluation of a multithreaded GPU using CUDA", Proceedings of the 13th ACM SIGPLAN Symposium on Principles and Practice of Parallel Programming, PPOPP '08, Jan. 1, 2008, pp. 73-82, XP055042951, New York, USA, DOI:10.1145/1345206.1345220, ISBN: 978-1-59-593795-7.

John A Stratton et al., "MCUDA: An Efficient Implementation of CUDA Kernels for Multi-core CPUs", Jul. 31, 2008, Languages and Compilers for Parallel Computing, Springer Berlin Heidelberg, p. 16-30, XP019112676, ISBN: 978-3-540-89739-2.

The Extended European Search Report for EP Application No. 12785393.5 dated on Nov 4, 2014.

* cited by examiner

Fig.10

```
//PROCESS OF GPU SIDE
__device__ kernel2 ( ){
    __shared__ resource_t resource[cta_size.z];  //RESOURCE ARRAY WITH A SIZE EQUAL TO
                                                  CONCURRENTLY EXECUTED TASK NUMBER
                                                  IS SECURED task_idx = cta_id.x * cta_size.z + thread_id.z;  //TASK NUMBER IS DETERMINED TAKING
                                                      CONCURRENTLY EXECUTED TASK NUMBER
                                                      INTO CONSIDERATION task ( task_idx, &resource[thread_id.z]);  //task() NO INFLUENCE ON TASK PROCESS CONTENT
}

//PROCESS OF CPU SIDE
main ( ) {
    numThreads = {x, y, z};  //Z DIRECTION IS ADDED INTO THREAD ARRAY CONFIGURATION
    numCTA = {numTask / z};  //TOTAL THREAD ARRAY NUMBER IS DETERMINED TO BE (TASK NUMBER/Z)

kernel2 <<< numCTA, numThreads>>> ();
}
```

Fig.11

```
//PROCESS OF GPU SIDE
__device__ kernel1 ( ) {
    __shared__ resource_t resource;  //RESOURCES TO USE ARE SECURED ON A SHARED MEMORY
    task_idx = cta_id.x;
    task( task_idx, &resource );  // TASK_IDX-TH TASK IS PROCESSED USING RESOURCES
}

//PROCESS OF CPU SIDE
main ( ) {
    numThreads = {x, y};      // THREAD BLOCK CONFIGURATION IN TWO DIMENSIONS X AND Y
    numCTA = {numTask};       // TOTAL THREAD BLOCK NUMBER IS SET TO BE TASK NUMBER kernel1 <<< numCTA, numThreads>>> ( );        //GPU PROCESS IS CALLED
}
``` data_idx.x = cta_id.x * cta_size.x + thread_id.x
data_idx.y = cta_id.y * cta_size.y + thread_id.y

Fig.38

TARGET APPLICATION FOR EACH TECHNOLOGY
OF IMPROVEMENT OF PROCESSOR OPERATING RATE

| NUMBER OF THREADS PER TASK | NUMBER OF TASKS | |
|---|---|---|
| | SMALL | LARGE |
| SMALL | UNSUITABLE TO MANY-CORE | SUBJECT OF PRESENT INVENTION |
| LARGE | NON-PATENT DOCUMENT2 | NON-PATENT DOCUMENT1 |

PARALLEL PROCESSING DEVICE, PARALLEL PROCESSING METHOD, OPTIMIZATION DEVICE, OPTIMIZATION METHOD AND COMPUTER PROGRAM

This application is a National Stage Entry of PCT/JP2012/063405 filed on May 18, 2012 which claims priority from Japanese Patent Application 2011-112331 filed on May 19, 2011, the contents of all of which are incorporated herein by reference, in their entirety.

TECHNICAL FIELD

The present invention relates to a parallel processing device using a processing unit having a plurality of processor cores, and to a parallel processing method and a computer program thereof, and also relates to an optimization device for optimizing a computer program which is to be executed by a computer equipped with a processing unit having a plurality of processor cores, and to an optimization method and a computer program thereof.

BACKGROUND ART

There is known a technology referred to as "multi-core" which integrates a plurality of processor cores into a single processing unit. In particular, a processing unit having a large number of processor cores is also referred to as a many-core accelerator. Patent Document 1 describes an example of a virtual architecture and an instruction set for parallel computing on such multi-core or many-core accelerators. In the virtual architecture, parallel processing is executed on the basis of CTAs (Cooperative Thread Arrays). A CTA is a group of n number of threads which concurrently execute the same program. A plurality of CTAs may operate in parallel. A group of CTAs operating in parallel with each other is referred to as a grid. Inclusion relationships between grids, CTAs and threads are shown in FIG. 23. To each of the grids, CTAs and threads, an ID is assigned. In such a virtual architecture, by using the IDs, different grids, different CTAs and different threads can process different data. The thread IDs, CTA IDs and grid IDs may be defined in a multidimensional manner. In FIG. 23, the thread IDs and CTA IDs are each defined in two dimensions.

For example, when processing one dimensional array data, the CTA IDs and thread IDs are defined in one dimension. In that case, as shown in FIG. 24 (b), a position of data to be processed by each thread, data_idx, can be calculated from the CTA ID (cta_id), the total number of threads included in the CTA (cta_size) and the thread ID (thread_id).

When processing two dimensional matrix data, the CTA IDs and thread IDs are defined in two dimensions. In that case, as shown in FIG. 25 (b), the x and y coordinates of a position data_idx of data to be processed by each thread can be calculated from the x and y values of the CTA ID, respectively, the total number of threads included in the CTA and the thread ID.

In the virtual architecture, each thread also can share data with other threads via a memory. One-to-one correspondence is not necessarily needed between a logical thread and a physical processor core, and a larger number of threads than processor cores may exist. In the virtual architecture, when a larger number of threads or CTAs than processor cores are generated, only some of the generated threads or CTAs are concurrently executed. Further, although threads included in the same CTA operate in coordination with each other, operations of individual CTAs are independent of each other.

Patent Document 2 describes a technology for hiding memory access latency in multithread processing. In the technology, in processing of a plurality of threads consisting of a mixture of arithmetic operation instructions with low latency (delay time) and memory access instructions with high latency, processing of one thread is swapped for processing of another thread after the former's executing a memory access instruction. That is, this technology hides memory access latency by, while waiting for completion of memory access of one thread, executing operations of another thread. An example of operation of a device employing this technology is shown in FIG. 26. In the example in FIG. 26, a thread n executes arithmetic operations i to i+2 sequentially. After that, when the thread n executes memory access (memory load j), while waiting until the memory is loaded, this device swaps the thread n for another thread m. Then, the thread m executes arithmetic operation s to s+1 sequentially. Then, when the thread m executes memory access (memory load t), this device swaps the thread m for the thread n having completed the memory load j. Here, n and m are values of a thread identifier. The i, s, j and t are positive integers and represent a processing order of instructions for arithmetic operation and memory load within each of the threads. The technology described in Patent Document 2 is particularly effective in a process where a large number of threads can be concurrently executed on the same processor. On the other hand, in a process where the number of concurrently executable threads is small, it may often occur that there is no other thread capable of executing operations during a time period to wait for completion of memory access of a thread and, accordingly, the technology described in Patent Document 2 cannot hide the memory access latency.

As one of implementations of the virtual architecture described in Patent Document 1, CUDA (Compute Unified Device Architecture) is described in Non-patent Document 3. In this CUDA, there is an upper limit to the number of concurrently executable CTAs. Because this restriction is independent of the number of threads included in one CTA, when the number of threads in one CTA is small, the total number of whole threads becomes small due to the upper limit of the number of CTAs. Also, the number of threads per processor core becomes small. Accordingly, a device employing CUDA cannot hide memory access latency in a process containing only a small number of threads within each CTA.

Patent Document 1 also describes a device which performs processing using a plurality of CTAs, taking high-definition television image generation as an example. In that case, because the images to be processed are two-dimensional ones, threads and CTAs are defined in two dimensions, as shown in FIG. 25 (a). Each of the threads processes one pixel. Here, the total number of pixels of a high-definition television image exceeds the number of threads that can be processed in a single CTA. Accordingly, this device divides an image into appropriate areas. Then, as shown in FIG. 25 (a), each of the CTAs processes one of the divided areas. As shown in FIG. 25 (b), each of the threads determines a location to read out input data and write in output data (data_idx) using its CTA ID and thread ID. Hereafter, each of processes into which the whole process of an application such as high-definition television image generation is divided, and which are allocated to CTAs, is referred to as a task.

A configuration of a parallel processing device employing such a technology described in Patent Document 1 is shown in FIG. 27. This parallel processing device includes a CPU (Central Processing Unit) and a GPU (Graphics Processing Unit) which is a many-core accelerator. When expressed in terms of functional blocks, this parallel processing device comprises an intra-CTA (per-CTA) thread number setting unit 911, a CTA number setting unit 912, a task division unit 913, a CTA control unit 924, a processing task determination unit 925 and a task execution unit 926. Here, the intra-CTA thread number setting unit 911, the CTA number setting unit 912 and the task division unit 913 are implemented by the CPU. The CTA control unit 924, the processing task determination unit 925 and the task execution unit 926 are implemented by the GPU. The intra-CTA thread number setting unit 911 sets the number of threads included in each CTA, which is referred to as an intra-CTA thread number. As this intra-CTA thread number, for example, set is a value inputted by a user taking into consideration the number of threads processable within one CTA. The CTA number setting unit 912 sets a total number of CTAs, referred to as a total CTA number, using the intra-CTA thread number. In the case of high-definition television image generation, the total thread number equals to the number of pixels and thus is fixed. Therefore, if the intra-CTA thread number is determined, then the total CTA number is determined. The task division unit 913 divides the whole process into tasks in accordance with the intra-CTA thread number, as shown in FIG. 28. The CTA control unit 924 generates threads and CTAs on the basis of the inputted intra-CTA thread number and the calculated total CTA number. The CTA control unit 924 assigns an ID to each of the threads and each of the CTAs and controls their execution. The processing task determination unit 925 and the task execution unit 926 operate with respect to each of the CTAs individually. The processing task determination unit 925 determines a task to be processed by each CTA on the basis of the intra-CTA thread number and the CTA ID of the CTA. The task execution unit 926 executes the task determined by the processing task determination unit 925.

FIG. 29 shows operation of such a parallel processing device employing the technology described in Patent Document 1. First, as shown in FIG. 29 (a), the intra-CTA thread number setting unit 911 sets, for example, a value inputted by a user taking the number of threads processable within one CTA into consideration as the intra-CTA thread number (step S801). Next, the task division unit 913 divides the whole process into tasks in accordance with the intra-CTA thread number (step S802). At that time, the task division unit 913 defines the task numbers as one-dimensional values, as shown in FIG. 28. In FIG. 28, k equals to the number of tasks in the x-direction. The threads within each CTA are defined in two dimensions. Next, The CTA number setting unit 912 sets the total CTA number in one dimension, using the intra-CTA thread number (step S803). Here, the order of executing the steps S802 and S803 may be reversed. Next, the CTA control unit 924 generates thus set number of CTAs and threads. Then, the CTA control unit 924 gives an ID to each of the CTAs and each of the threads (step S804). Next, the CTA control unit 924 controls execution of each of the CTAs and each of the threads (step S805). A process executed in each of the CTAs under such control by the CTA control unit 924 is shown in FIG. 29 (b). Here, the processing task determination unit 925 firstly acquires a CTA ID n (step S806). Then, the processing task determination unit 925 calculates the location of target data in processing of the n-th task executed by each thread in the CTA. Next, the task execution unit 926 executes the nth task in each of the threads (step S807). Here, the steps S801 to S803 are carried out by the CPU. The steps S804 to S805 are carried out by the GPU. The steps S806 to S807 are carried out by the GPU with respect to each CTA.

In cases such as the high-definition television image generation process where operations on all elements are the same and are executed with the same process flow, the parallel processing device may divide the whole process into any size of tasks. Accordingly, the parallel processing device may set the intra-CTA thread number and the total CTA number at any values. Therefore, even when there is restriction on the number of concurrently executed CTAs, the parallel processing device can increase the number of concurrently executed threads by increasing the number of threads per CTA, and thereby can hide memory access latency. For example, the parallel processing device may reduce the number of threads per CTA when it is desirable to increase the total CTA number, and may reduce the total CTA number when it is desirable to increase the number of threads per CTA. For example, considered here is to increase the total CTA number from that in the case of FIG. 28. In this case, as shown in FIG. 30, the parallel processing device reduces the number of threads per CTA by narrowing the area per task. Here, as a result of narrowing of the area per task from that containing 16 pixels to that containing 4 pixels, the number of threads per CTA is decreased from 16 to 4. In this way, the parallel processing device can perform adjustment to increase the total CTA number.

In a further respect, an optimum value of the number of concurrently executed CTAs changes with runtime environment. Accordingly, Non-patent Document 1 describes a method of automatically tuning the total CTA number and the number of threads per CTA in accordance with runtime environment. The technology described in Non-patent Document 1 changes the intra-CTA thread number to various values and measures the respective processing times, and then employs a value of the intra-CTA thread number giving the fastest processing as a final optimum value.

A device configuration of the technology described in Non-patent Document 1 is shown in FIG. 31. The device according to the technology described in Non-patent Document 1 includes an application execution unit 900 which comprises the same functional blocks as that of the parallel processing device shown in FIG. 27, a parameter modification unit 931, an execution time acquisition unit 932 and an optimum parameter selection unit 933. The parameter modification unit 931 outputs several different values of the intra-CTA thread number to the intra-CTA thread number setting unit 911. The execution time acquisition unit 932 measures a time taken to execute an application. The optimum parameter selection unit 933 determines a value of the intra-CTA thread number giving the shortest processing time to be an optimum value.

Operation according to the technology described in Non-patent Document 1 is shown in FIG. 32. If tests on all parameter values, that is, all planned values of the intra-CTA thread number, have not been completed (No at a step S1101), the parameter modification unit 931 sets a new value of the intra-CTA thread number (step S1102). Then, the application execution unit 900 executes the application using the set value of the intra-CTA thread number (step S1103). Then, the execution time acquisition unit 932 measures a time taken to execute the application (step S1104). Then, if the time measured by the execution time acquisition unit 932 is shorter than the execution times for previously tested parameter values (Yes at a step S1105), the optimum parameter selection unit 933 updates the optimum parameter (Step S1106). This device repeats the processes of the steps S1101 to S1106 until tests on all parameter values are completed.

By the way, as a cause of decrease in the operating rate of each processor contained in a many-core accelerator, there is mentioned smallness of the total number of threads required for processing an application. For example, in the above-mentioned example of high-definition television image generation process, there may be a case where the number of pixels to be processed is small. In such a case, the parallel processing device described above cannot suppress decrease in operating rates of the processor cores even if the number of threads per CTA is changed in any way, because the total number of threads never becomes large enough. In this respect, Non-patent Document 2 describes a technology of improving the operating rates of processor cores by merging and thereby executing in parallel a plurality of applications which each require a small total number of threads, as shown in FIG. 33. In FIG. 33, this technology divides each application into tasks with an appropriate size in accordance with runtime environment. Here, it is assumed that, for each of an application A containing 3 tasks and an application B containing 8 tasks, the number of tasks executable in parallel is smaller than that calculated from the processing performance of a many-core accelerator employed here. In that case, if the above-described parallel processing device executes the applications A and B separately using the many-core accelerator, it comes to lower the operating rates of processor cores because of low degree of parallelism. Accordingly, the technology described in Non-patent Document 2 executes the applications A and B in parallel with each other and thereby executes concurrently a larger number of tasks than that of when the applications are executed separately. By this way, this technology can improve the operating rates of processor cores.

A device configuration of the technology described in Non-patent Document 2 is shown in FIG. 34. In FIG. 34, the device according to the technology described in Non-patent Document 2 comprises, in addition to the same functional block configuration as that according to the technology described in Patent Document 1 shown in FIG. 27, an application merging unit 941 and a processing application selection unit 942. The application merging unit 941 is implemented by the CPU. The processing application selection unit 942 is implemented by the GPU with respect to each CTA.

Operation according to the technology described in Non-patent Document 2 is shown in FIG. 35. First, as shown in FIG. 35 (a), the intra-CTA thread number setting unit 911 sets the number of threads per CTA acquired through a user's input or the like (step S801). Then, according to the intra-CTA thread number, the task division unit 913 divides the process of each application into the CTA size number of tasks (step S802). Next, the application merging unit 941 merges a plurality of applications to make them executable in parallel with each other (Step S903). Then, the CTA number setting unit 912 sets a total of values of the number of CTAs required for the respective applications to be the total number of CTAs required for the whole of the applications (step S904). Next, on the basis of thus set intra-CTA thread number and total CTA number, the CTA control unit 924 generates threads and CTAs. Then, the CTA control unit 924 gives an ID to each of the threads and each of the CTAs (step S804). Then, the CTA control unit 924 controls execution of each of the CTAs (step S805). A process executed with respect to each of the CTAs under such control by the CTA control unit 924 is shown in FIG. 35 (b). Here, for each of the CTAs, the processing application selection unit 942 firstly acquires the CTA ID (step S806) and, on the basis of the CTA ID, selects applications to be processed by the CTA (Step S907). Then, on the basis of the CTA ID and the like, the processing task determination unit 925 determines which tasks of the selected applications are to be processed by the CTA. Then, the task execution unit 926 executes the tasks determined by the processing task determination unit 925 in each of corresponding threads (step S908).

CITATION LIST

Non-patent document 1: Guo, Ping; Wang, Liqiang, "Auto-Tuning CUDA Parameters for Sparse Matrix-Vector Multiplication on GPUs", Computational and Information Sciences (ICCIS), 2010 International Conference on, pp. 1154-1157, December 2010.

Non-patent document 2: M. Guevara, C. Gregg, K. Hazelwood, and K. Skadron, "Enabling Task Parallelism in the CUDA Scheduler", Workshop on Programming Models for Emerging Architectures, September 2009.

Non-patent document 3: "NVIDIA CUDA C Programming Guide", 2010.

Patent Document 1: Japanese Laid-Open Patent Application No. 2008-276740.

Patent Document 2: Japanese Laid-Open Patent Application No. 2007-200288.

SUMMARY OF INVENTION

Technical Problem

To make a many-core accelerator exhibit performance consistent with the number of cores it comprises, high degree of process parallelism is important. However, even when parallelism is high between processes themselves, it may occur that the process parallelism is underused because of some restriction imposed by runtime environment and the operating rates of processor cores are thereby lowered.

As an example, a description will be given of parallel processing in video image encoding. In video image encoding, processes performed on pixels within a video image are not all the same unlike in the high-definition television image generation process described above. In video image encoding, the process flow may be different for each image area which is referred to as a macroblock. For example, the process to be selected from between compression based on intra-screen prediction and that based on inter-screen prediction may be different for each macroblock. In video image encoding, parallel processing is also possible in terms of each pixel within a macroblock. Thus, video image encoding is a process which enables two-level parallelization consisting of parallelization in terms of each macroblock and that in terms of each pixel within a macroblock, as shown in FIG. 36. Here, in the above-mentioned parallel processing device described in Patent Document 1, because the process of one CTA is independent of the others', CTAs can execute respective own processes each with a different flow in parallel with each other. Accordingly, when conducting video image encoding using the parallel processing device described in Patent Document 1, it is natural to map parallel processing in terms of macroblocks to be processed differently to CTA processes, and parallel processing in terms of pixels to be equally processed to thread processes. In that case, the total number of CTAs becomes equal to the number of macroblocks, and the number of threads per CTA to the number of pixels per macroblock. Then, processing of one macroblock corresponds to one task.

For example, FIG. 37 shows an example of operation where the parallel processing device described in Patent Document 1 performs such video image encoding. Here, first, the task division unit 913 divides the whole process into tasks each corresponding to processing of one macroblock (step S811). Then, the intra-CTA thread number setting unit 911 sets the intra-CTA thread number (step S812). At that time, the intra-CTA thread number setting unit 911 cannot set the intra-CTA thread number at an optional value unlike in the above-described case of high-definition television image generation process. In the case of video image encoding process, the intra-CTA thread number setting unit 911 sets the intra-CTA thread number on the basis of parallelism within each of the divided tasks. After that, operations in the steps S803 to S807 are similar to those in the case shown in FIG. 29 where this parallel processing device performs high-definition television image generation process.

Here, as already described above, the number of threads required for one task is fixed in video image encoding process. Accordingly, in the case of performing video image encoding using the parallel processing device described in Patent Document 1, it is difficult for a user to freely change the intra-CTA thread number by changing the mapping relation between CTAs and macroblocks and that between threads and pixels. Therefore, when there is an upper limit to the number of concurrently executable CTAs as described in Non-patent document 3, the parallel processing device described in Patent Document 1 cannot set the total thread number at a satisfactory value by increasing the number of threads per CTA. In other words, in such a case, the parallel processing device described in Patent Document 1 cannot hide memory access latency by adopting the technology described in Patent Document 2.

The technologies described in Non-patent Documents 1 and 2 each are a technology for improving the operating rates of processor cores. However, these technologies cannot meet such a process as that of video image encoding where the degree of parallelism within a task is not high enough and the number of tasks is large.

In a table shown in FIG. 38, indicated are types of applications with respect to which the operating rates of processor cores can be improved by employing the technologies described in Non-patent Documents 1 and 2. An application with a small number of necessary threads per task and also a small total number of tasks is intrinsically unsuitable for processing by a many-core accelerator. The technology described in Non-patent Document 2 can be applied to an application for which the number of threads per task can be set at a sufficiently large value but the total number of tasks is small. The technology described in Non-patent Document 1 can be applied to an application for which the number of threads per task can be set at a sufficiently large value and also the total number of tasks is sufficiently large. As seen from FIG. 38, when executing an application for which the number of threads per task cannot be set at a large value but the total number of tasks is large by the use of the parallel processing device described in Patent Document 1, it is impossible to sufficiently improve the operating rates of processor cores by adopting the technologies described in Non-patent Documents 1 and 2.

The present invention has been made to solve the above-described problem, and accordingly, the objective of the present invention is to provide a parallel processing device which improves the operating rate of each core in a processing unit having a plurality of processor cores in performing a process for which parallelism within a task is low but the number of tasks processable in parallel is large.

Solution to Problem

A parallel processing device of the present invention is a parallel processing device for performing further parallel processing of a group of thread arrays each being a group of threads each representing a process unit enabling parallel processing, using a processing unit having a plurality of processor cores, which comprises: a divided task acquisition unit which acquires information representing each of tasks into which the process of an application to be processed is divided in a manner to enable parallel processing; a concurrently executed task number setting unit which sets a concurrently executed task number which is the number of tasks concurrently executed in each of the thread arrays; an intra-array thread number setting unit which sets an intra-array thread number which is the number of threads within each of the thread arrays, on the basis of the number of threads able to be processed further in parallel in each of the tasks and the concurrently executed task number; a total array number setting unit which sets a total array number which is the total number of the thread arrays, on the basis of the total number of threads necessary for processing the application and the intra-array thread number; a thread array control unit which generates the threads and the thread arrays on the basis of the intra-array thread number and the total array number, and controls the processing unit to execute in parallel the process of each of the thread arrays; a resource allocation unit which, in each of the thread arrays, secures resources necessary for processing the same number of tasks as the concurrently executed task number, and allocates the secured resources to each of the tasks; a processing task determination unit which determines a task to be processed by each thread within each of the thread arrays; and a task execution unit which executes the same number of tasks as the concurrently executed task number in each of the thread arrays, by causing each of the threads in the thread array to execute the task determined by the processing task determination unit using the resources allocated by the resource allocation unit.

An optimization device of the present invention is an optimization device for optimizing a computer program describing a process of performing further parallel processing of a group of thread arrays each being a group of threads each representing a process unit enabling parallel processing, using a processing unit having a plurality of processor cores, which comprises: a program acquisition unit which acquires information representing a computer program including a step of generating thread arrays to execute the process of each of tasks into which an application to be processed is divided in a manner to enable parallel processing and threads into which the process of each of the tasks is divided in a manner to enable further parallel processing, a step of securing and subsequently allocating resources necessary for processing each of the tasks in each of the thread arrays, a step of determining a task to be processed by each of the threads, and a step of causing each of the threads to execute the determined task using the allocated resources; a concurrently executed task number setting unit which sets the concurrently executed task number which is the number of tasks concurrently executed in each of the thread arrays, on the basis of at least one of task information related to the tasks and processing unit configuration information related to the configuration of the processing unit; an intra-array thread number setting unit which sets the intra-array thread number on the basis of the number of threads to be necessary for each of the tasks and the concurrently executed task number; a total array number setting unit which sets a total array number which is the total number of the thread arrays on the basis of the total number of threads necessary for processing the application and the intra-array thread number; and a program modification unit which modifies, of the computer program, the step of generating the threads and the thread arrays into a step of performing the generation on the basis of the intra-array thread number and the total array number, the step of securing and allocating resources in the thread arrays into a step of securing and allocating resources necessary for executing the same number of tasks as the concurrently executed task number, the step of determining a task to be processed by each of the threads into a step of performing the determination such that the task is determined to be any one of the same number of tasks as the concurrently executed task number executed in the thread array, and the step of causing the thread to execute the task into a step of also causing the thread to use resources allocated to the task in executing the task.

A parallel processing method of the present invention is a parallel processing method for performing further parallel processing of a group of thread arrays each being a group of threads each representing a process unit enabling parallel processing, using a processing unit having a plurality of processor cores, which comprises: acquiring information representing each of tasks into which the process of an application to be processed is divided in a manner to enable parallel processing; setting a concurrently executed task number which is the number of tasks concurrently executed in each of the thread arrays; setting an intra-array thread number which is the number of threads within each of the thread arrays, on the basis of the number of threads able to be processed further in parallel in each of the tasks and the concurrently executed task number; setting a total array number which is the total number of the thread arrays, on the basis of the total number of threads necessary for processing the application and the intra-array thread number; generating the threads and the thread arrays on the basis of the intra-array thread number and the total array number, and controlling the processing unit to execute in parallel the process of each of the thread arrays; in each of the thread arrays, securing resources necessary for processing the same number of tasks as the concurrently executed task number, and allocating the secured resources to each of the tasks; determining a task to be processed by each thread within each of the thread arrays; and executing the same number of tasks as the concurrently executed task number in each of the thread arrays, by causing each of the threads in the thread array to execute the task determined by the processing task determination unit using the resources allocated by the resource allocation unit.

A computer program of the present invention causes a parallel processing device, which performs further parallel processing of a group of thread arrays each being a group of threads each representing a process unit enabling parallel processing using a processing unit having a plurality of processor cores, to execute: a divided task acquisition step of acquiring information representing each of tasks into which the process of an application to be processed is divided in a manner to enable parallel processing; a concurrently executed task number setting step of setting a concurrently executed task number which is the number of tasks concurrently executed in each of the thread arrays; an intra-array thread number setting step of setting an intra-array thread number which is the number of threads within each of the thread arrays, on the basis of the number of threads which can be processed further in parallel in each of the tasks and the concurrently executed task number; a total array number setting step of setting a total array number which is the total number of the thread arrays, on the basis of the total number of threads necessary for processing the application and the intra-array thread number; a thread array control step of generating the threads and the thread arrays on the basis of the intra-array thread number and the total array number, and controlling the processing unit to execute in parallel the process of each of the thread arrays; a resource allocation step of, in each of the thread arrays, securing resources necessary for processing the same number of tasks as the concurrently executed task number, and allocating the secured resources to each of the tasks; a processing task determination step of determining a task to be processed by each thread within each of the thread arrays; and a task execution step of executing the same number of tasks as the concurrently executed task number in each of the thread arrays, by causing each of the threads to execute the task determined by the processing task determination unit using the resources allocated by the resource allocation unit.

An optimization method of the present invention is an optimization method for optimizing a computer program describing a process of performing further parallel processing of a group of thread arrays each being a group of threads each representing a process unit enabling parallel processing using a processing unit having a plurality of processor cores, the optimization method comprises: acquiring information representing a computer program including: a step of generating thread arrays to execute the process of each of tasks into which an application to be processed is divided in a manner to enable parallel processing and threads into which the process of each of the tasks is divided in a manner to enable further parallel processing; a step of securing and subsequently allocating resources necessary for processing each of the tasks, in each of the thread arrays; a step of determining a task to be processed by each of the threads; a step of causing each of the threads to execute the determined task using the allocated resources; setting the concurrently executed task number which is the number of tasks concurrently executed in each of the thread arrays, on the basis of at least one of task information related to the tasks and processing unit configuration information related to the configuration of the processing unit; setting the intra-array thread number on the basis of the number of threads to be necessary for each of the tasks and the concurrently executed task number; setting a total array number which is the total number of the thread arrays on the basis of the total number of threads necessary for processing the application and the intra-array thread number; and modifying, of the computer program, the step of generating the threads and the thread arrays into a step of performing the generation on the basis of the intra-array thread number and the total array number, the step of securing and allocating resources in the thread arrays into a step of securing and allocating resources necessary for executing the same number of tasks as the concurrently executed task number, the step of determining a task to be processed by each of the tasks into a step of performing the determination such that the task is determined to be any one of the same number of tasks as the concurrently executed task number executed in the thread array, and the step of causing the thread to execute the task into a step of also causing the thread to use resources allocated to the task in executing the task.

A computer program of the present invention is a computer program for optimizing a computer program describing a process of performing further parallel processing of a group of thread arrays each being a group of threads each representing a process unit enabling parallel processing using a processing unit having a plurality of processor cores, the computer program for the optimization causes a computer device to execute: a program acquisition step of acquiring information representing a computer program including a step of generating thread arrays to execute the process of each of tasks into which an application to be processed is divided in a manner to enable parallel processing and threads into which the process of each of the tasks is divided in a manner to enable further parallel processing, a step of securing and subsequently allocating resources necessary for processing each of the tasks in each of the thread arrays, a step of determining a task to be processed by each of the threads, and a step of causing each of the threads to execute the determined task using the allocated resources; a concurrently executed task number setting unit which sets the concurrently executed task number which is the number of tasks concurrently executed in each of the thread arrays, on the basis of at least one of task information related to the tasks and processing unit configuration information related to the configuration of the processing unit; an intra-array thread number setting step of setting the intra-array thread number on the basis of the number of threads to be necessary for each of the tasks and the concurrently executed task number; a total array number setting step of setting a total array number which is the total number of the thread arrays on the basis of the total number of threads necessary for processing the application and the intra-array thread number; and a program modification step of modifying, of the computer program, the step of generating the threads and the thread arrays into a step of performing the generation on the basis of the intra-array thread number and the total array number, the step of securing and allocating resources in the thread arrays into a step of securing and allocating resources necessary for executing the same number of tasks as the concurrently executed task number, the step of determining a task to be processed by each of the threads into a step of performing the determination such that the task is determined to be any one of the same number of tasks as the concurrently executed task number executed in the thread array, and the step of causing the thread to execute the task into a step of also causing the thread to use resources allocated to the task in executing the task.

Advantageous Effects of Invention

The present invention can provide a parallel processing device which improves the operating rate of each core in a processing unit having a plurality of processor cores, in performing a process for which parallelism within a task is low but the number of tasks processable in parallel is large.

BRIEF DESCRIPTION OF DRAWINGS

FIG. 10 is a diagram showing an example of a computer program for causing the parallel processing device of the second exemplary embodiment of the present invention to operate.

FIG. 11 is a diagram showing an example of a computer program for causing a parallel processing device of a related technology to operate.

FIG. 38 is a diagram for explaining applications to be a target of related technologies and explaining a subject of the present invention.

DESCRIPTION OF EMBODIMENTS

Hereinafter, exemplary embodiments of the present invention will be described in detail with reference to drawings.

First Exemplary Embodiment

Figure 1:
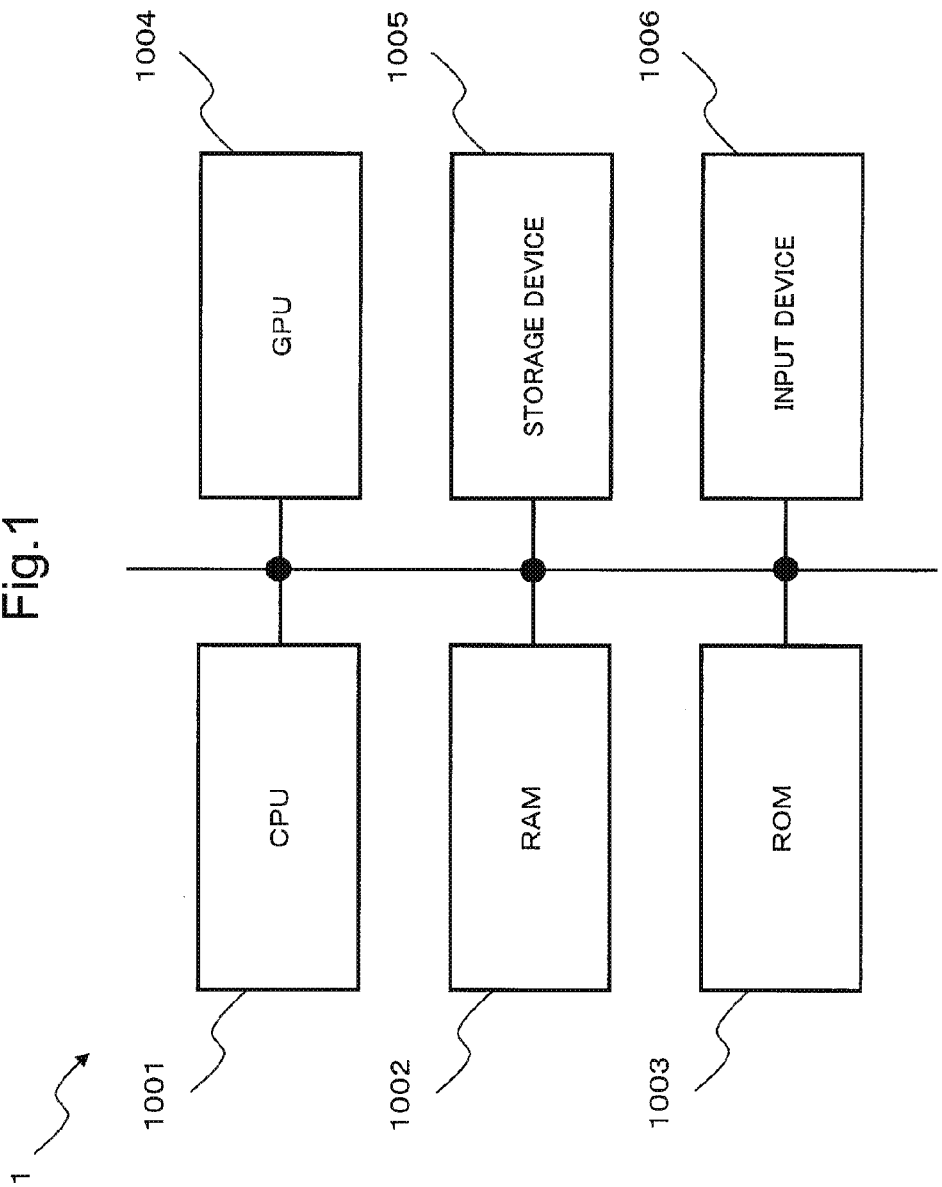
FIG. 1 is a hardware configuration diagram of a parallel processing device as a first exemplary embodiment of the present invention.

A hardware configuration of a parallel processing device 1 as a first exemplary embodiment of the present invention is shown in FIG. 1.

In FIG. 1, the parallel processing device 1 is implemented by a computer device having a CPU (Central Processing Unit) 1001, a RAM (Random Access Memory) 1002, a ROM (Read Only Memory) 1003, a GPU (Graphics Processing Unit) 1004, a storage device 1005 such as a hard disk, and an input device 1006.

The CPU 1001 reads a computer program module stored in the ROM 1003 or the storage device 1005 and executes it using the RAM 1002 as a working area.

The GPU 1004 is a processing unit having a plurality of processor cores. Hereafter, the GPU 1004 is referred to also as a many-core accelerator. For example, a device targeted by CUDA described in Non-patent Document 3 can be applied as the GPU 1004. In that case, the GPU 1004 is equipped with at least one or more Streaming Multiprocessors having a plurality of Streaming Processors and a shared memory, a thread scheduler and a global memory. In the GPU 1004, in response to a call from the CPU 1001, the thread scheduler causes each Streaming Multiprocessor to perform parallel processing of processes.

The storage device 1005 stores a computer program representing an application to be a target of parallel processing. The storage device 1005 also stores a computer program to be executed by the CPU 1001 and the GPU 1004 so as to perform parallel processing of the application. The storage device 1005 further stores data to be processed by the application and various kinds of data necessary to cause the computer device to function as the parallel processing device 1.

The input device 1006 acquires the various kinds of data necessary to cause the computer device to function as the parallel processing device 1 from the outside.

The parallel processing device 1 is configured to be able to perform, by using the GPU 1004, further parallel processing of a group of thread arrays each being a group of threads each representing a process unit in terms of which parallel processing can be performed. Although CTA described in Background Art section is one type of thread array, each of exemplary embodiments of the present invention described below can be applied not only to a parallel processing device which processes CTAs in parallel but also to those which process other types of thread arrays.

Figure 2:
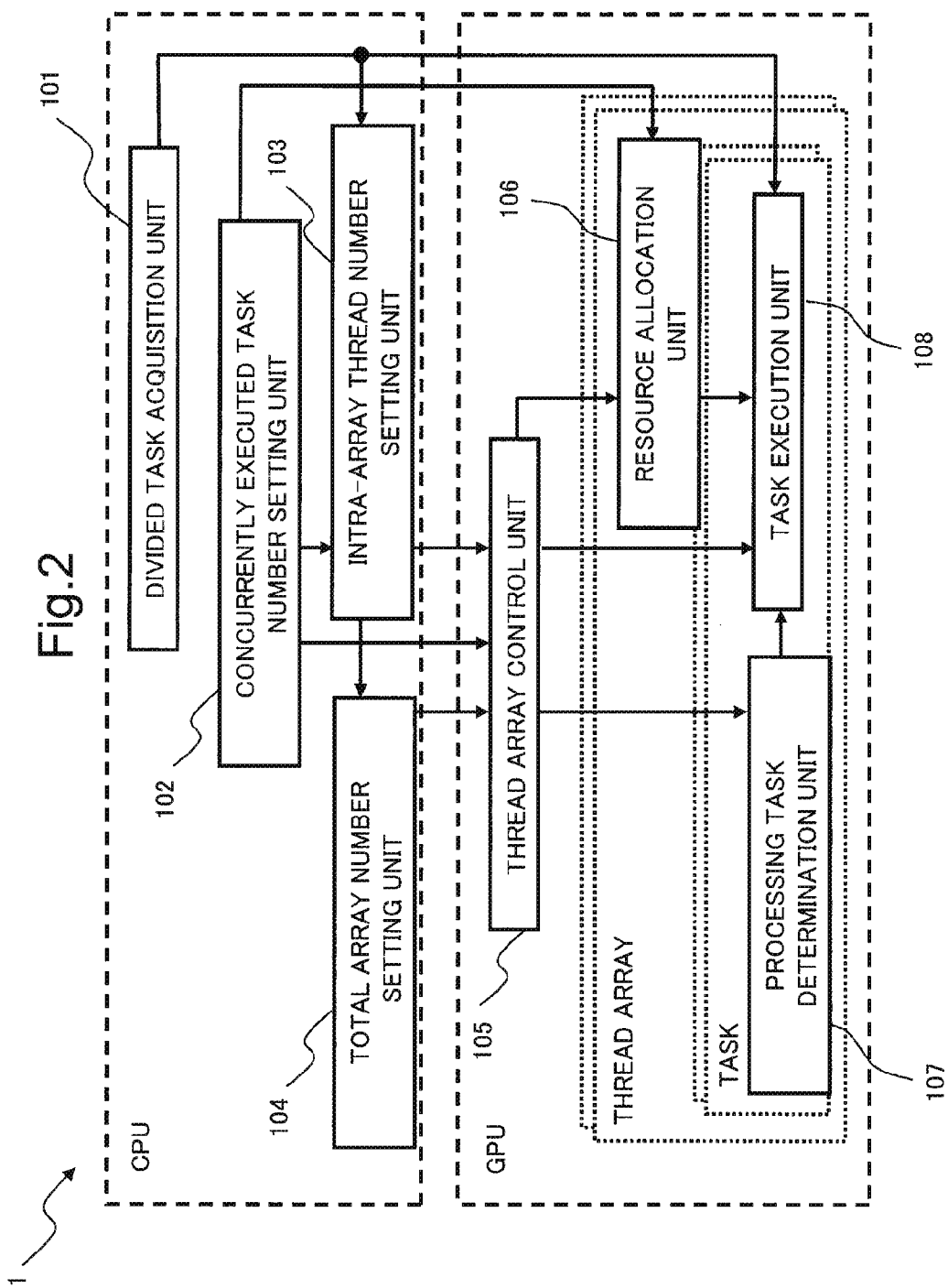
FIG. 2 is a functional block diagram of the parallel processing device as the first exemplary embodiment of the present invention.

Next, a functional block configuration of the parallel processing device 1 is shown in FIG. 2. In FIG. 2, the parallel processing device 1 comprises a divided task acquisition unit 101, a concurrently executed task number setting unit 102, an intra-array thread number setting unit 103, a total array number setting unit 104, a thread array control unit 105, a resource allocation unit 106, a processing task determination unit 107 and a task execution unit 108. Here, the divided task acquisition unit 101, the concurrently executed task number setting unit 102, the intra-array thread number setting unit 103 and the total array number setting unit 104 are implemented by the CPU 1001 which reads a computer program module and various sorts of information stored in the ROM 1003 or the storage device 1005 and executes it using the RAM 1002 as a working area. The thread array control unit 105, the resource allocation unit 106, the processing task determination unit 107 and the task execution unit 108 are implemented by the GPU 1004 which, under control by the CPU 1001, reads a computer program module and various sorts of information stored in the ROM 1003 or the storage device 1005 and performs parallel processing. For example, when the above-mentioned device targeted by CUDA described in Non-patent Document 3 is employed as the GPU 1004, the thread array control unit 105 is implemented by the thread scheduler, and the resource allocation unit 106, the processing task determination unit 107 and the task execution unit 108 are by the Streaming Processors. Here, hardware configurations to implement the respective functional blocks of the parallel processing device 1 are not limited to the above-described ones.

The divided task acquisition unit 101 acquires information representing each of tasks into which an application to be processed is divided in a manner to enable parallel processing. Here, it is assumed that the tasks are created to be processes which have no dependence on each other and can be processed in parallel. Also assumed is that each of the tasks is given identification information (a task number) by which the task can be uniquely identified. Such information representing each of the tasks is assumed to be stored in the storage device 1005. For example, when an application to be processed is a video image encoding process, the divided task acquisition unit 101 may acquire information representing the process content of each of tasks created as processes into which the video image encoding process is divided in terms of each macroblock. Also, for example, when an application to be processed is some image processing one, the divided task acquisition unit 101 may acquire information representing each of the process contents of tasks A and B which process respectively the right-half and the left-half areas of an image.

The concurrently executed task number setting unit 102 sets a concurrently executed task number which is the number of tasks executed concurrently in each thread array. For example, the concurrently executed task number setting unit 102 may acquire a value of the concurrently executed task number via the input device 1006. Alternatively, the concurrently executed task number setting unit 102 may acquire a value of the concurrently executed task number stored in advance in the storage device 1005.

Here, it is preferable to set the concurrently executed task number at a value which enables concurrent execution of a sufficient number of threads to hide memory access latency of the tasks, considering the number of threads necessary for each task.

For example, with regard to the device targeted by CUDA described in Non-patent Document 3, it is said to be desirable that, for the purpose of hiding the memory access latency, the number of threads concurrently executed on one Streaming Multiprocessor is about 700 or more. This device is also configured to be able to concurrently execute up to 8 thread arrays on one Streaming Multiprocessor. For example, when the optimum number of threads for processing of one task is 32, if setting the concurrently executed task number at 3, then the number of threads per Streaming Multiprocessor becomes 768, and it becomes possible to perform parallel processing with a sufficient number of threads to hide the memory access latency. Accordingly, in that case, the value 3 is preferable as the concurrently executed task number.

Also with regard to the concurrently executed task number, an upper limit value of the number of tasks concurrently executable may be set on the basis of the memory size and the number of processors of a many-core accelerator to be used for parallel processing. For example, in the above-mentioned device targeted by CUDA, one Streaming Multiprocessor has 16 K bytes of memory, and when 8 thread arrays are concurrently executed, each of the thread arrays can use 2 K bytes of memory. When each task uses 1 K bytes of memory, up to 2 tasks can be concurrently executed within one thread array. Accordingly, in that case, the value 2 is preferable as the concurrently executed task number.

Thus, a preferable value of the concurrently executed task number can be calculated at least either of task information representing each task and configuration information on a many-core accelerator used for performing parallel processing.

The intra-array thread number setting unit 103 sets an intra-array thread number which is the number of threads included in each thread array, on the basis of the number of threads processable in parallel further in each task and the concurrently executed task number. For example, the intra-array thread number setting unit 103 may set the intra-array thread number at a value obtained by multiplying the number of necessary threads for each task by the concurrently executed task number.

The total array number setting unit 104 sets a total array number which is the total number of thread arrays, on the basis of the total number of necessary threads for processing an application and the intra-array thread number. For example, the total array number setting unit 104 may determine the total array number by acquiring the total number of necessary threads for an application to be processed and then dividing the acquired total thread number by the intra-array thread number.

Thus, the intra-array thread number and the total array number increase or decrease depending on the concurrently executed task number. For example, a case of executing two tasks concurrently in one thread array (a case of the concurrently executed task number being two) will be considered here. In that case, the intra-array thread number per thread array is twice the number of necessary threads for executing one task, and accordingly the total array number becomes half the total number of tasks constituting the process of the application.

The thread array control unit 105 generates thread arrays and threads on the basis of the intra-array thread number. Further, the thread array control unit 105 gives each of the thread arrays and each of threads identification information (a thread array ID or a thread ID) for uniquely identifying each of them, and thereby controls their parallel processing.

The resource allocation unit 106 secures, in each thread array, necessary resources for task processing in the amount corresponding to the concurrently executed task number and then allocates the secured resources to each task. Here, the resources are, for example, memory areas and the like.

The processing task determination unit 107 determines a task to be processed by each thread in a thread array. Specifically, the processing task determination unit 107 calculates, with respect to each thread, the task number of a task to be processed by the thread, on the basis of the concurrently executed task number, the thread array ID and thread ID of the thread. A description will be given, for example, of a case where the concurrently executed task number is set at 2 and thread IDs are given as consecutive numbers within each thread array. In that case, the processing task determination unit 107 may determine, in a thread array of a thread ID n, the task number of a task to be processed by threads given the first half thread ID values to be 2n, and that to be processed by threads given the last half thread ID values to be 2n+1.

At the same time as the determination of a task to be processed by each thread, the processing task determination unit 107 also determines data (processing location) to be processed by the thread through the task. For example, when an application to be processed is that of video image encoding, the processing task determination unit 107 can determine, with respect to each thread, the location of a pixel to be processed by a thread through its task, on the basis of its thread ID.

The task execution unit 108 causes each thread to execute the task determined by the processing task determination unit 107 using the resources allocated by the resource allocation unit 106. By this way, the task execution unit 108 executes the same number of tasks as the concurrently executed task number in each thread array.

Here, the resource allocation unit 106 functions in each of the thread arrays generated by the thread array control unit 105. The processing task determination unit 107 and the task execution unit 108 function in terms of each task in each of the thread arrays. Accordingly, in FIG. 2, the resource allocation unit 106 is shown for one thread array, and the processing task determination unit 107 and the task execution unit 108 for one task.

Next, a description will be given of operation of the parallel processing device 1 configured as above, with reference to a flow chart shown in FIGS. 3 to 4.

First, the divided task acquisition unit 101 acquires information representing each of tasks into which the process of an application to be processed is divided (step S101).

For example, the divided task acquisition unit 101 acquires information representing tasks created as processes into which a video image encoding process is divided in terms of each macroblock. It is assumed that, at that time, the information representing tasks contains information for task identification (task numbers).

Next, the concurrently executed task number setting unit 102 sets the concurrently executed task number in one thread array (step S102).

For example, the concurrently executed task number setting unit 102 sets a value acquired via the input device 1006 as the concurrently executed task number.

Next, the intra-array thread number setting unit 103 sets a value obtained by multiplication of the number of necessary threads for processing each task and the concurrently executed task number as the intra-array thread number (step S103).

Then, the total array number setting unit 104 sets the total array number on the basis of the total thread number necessary for executing the application and the intra-array thread number (step S104).

For example, the total array number setting unit 104 sets, as the total array number, a value obtained by dividing the total number of necessary threads for executing all tasks constituting the whole process of the application by the intra-array thread number.

Next, the thread array control unit 105 generates threads and thread arrays on the basis of the intra-array thread number and the total array number. Then, the thread array control unit 105 gives the threads and thread arrays respective thread IDs and thread array IDs (step S105).

Subsequently, the thread array control unit 105 controls parallel processing of threads in each of the generated thread arrays and parallel processing of the thread arrays (step S106).

The following description will be given of operation of the parallel processing device 1 in each thread array, which is performed in the step S106 under control by the thread array control unit 105, with reference to FIG. 4. Here, the description will be given of a case the concurrently executed task number is set at 2. It is also assumed that the thread IDs are given as consecutive numbers within each thread array.

First, in each thread array, the processing task determination unit 107 acquires the thread array ID and the thread IDs of the respective threads (step S107).

Next, in each thread array, the resource allocation unit 106 secures resources required for processing of the same number of tasks as the concurrently executed task number (equals two, here) and allocates the resources to each of the tasks (step S108).

Then, the processing task determination unit 107 determines, with respect to each of the threads, a task to be processed by the thread, on the basis of its thread ID value within the thread array. In the present case, the processing task determination unit 107 determines whether or not the thread ID belongs to the first half values in the thread array (step S109).

If the thread ID value belongs to the first half values in the thread array, the processing task determination unit 107 determines the task number of a task to be processed by the thread to be 2n. Here, n is the thread array ID acquired in the step S107. At the same time, the processing task determination unit 107 also determines the location of data to be processed by the thread through the task 2n. Then, the task execution unit 108 causes the thread to execute the task 2n using the allocated resources (step S110).

On the other hand, if the thread ID value belongs to the last half values in the thread array, the processing task determination unit 107 determines the task number of a task to be processed by the thread to be 2n+1. At the same time, the processing task determination unit 107 also determines the location of data to be processed by the thread through the task 2n+1. Then, the task execution unit 108 causes the thread to execute the task 2n+1 using the allocated resources (step S111).

Figure 3:
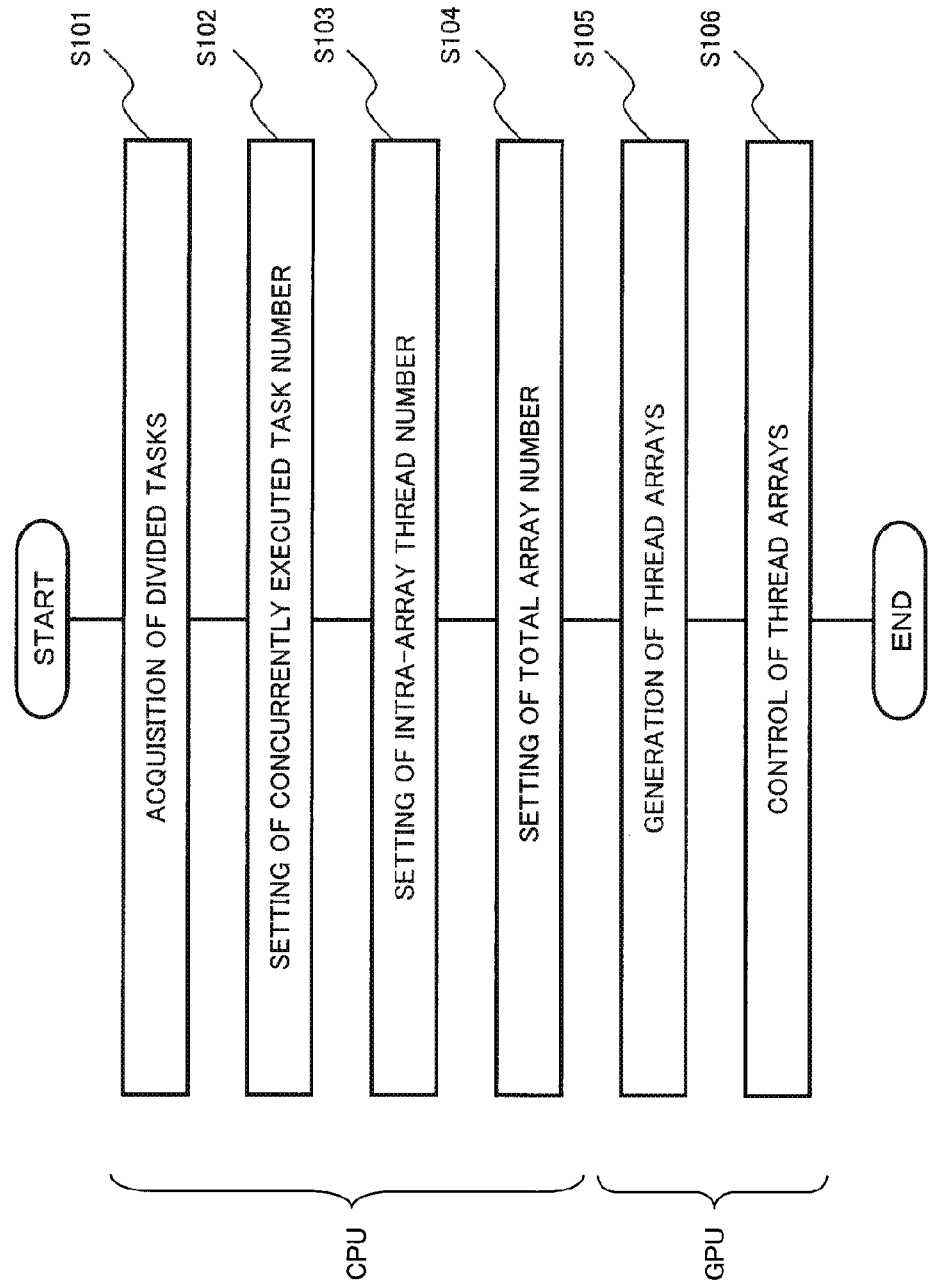
FIG. 3 is a flow chart illustrating operation of the parallel processing device as the first exemplary embodiment of the present invention.
Figure 4:
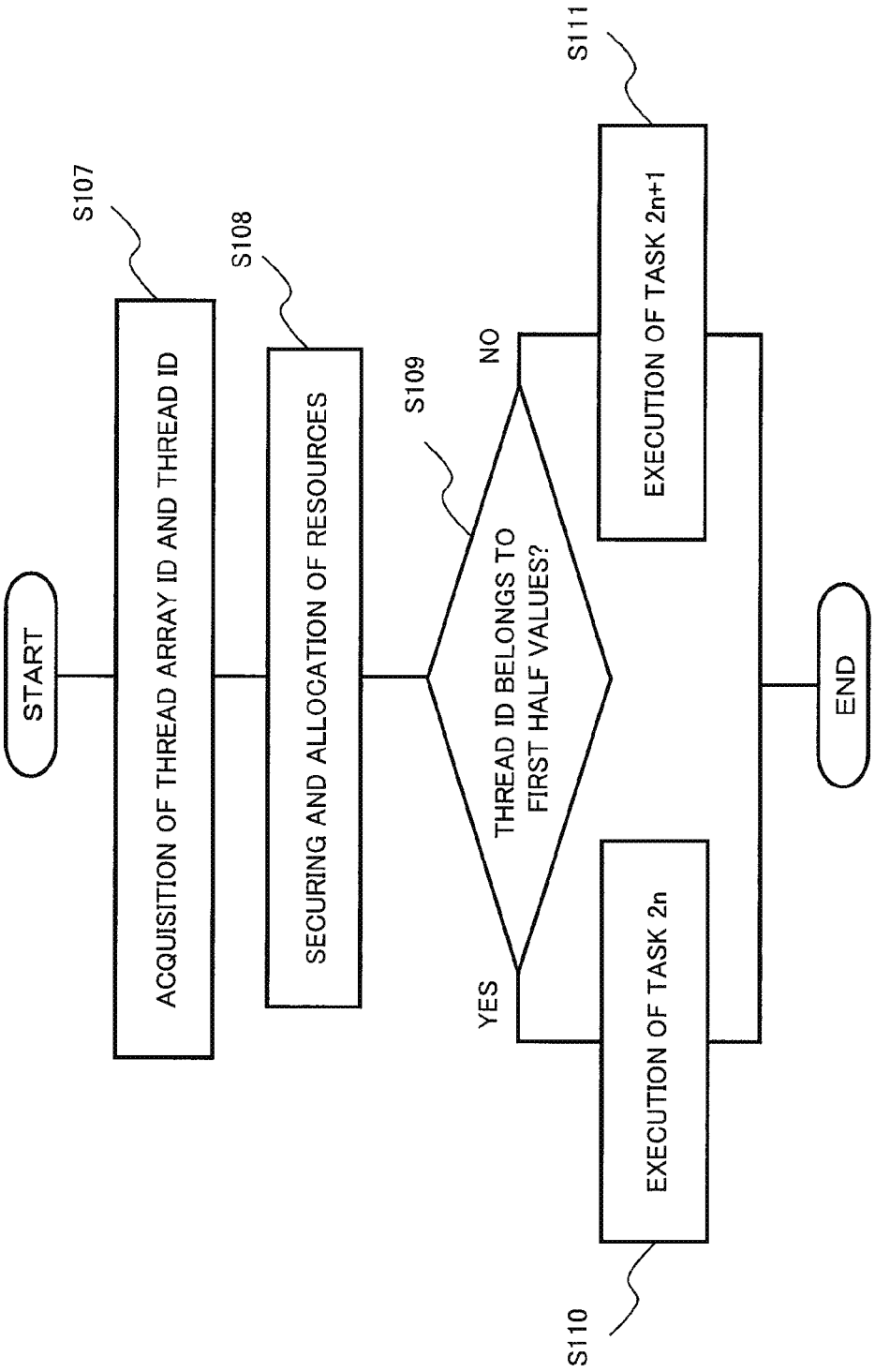
FIG. 4 is a flow chart as a continuation of FIG. 3.

In FIGS. 3 and 4, the steps S101 to S104 are carried out by the CPU 1001, and the steps S105 to S111 are by the GPU 1004 or any other many-core accelerator.

With that, the description of operation of the parallel processing device 1 is finished.

In the present exemplary embodiment, the thread array control unit 105 may control threads in a thread array to operate coordinately in parallel with each other, as described in Patent Document 1. In that case, the threads in one thread array (CTA) operate coordinately using shared resources allocated individually to respective tasks, by threads executing the same task synchronizing with each other by the use of an atomic (indivisible) instruction or the like. In particular, as the case of threads in the same warp in the technology described in Non-patent Document 3, when all threads executing the same task perform the same operation concurrently, they automatically synchronize with each other and do not require any explicit synchronization process.

Next, the effect of the first exemplary embodiment of the present invention will be described.

The parallel processing device as the first exemplary embodiment of the present invention can improve the operating rate of each core in a processing unit having a plurality of processor cores, in performing a process for which parallelism within a task is low but the number of tasks processable in parallel is large.

Figure 5:
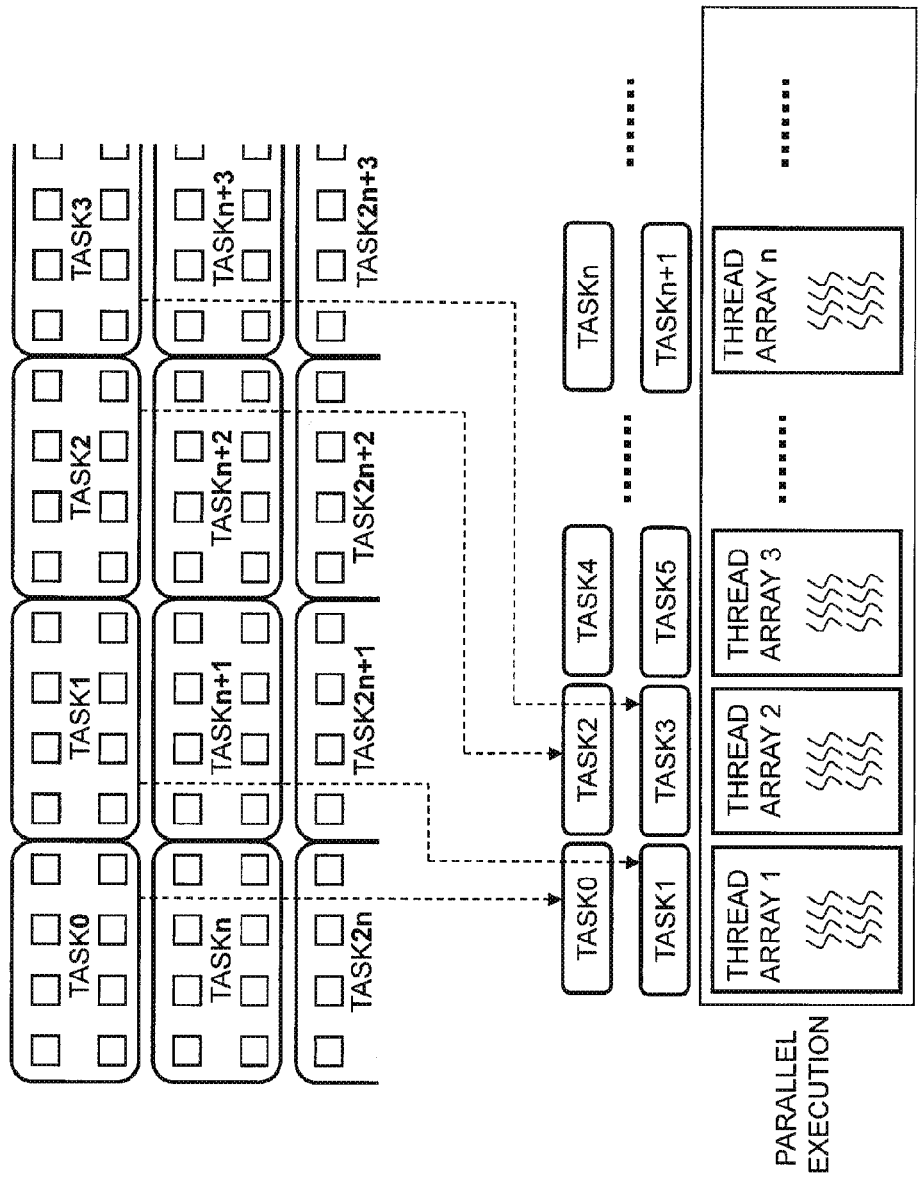
FIG. 5 is a schematic diagram for explaining an effect of the parallel processing device as the first exemplary embodiment of the present invention.

The reason will be described with reference to FIG. 5. The reason is that, in the parallel processing device as the first exemplary embodiment of the present invention, the concurrently executed task number setting unit sets the number of tasks concurrently executed in each thread array, the processing task determination unit determines which thread is to process which task, for each thread in each thread array, and the task execution unit causes each thread to execute the determined task and thereby executes concurrently the same number of tasks as the concurrently executed task number in each thread array. For example, as shown in FIG. 5, when the concurrently executed task number is two, the parallel processing device as the present exemplary embodiment executes two tasks in one thread array. As a result, the parallel processing device as the present exemplary embodiment becomes possible to concurrently execute a larger number of tasks than the total number of thread arrays. Accordingly, in the parallel processing device as the present exemplary embodiment, it never occurs that processor cores are put into an idle state, which occurs when only the same number of tasks as the total thread array number can be concurrently executed and consequently the memory access latency cannot be hidden. Therefore, the parallel processing device as the present exemplary embodiment can execute a larger number of threads by fully utilizing the processor cores which is otherwise idled, and thereby can perform parallel processing of a larger number of tasks. As a result, the parallel processing device as the present exemplary embodiment can improve the operating rate of each core and thereby reduce the whole processing time.

Second Exemplary Embodiment

Next, a second exemplary embodiment of the present invention will be described in detail with reference to drawings. Here, in each of the drawings referred to in the description of the present exemplary embodiment, to the same configurations as and steps of operations similar to those in the first exemplary embodiment of the present invention, the respective same signs are given, and their detail descriptions are omitted in the present exemplary embodiment.

Figure 6:
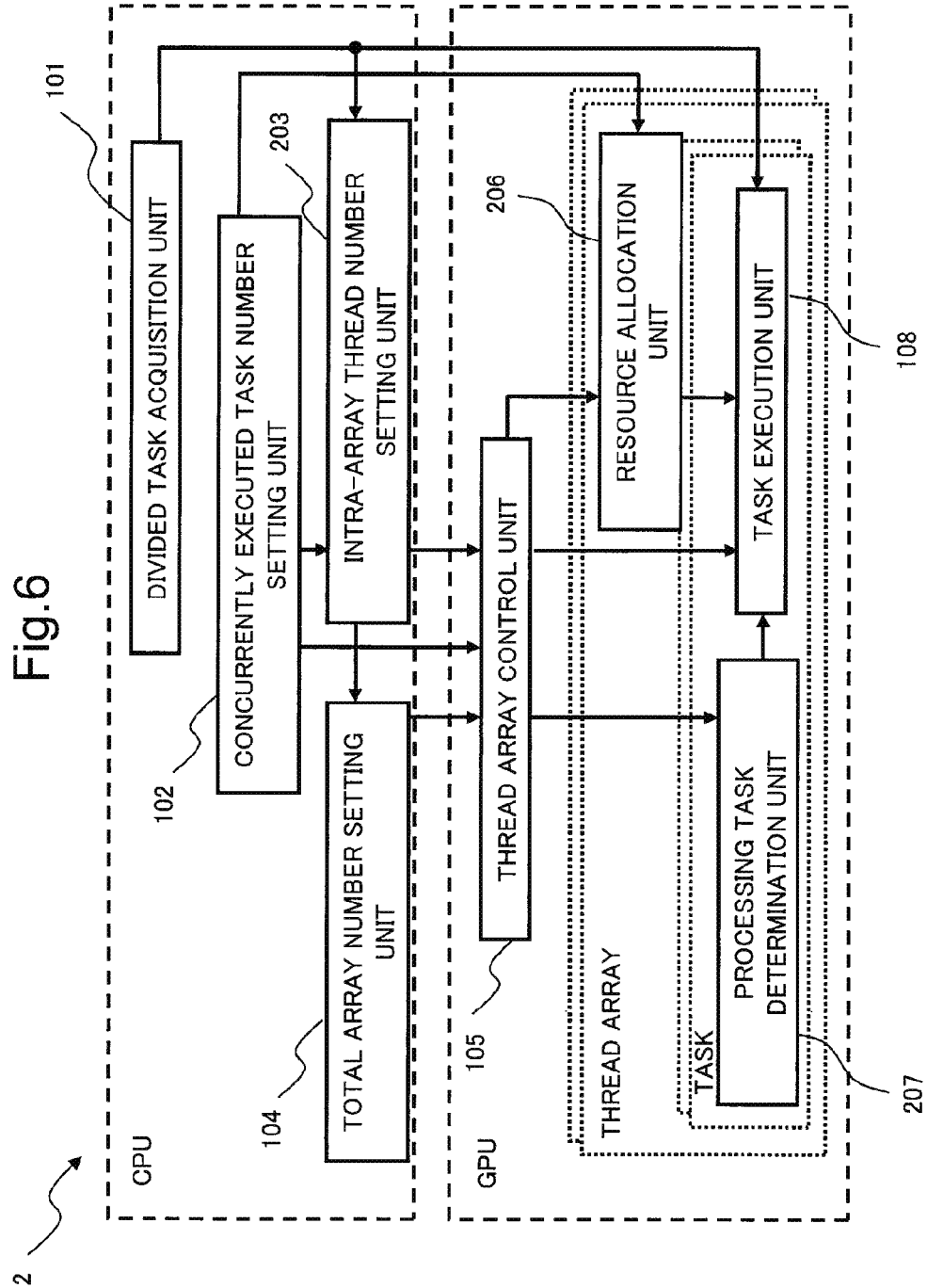
FIG. 6 is a functional block diagram of a parallel processing device as a second exemplary embodiment of the present invention.

First, with reference to FIG. 6, a description will be given of a functional block configuration of a parallel processing device 2 as the second exemplary embodiment of the present invention. A hardware configuration of the parallel processing device 2 is similar to the parallel processing device 1 as the first exemplary embodiment of the present invention, and accordingly its description is omitted in the present exemplary embodiment. The parallel processing device 2 is different from the parallel processing device 1 as the first exemplary embodiment of the present invention in that it comprises an intra-array thread number setting unit 203 in place of the intra-array thread number setting unit 103, a resource allocation unit 206 in place of the resource allocation unit 106, and a processing task determination unit 207 in place of the processing task determination unit 107.

The intra-array thread number setting unit 203 sets a thread configuration expressed in a multidimensional form which is configured by adding a task determination dimension to dimensions for expressing a configuration of threads necessary for processing each task. Here, the task determination dimension is a dimension for identifying a task to be processed by each thread. The size of the task determination dimension is set to be equal to the concurrently executed task number.

For example, in the technology described in Patent Document 1, thread arrays are defined in a multidimensional space, and a multidimensional ID is given to each thread array and each thread. Accordingly, the intra-array thread number setting unit 203 may set the intra-array thread number on the basis of a multidimensional thread configuration which is configured by adding a task determination dimension to dimensions of the thread configuration already described above as that defined in the technology described in Patent Document 1. At that time, the intra-array thread number setting unit 203 may use values in the dimensions based on the original thread configuration for processing tasks as they are and add the task determination dimension.

The processing task determination unit 207 determines a task to be processed by each thread, using a value in the task determination dimension of the thread ID. At that time, using information given in each dimension of the thread ID, the processing task determination unit 207 can determine the location of data to be processed in the corresponding task.

Figure 7:
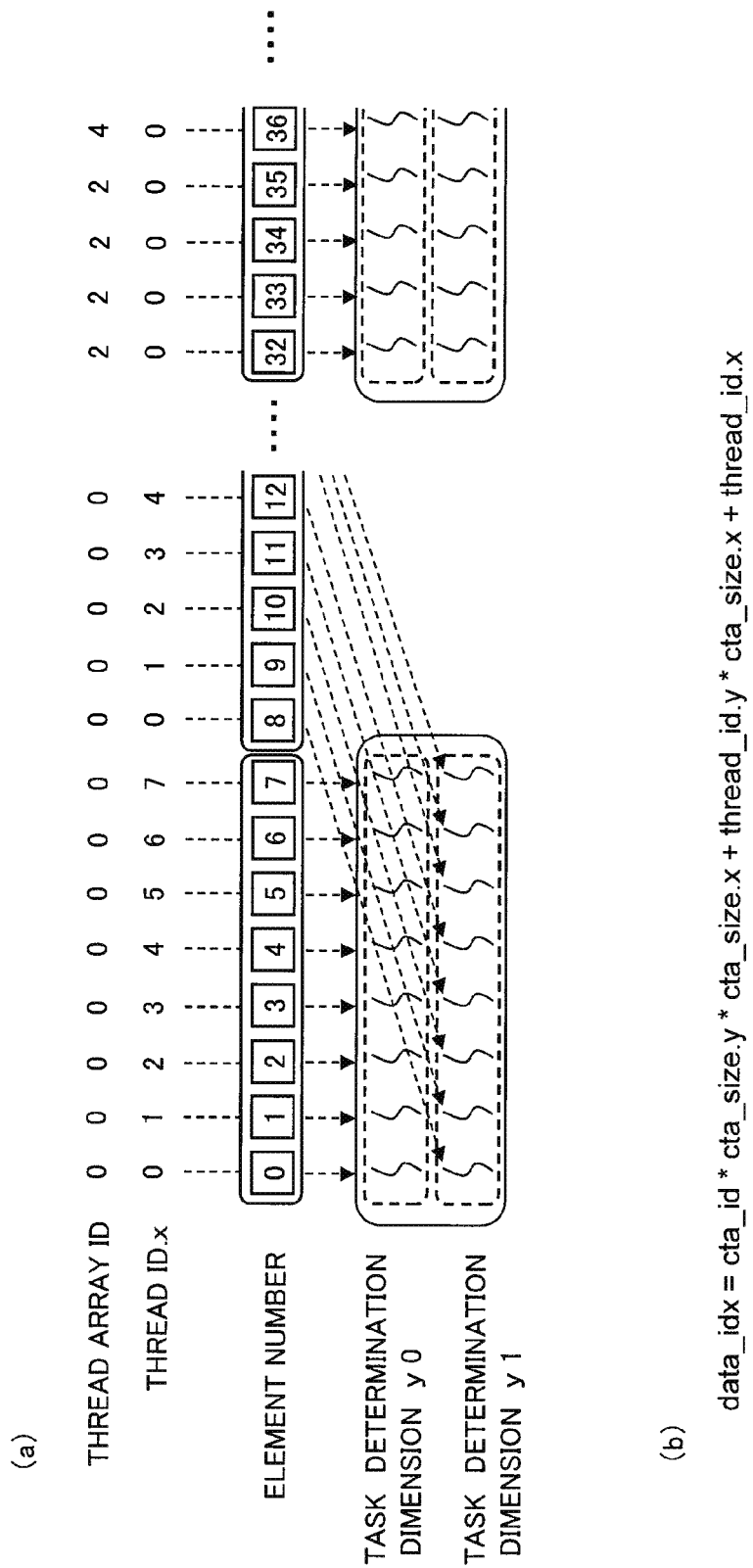
FIG. 7 is a schematic diagram for explaining a task determination dimension in the second exemplary embodiment of the present invention.
Figure 24:
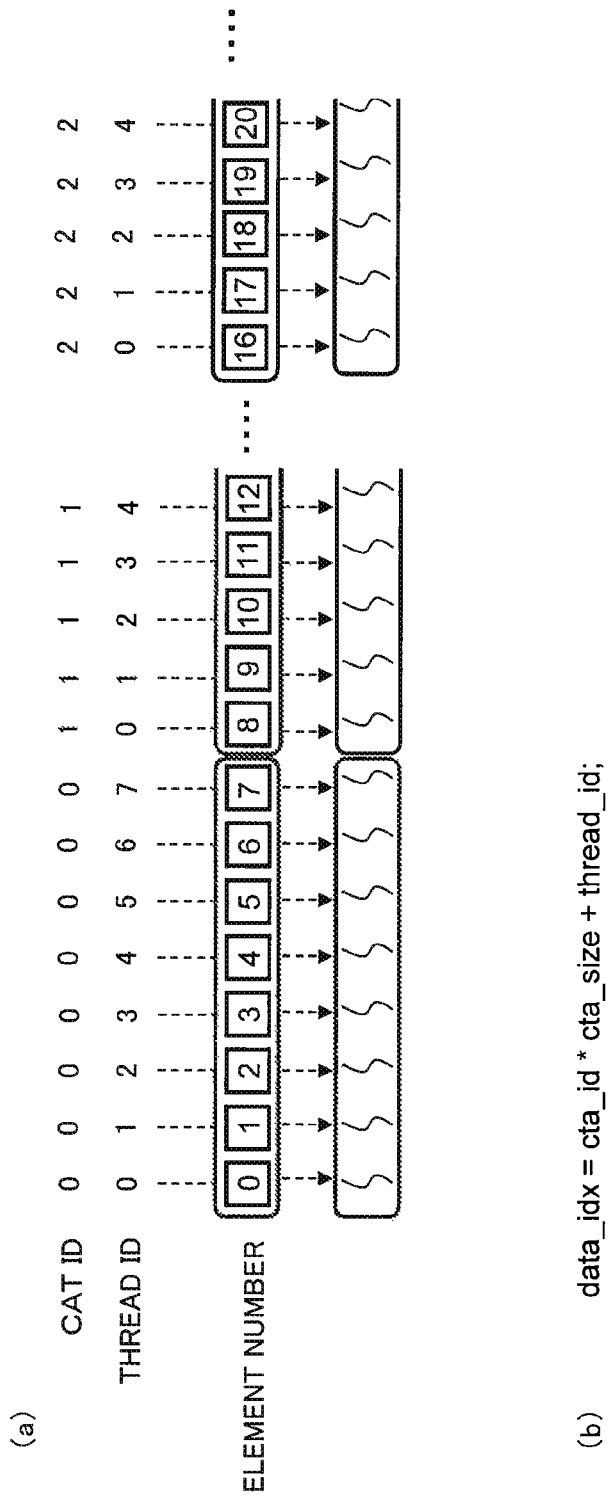
FIG. 24 is a schematic diagram showing an example of threads and thread arrays of one-dimensional configurations in a related technology.

For example, the following description will be given, with reference to FIG. 7, of a case where the thread configuration necessary for processing each task is a one-dimensional one (with only the x-dimension) as shown in FIG. 24 (a). In FIG. 7, it is also assumed that the concurrently executed task number is set at two. In that case, the intra-array thread number setting unit 203 defines the thread configuration in a thread array in two dimensions as (x,y). As shown in FIG. 7 (a), the y-dimension represents the task determination dimension. As shown also in FIG. 7 (a), the size in the x-dimension is eight, and x takes an integer value from 0 to 7. The size in the y-dimension is two, and y takes an integer value between 0 and 1. Then, the intra-array thread number setting unit 203 sets a value obtained by multiplying the size in the x-dimension and that in the y-dimension as the intra-array thread number.

In the example shown in FIG. 7, the processing task determination unit 207 determines a group of threads having thread IDs with the same y value to be those to execute the same task. Then, as shown in FIG. 7(b), the processing task determination unit 207 can determine the element number of data to be processed by a thread, on the basis of the thread array ID, (cta.id), the sizes in the x-dimension and the y-dimension of the thread array, (cta_size.x) and (cta_size.y), and the values in the x-dimension and the y-dimension of the thread ID, (thread id.x) and (thread_id.y).

Figure 25:
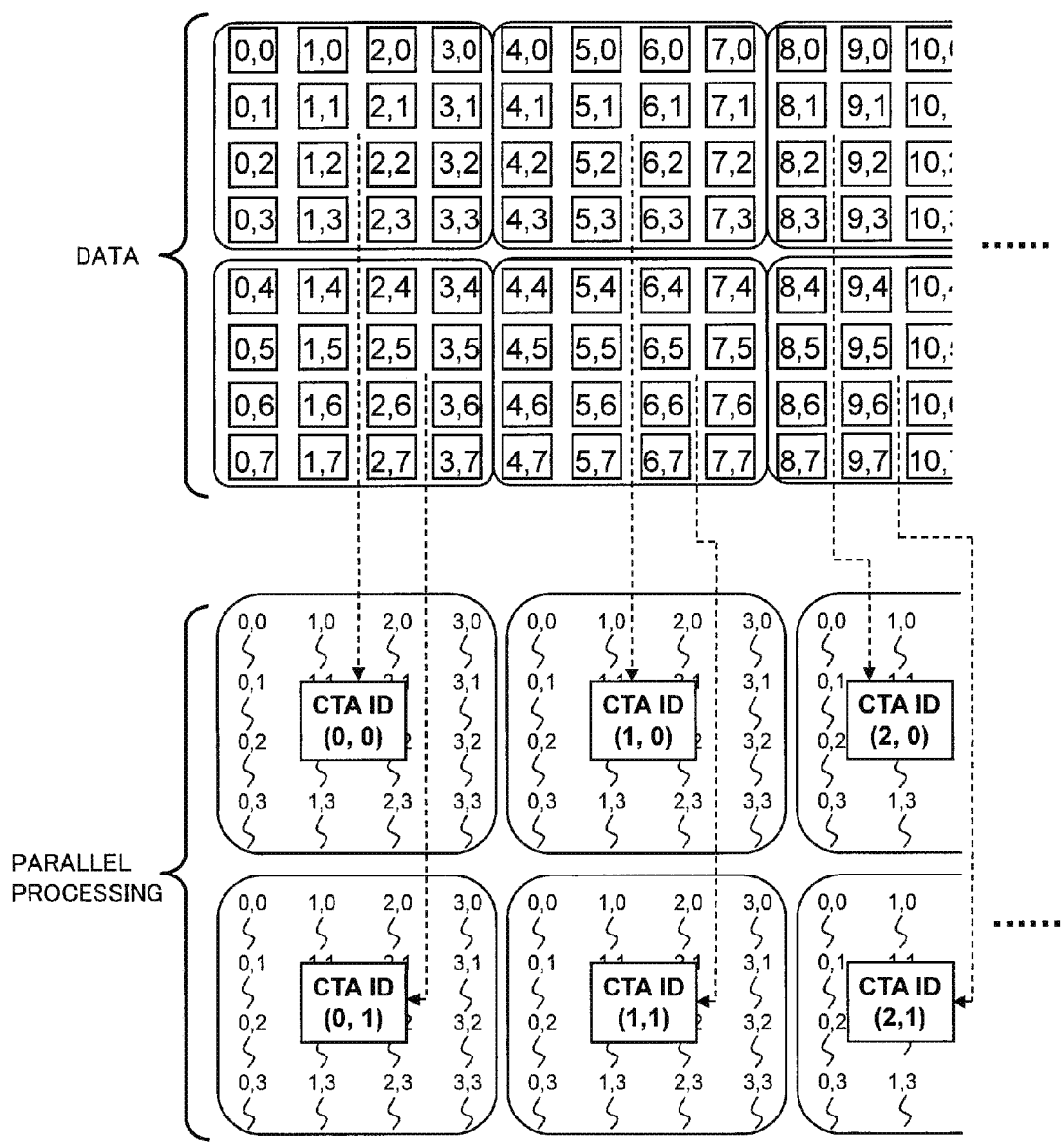
FIG. 25 is a schematic diagram showing an example of threads and thread arrays of two-dimensional configurations in a related technology.
Figure 26:
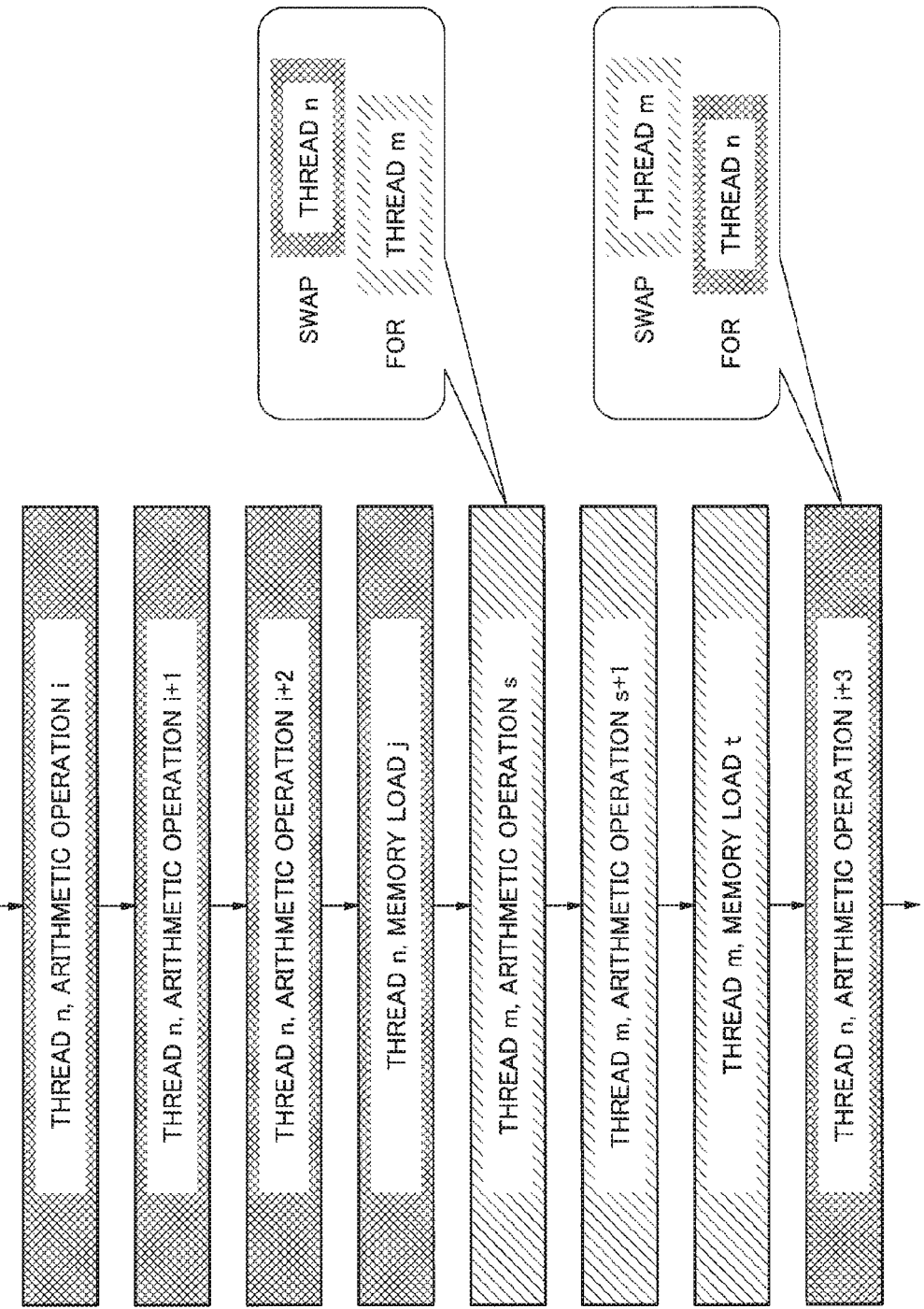
FIG. 26 is a flow chart illustrating a thread swap for hiding memory access latency in a related technology.
Figure 27:
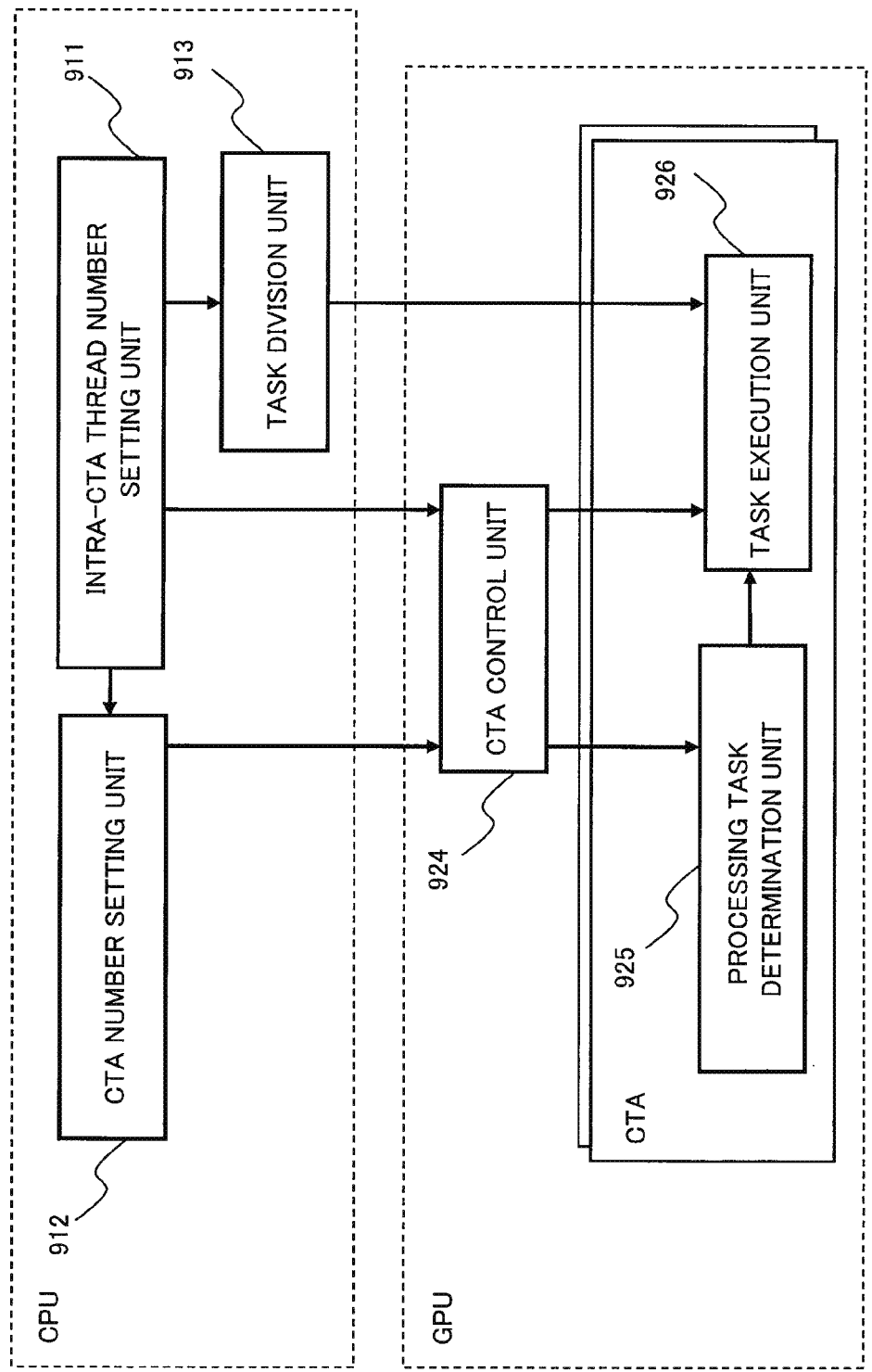
FIG. 27 is a block diagram showing a configuration of a parallel processing device of a related technology.
Figure 28:
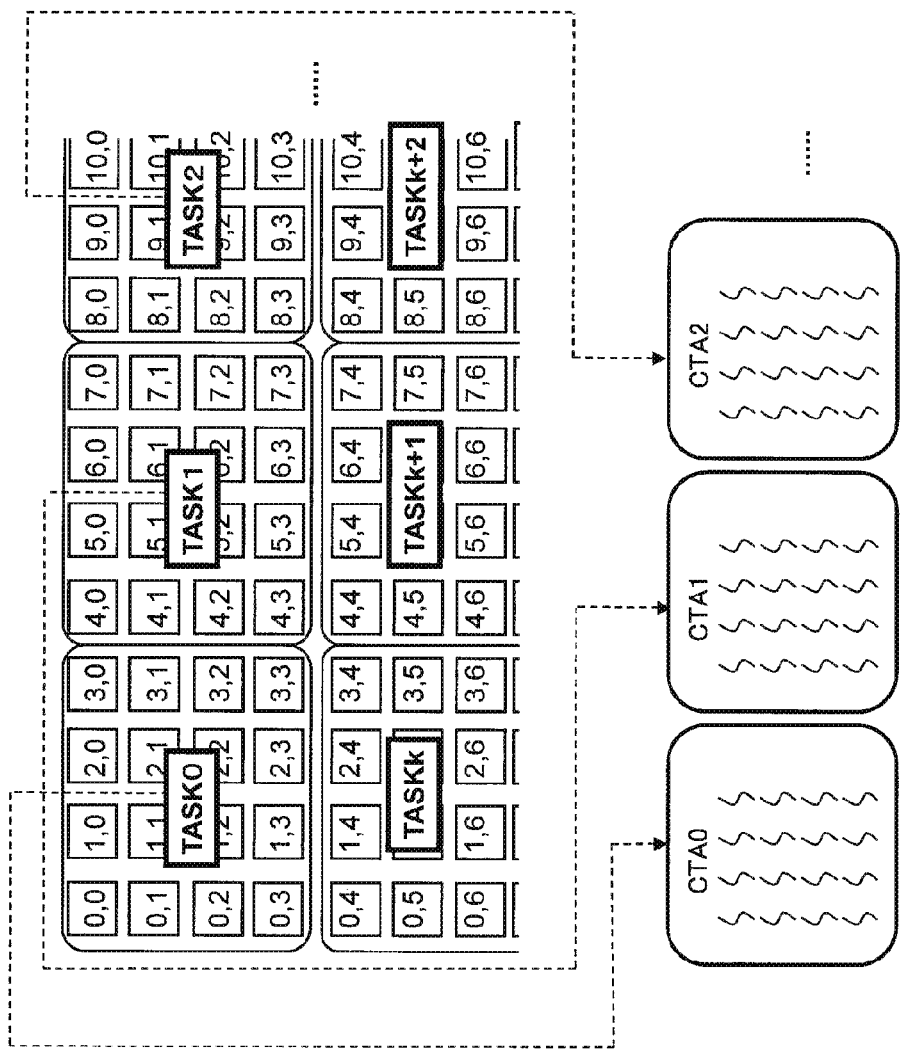
FIG. 28 is a diagram illustrating a mapping relation between tasks and CTAs in a related technology.
Figure 29:
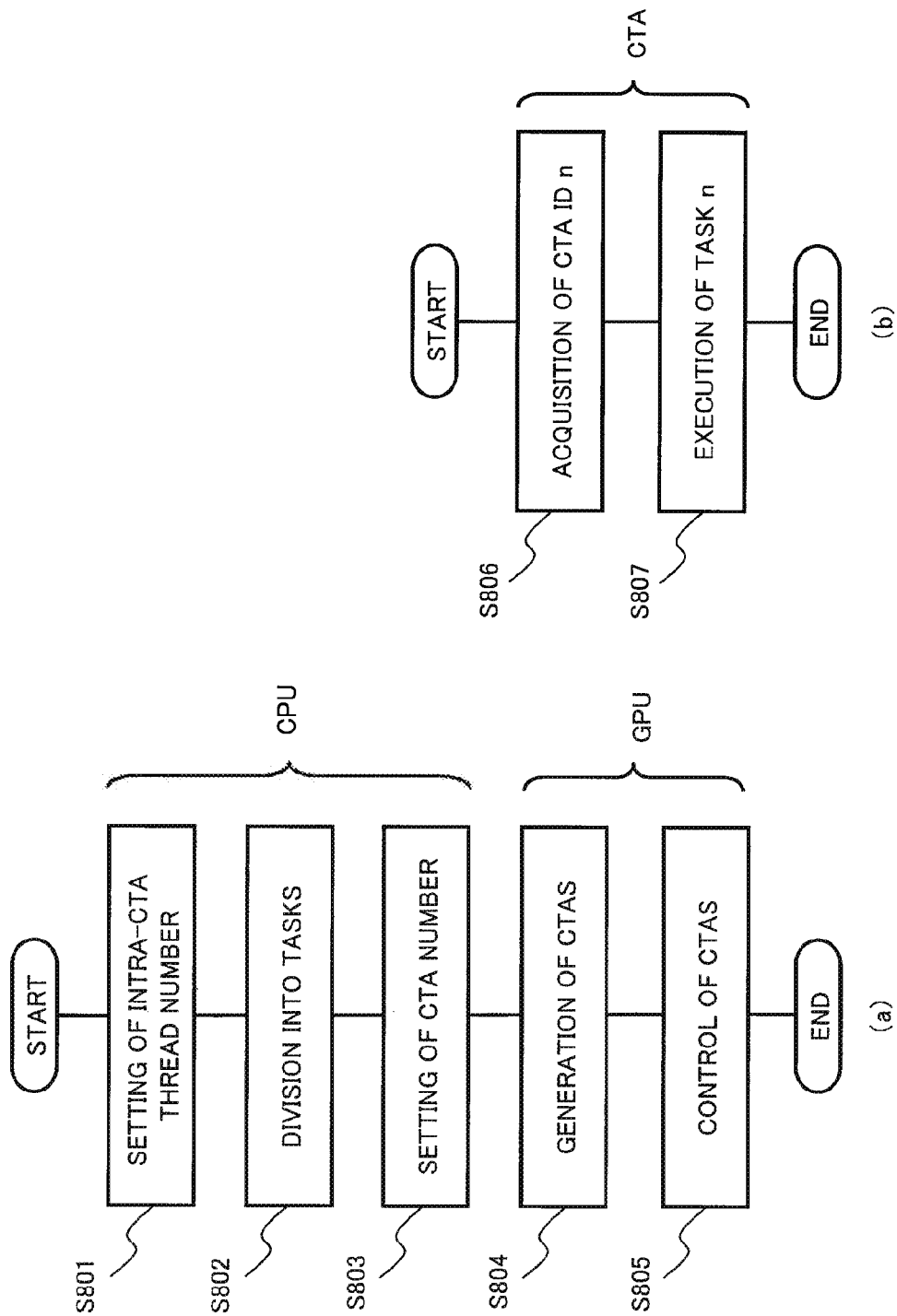
FIG. 29 is a flow chart showing operation of a parallel processing device of a related technology.
Figure 30:
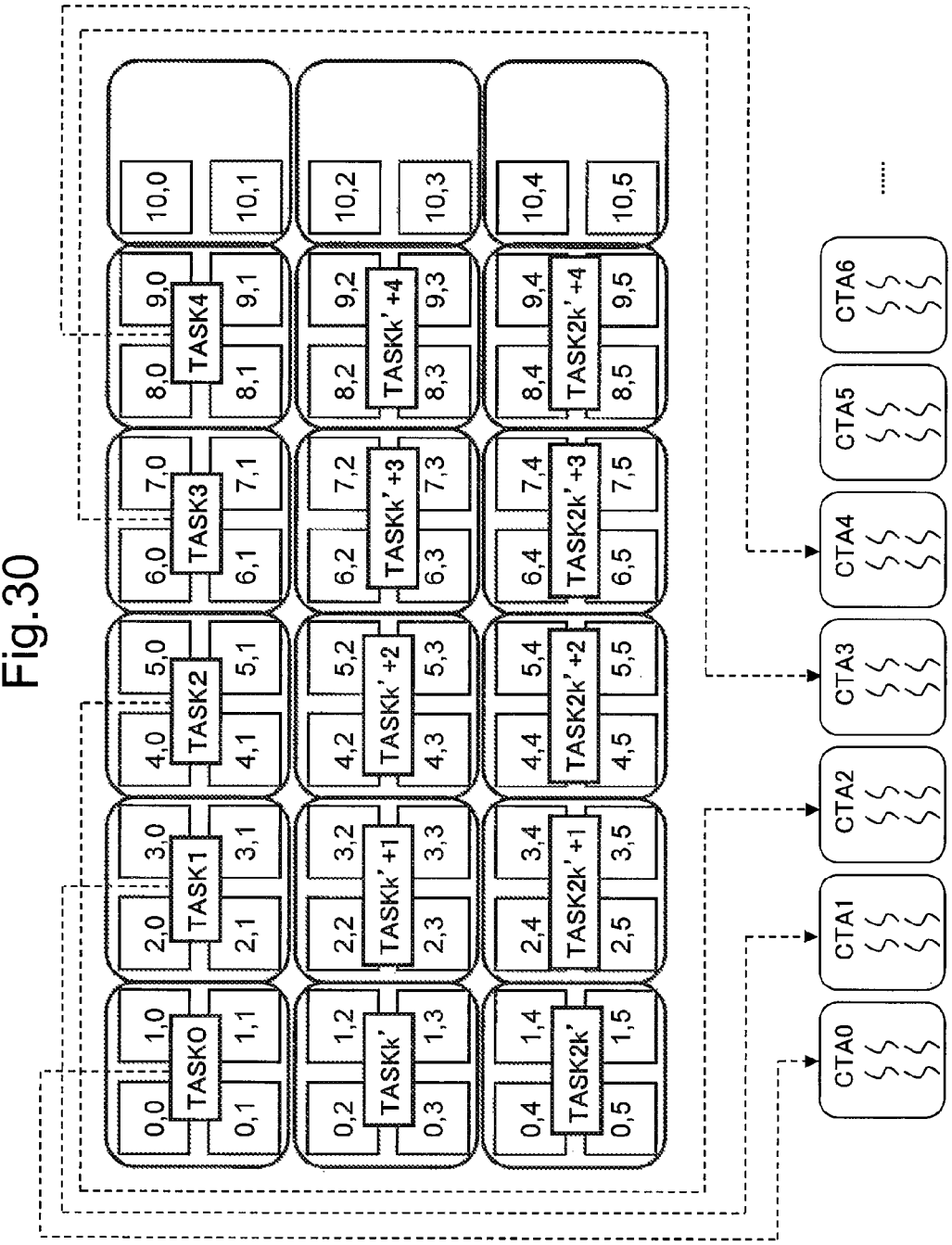
FIG. 30 is a diagram illustrating a mapping relation between tasks and CTAs when the task size is reduced in a related technology.
Figure 31:
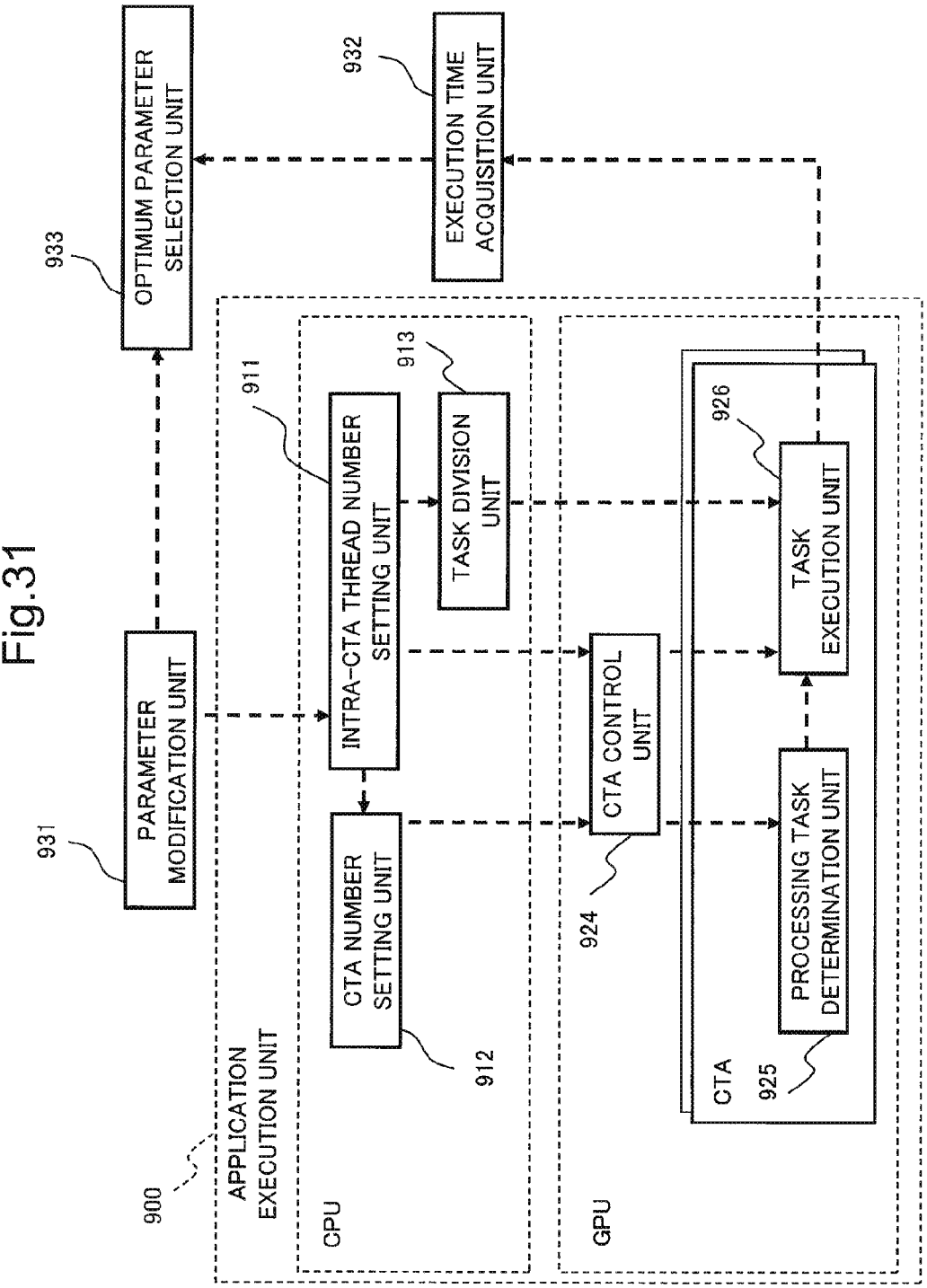
FIG. 31 is a block diagram showing a configuration of a parallel processing device of a related technology.
Figure 32:
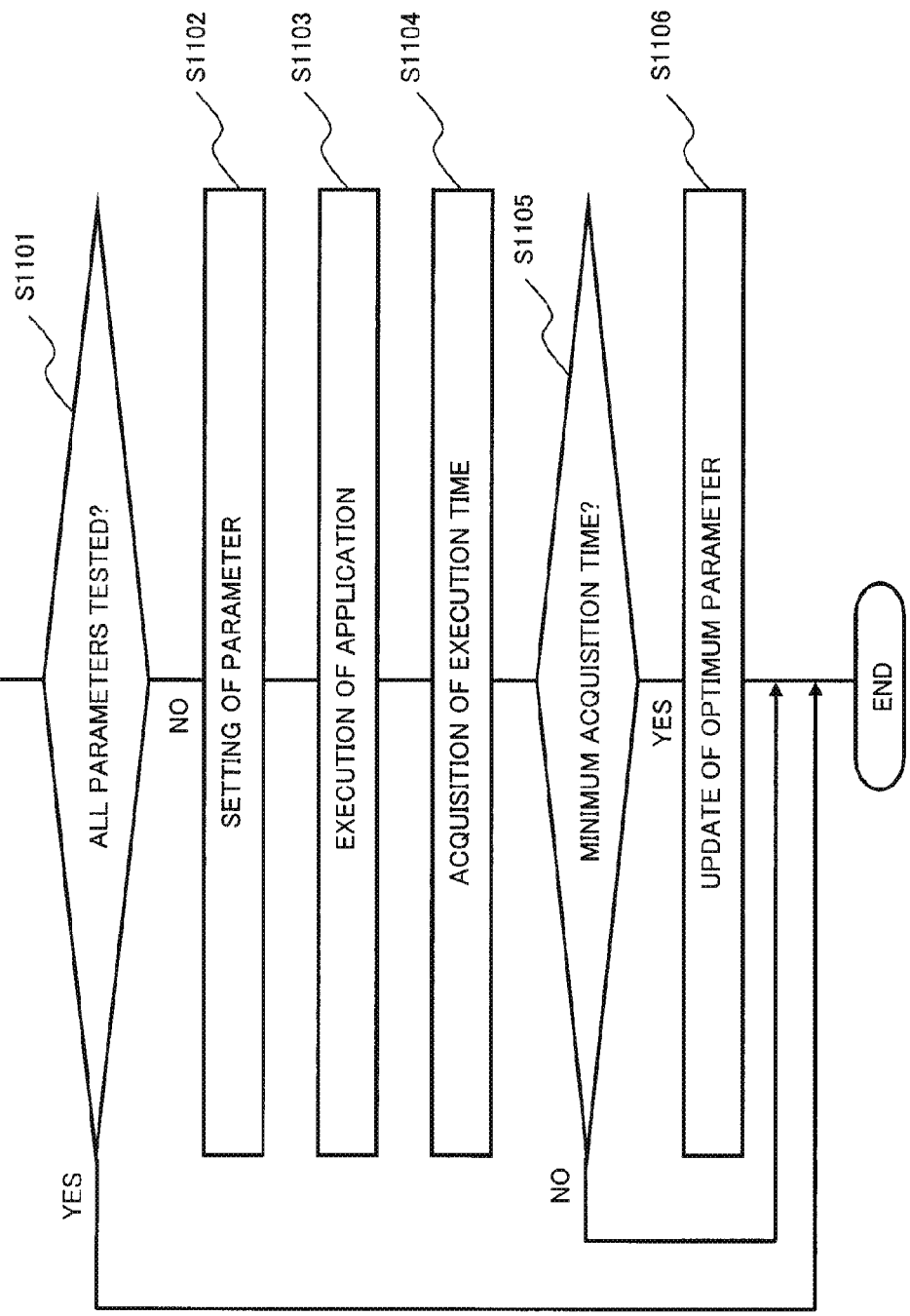
FIG. 32 is a flow chart illustrating operation of the parallel processing device of a related technology.
Figure 33:
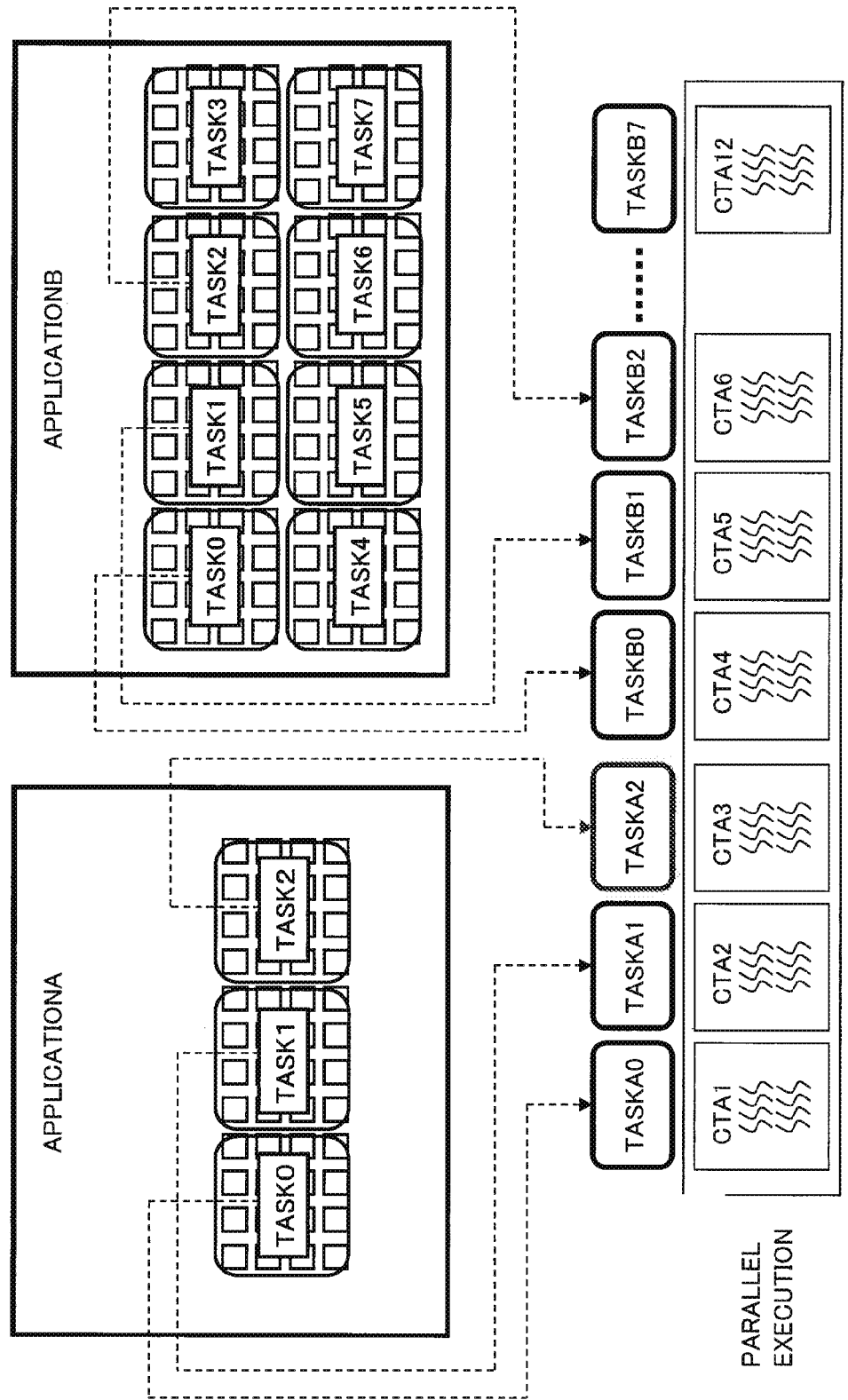
FIG. 33 is a schematic diagram for explaining that a plurality of applications are merged and executed in a related technology.
Figure 34:
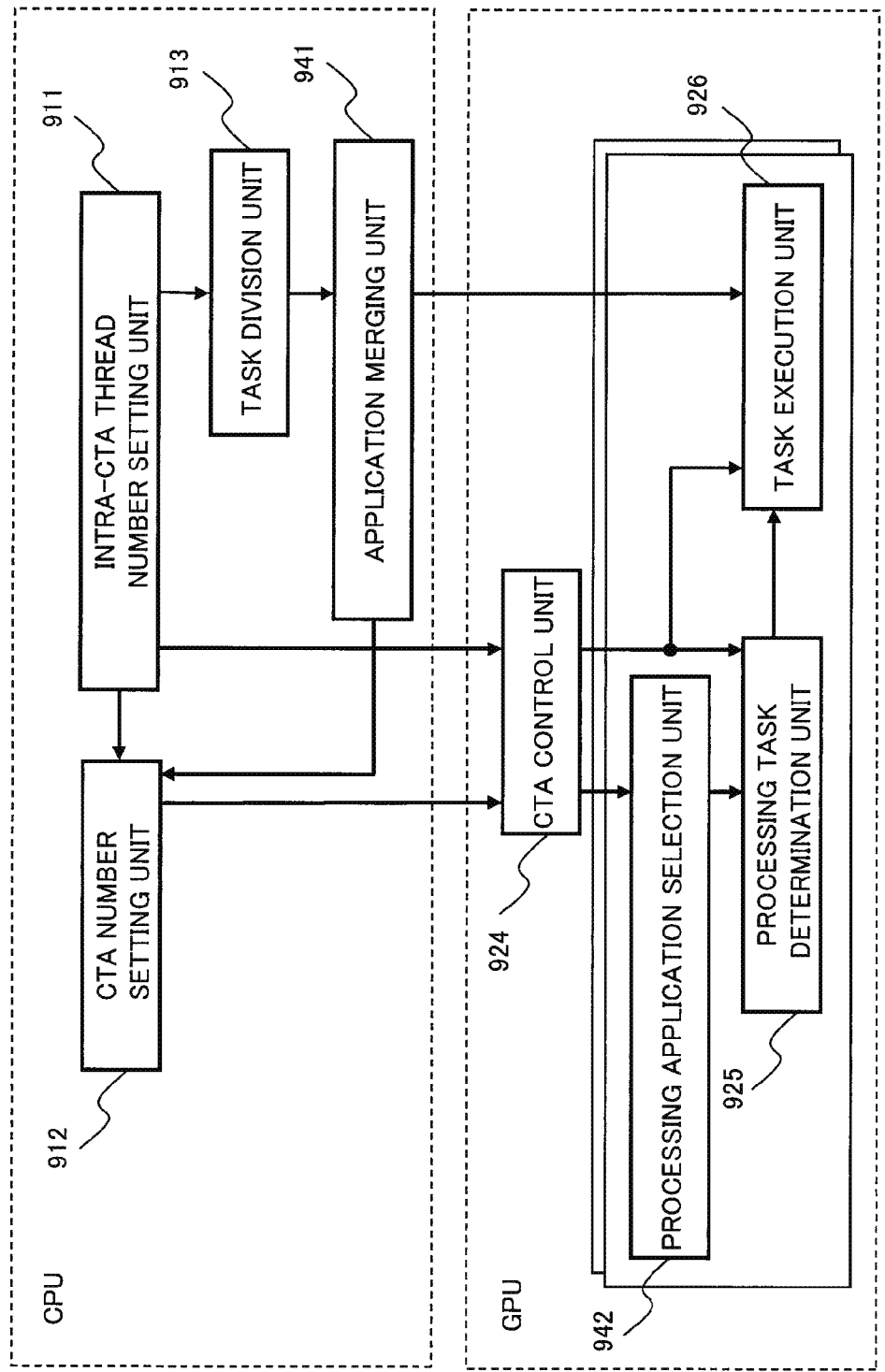
FIG. 34 is a block diagram showing a configurations of a parallel processing device of a related technology.
Figure 35:
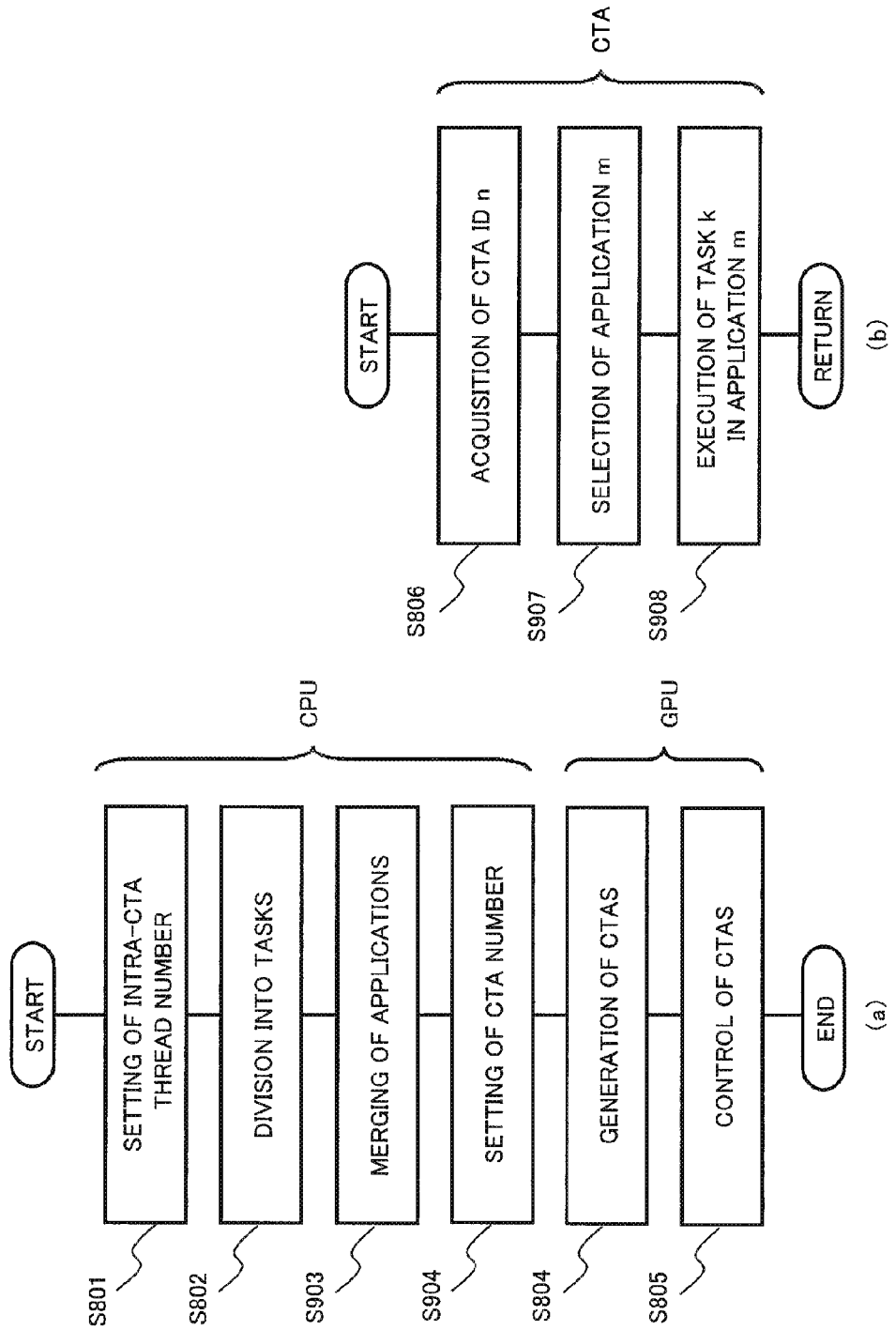
FIG. 35 is a flow chart illustrating operation of the parallel processing device of a related technology.
Figure 36:
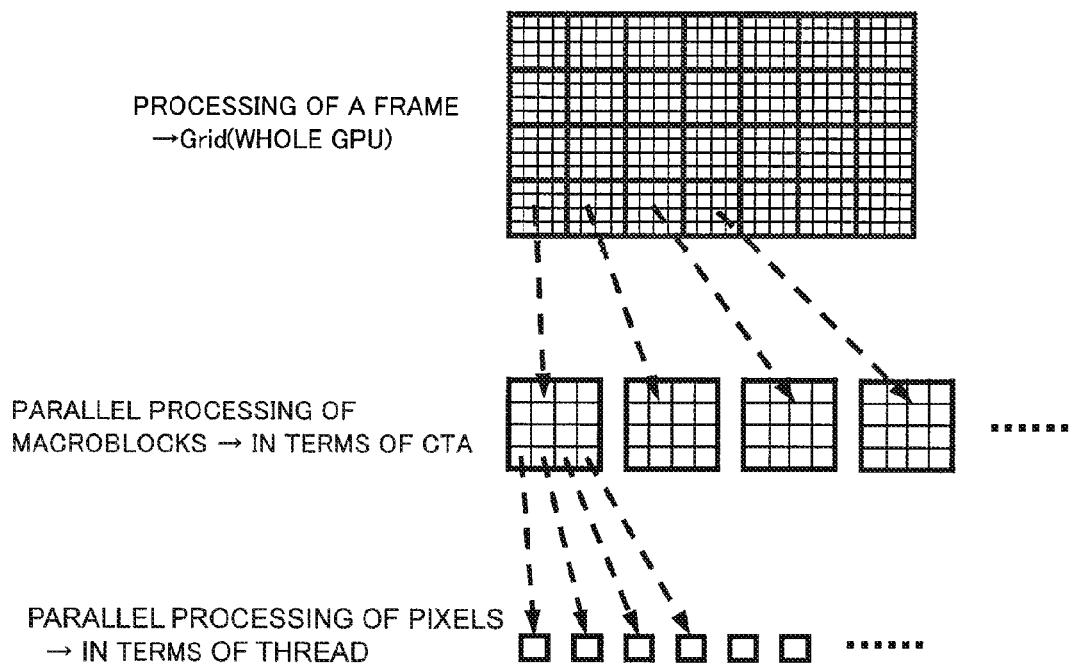
FIG. 36 is a diagram showing an example of hierarchical parallelization in a video image encoding process.
Figure 37:
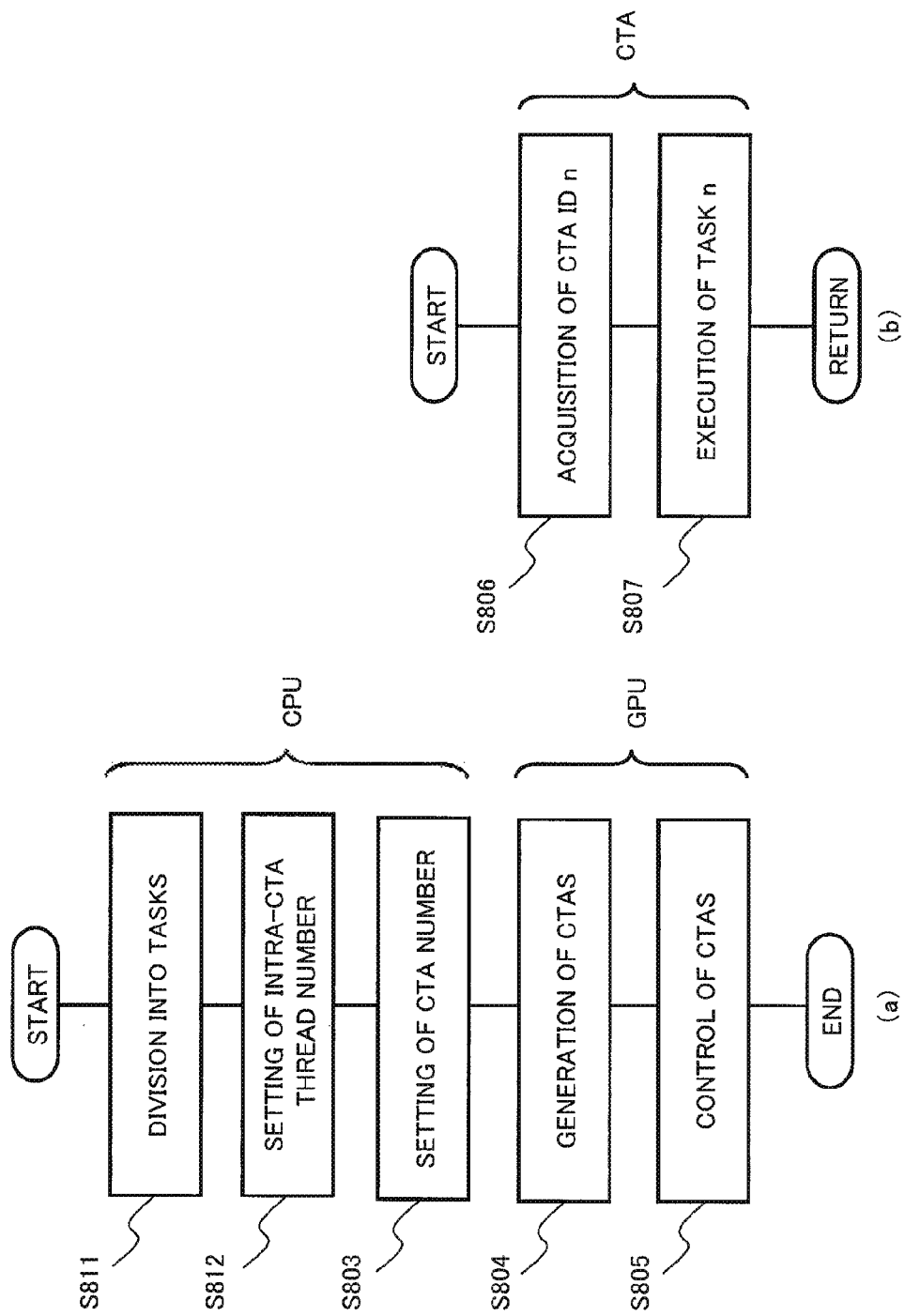
FIG. 37 is a flow chart for explaining a problem in performing a video image encoding process in a related technology.

Further described below is, for example, a case where a thread configuration necessary for processing each task is a two-dimensional one (x,y) as shown in FIG. 25. In that case, the intra-array thread number setting unit 203 defines a thread configuration in a thread array in three dimensions as (x,y,z). The z-dimension represents the task determination dimension. In this case, the processing task determination unit 207 determines a group of threads having thread IDs with the same z value to be those to execute the same task.

In (processing of) each thread array, the resource allocation unit 206 secures resources as an array consisting of the same number of elements as the concurrently executed task number. Then, the resource allocation unit 206 allocates the resources to each task on the basis of the z-dimension value of the thread IDs.

A description will be given below of operation of the parallel processing device 2 configured as above, with reference to FIG. 8. Here, it is assumed that, in FIG. 8, the thread configuration necessary for processing each task is defined in two dimensions as (x,y).

First, the parallel processing device 2 acquires divided tasks and sets the concurrently executed task number, by operating in the steps S101 to S102 similarly to the parallel processing device 1 as the first exemplary embodiment of the present invention. Here, it is assumed that the concurrently executed task number is set at two.

Next, the intra-array thread number setting unit 203 determines the thread configuration in a thread array to be a multidimensional configuration (three dimensional (x,y,z), here) which is configured by adding the task determination dimension (z) to the thread configuration necessary for processing each task (the above-mentioned two-dimensional configuration (x,y)). In the present case, as the concurrently executed task number is set at two, the size in the task determination dimension becomes two (step S203).

Then, by operating in the steps S104 to S106 similarly to the parallel processing device 1 as the first exemplary embodiment of the present invention, the parallel processing device 2 generates thread arrays having the thread configuration determined as above and controls parallel processing of the thread arrays and threads.

Next, a description will be given, with reference to FIG. 9, of operation of the parallel processing device 1 in each of the thread arrays, which is controlled by the thread array control unit 105. Here, it is assumed that the value in the z-dimension of each thread ID takes 0 or 1.

First, similarly to the processing task determination unit 107 in the first exemplary embodiment of the present invention, the processing task determination unit 207 acquires, in each thread array, the thread array ID and the thread IDs of the threads contained in the thread array (step S107).

Next, in each thread array, the resource allocation unit 206 secures resources as an array consisting of the same number of elements as the concurrently executed task number, and allocates the secured resources to threads to execute each task, on the basis of the values in the z-dimension of their thread IDs (step S208). For example, to threads of a thread ID having 0 as its z-dimension value, the resources corresponding to the element numbered 0 of the resource array is allocated.

Next, the processing task determination unit 207 determines a task to be processed by each task on the basis of the z-dimension value of its thread ID. In the present case, the processing task determination unit 207 determines whether or not the z-dimension value of the thread ID is 0 (step S209).

If the z-dimension value of the thread ID is 0, the processing task determination unit 207 determines the task number of a task to be processed by the thread to be 2n. Here, n is the thread array ID acquired in the step S107. At the same time, the processing task determination unit 207 also determines the location of data to be processed by the thread through the task 2n. Then, the task execution unit 108 causes the thread to execute the task 2n using the allocated resources (step S110).

On the other hand, if the z-dimension value of the thread ID is not 0, the processing task determination unit 207 determines the task number of a task to be processed by the thread to be 2n+1. At the same time, the processing task determination unit 207 also determines the location of data to be processed by the thread through the task 2n+1. Then, the task execution unit 108 causes the thread to execute the task 2n+1 using the allocated resources (step S111).

Figure 8:
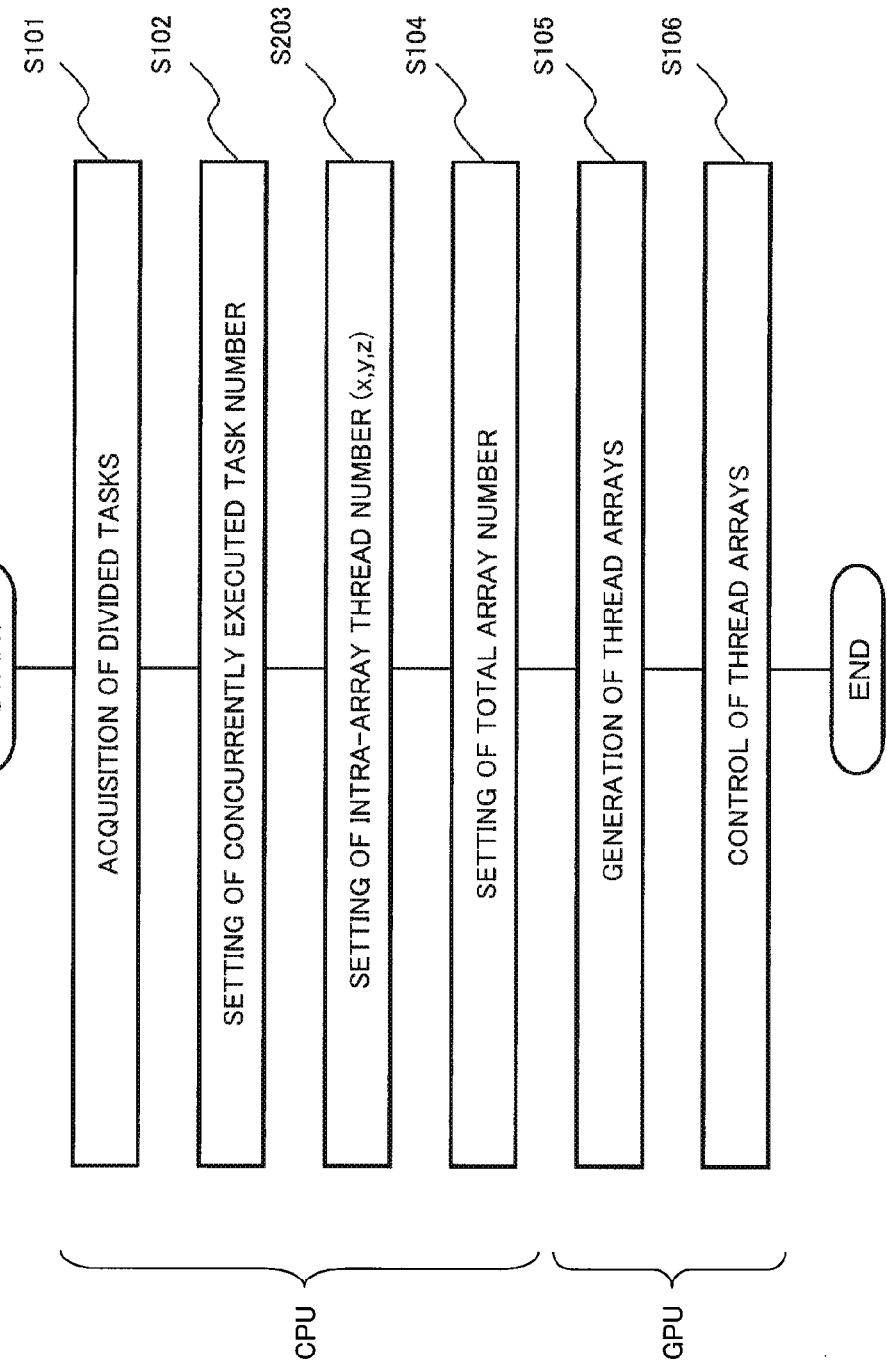
FIG. 8 is a flow chart illustrating operation of the parallel processing device as the second exemplary embodiment of the present invention.
Figure 9:
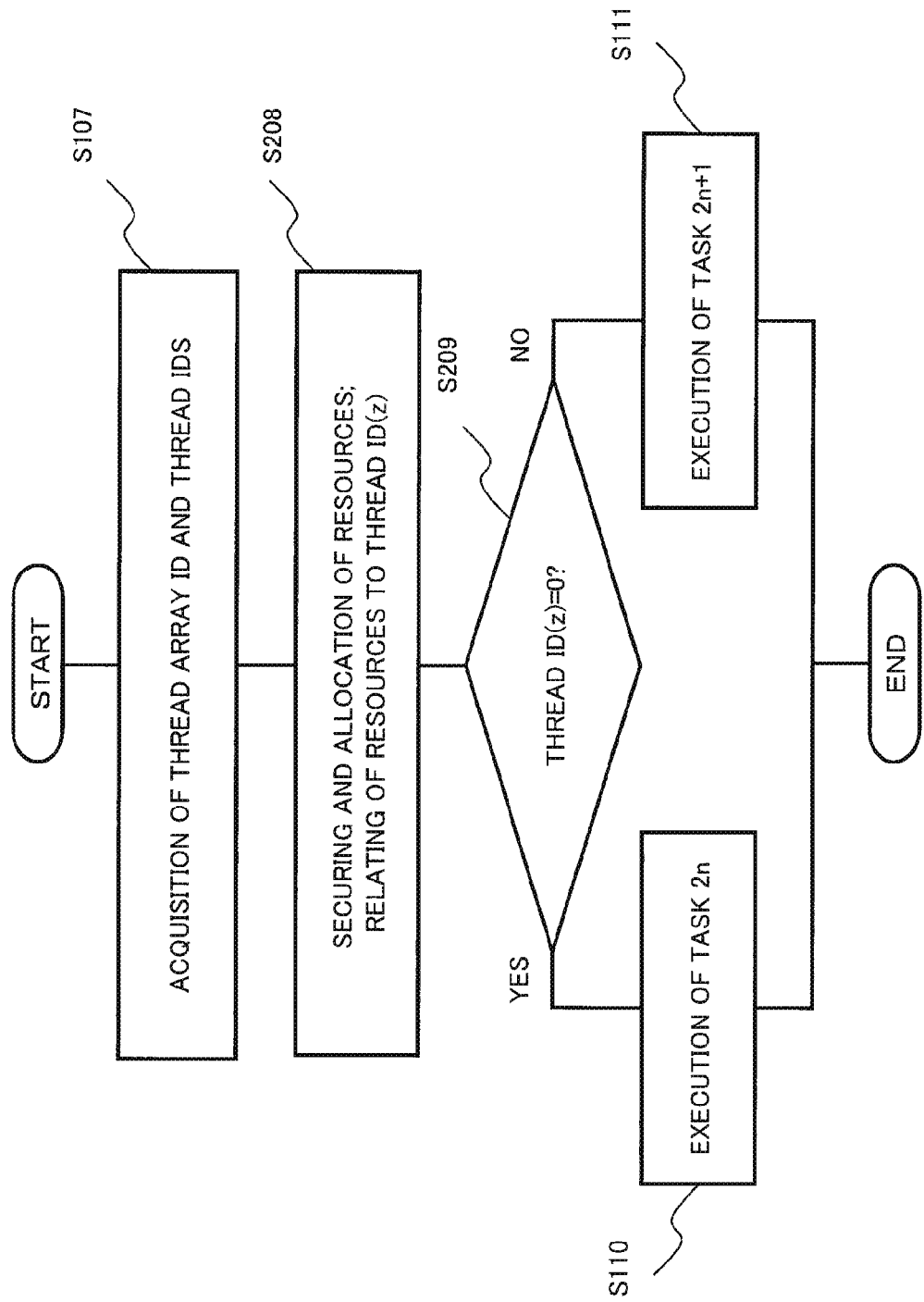
FIG. 9 is a flow chart as a continuation of FIG. 8.

Here, in FIGS. 8 and 9, the steps S101, S102, S203 and S104 are carried out by the CPU 1001, and the steps S105 to S107, S208, S209, S110 and S111 are carried out by the GPU 1004 or any other many-core accelerators.

With that, the description of operation of the parallel processing device 2 is finished.

Next, in FIG. 10, shown is an example of a computer program stored in the storage device 1005 to cause the parallel processing device 2 to operate in the above-described way. For comparison, FIG. 11 shows an example of a computer program for causing a parallel processing device described in a related technology such as of Patent Document 1 to execute similar parallel processing.

In each of FIGS. 10 and 11, program code for causing the units implemented by the CPU 1001 to function is described in "main". In each of "kernel 1" and "kernel 2", program code for causing the units implemented by the GPU 1004 to function is described.

In FIG. 10, in the first line of the "main", a thread configuration is defined in three dimensions as a result of adding the task determination dimension (z) to the dimensions (x,y) of a thread configuration necessary for processing tasks. Here, it is assumed that the size of the dimensions (x,y) of a thread configuration necessary for processing tasks and the z-dimension size corresponding to the concurrently executed task number are described in a definition file not illustrated in the drawings or are read via the input device 1006. The program code in the first line corresponds to the step S203 in FIG. 8. In contrast, in the related technology shown in FIG. 11, a thread configuration is defined to have the dimensions (x,y) of the thread configuration necessary for processing tasks, in the first line of the "main".

In FIG. 10, in the second line of the "main", a value obtained by dividing the total number of tasks constituting the process of an application, numTask, by the concurrently executed task number z is set as the total array number, numCTA. The program code in this line corresponds to the step S104 in FIG. 8. Here, it is assumed that the total number of tasks constituting the process of an application, numTask, is described in a definition file not illustrated in the drawings or is read via the input device 1006. In contrast, in the related technology shown in FIG. 11, the total number of tasks constituting the process of an application, numTask, itself is set as the total array number, in the second line of the "main".

In FIG. 10, in the first line of the "kernel2", resources are secured as an array of a size equal to the concurrently executed task number z. By executing the code in this line, each thread acquires the address of an element allocated to a task it is to process, among elements of the resource array secured statically. The code in this line corresponds to the step S208 in FIG. 9. In contrast, in the related technology shown in FIG. 11, in the first line of the "kernel 1", resources to be shared within the thread array are secured on a shared memory.

In FIG. 10, in the second line of the "kernel2", the task number task_idx of a task to be processed by a thread, is determined on the basis of the concurrently executed task number, cta_size.z, and the value in the task determination dimension of the thread ID of the thread, thread_id.z, in addition to the x-dimension value of the thread array ID, cta_id.x. The code in this line corresponds to the steps S107 and S209 in FIG. 9. In contrast, in the related technology shown in FIG. 11, in the second line of the "kernel 1", the x-dimension value of the thread array ID, cta_id.x, itself is determined to be the task number task_idx of a task to be processed by the thread.

Further in FIG. 10, in the third line of the "kernel2", it is described to use, at the time of executing a task with the calculated task_idx value, the resources corresponding to an resource array element allocated to the task. Here, the process content of each task is assumed to be described in advance in a definition file not illustrated in the drawings.

The code in this line corresponds to the steps S208, S110 and S111 in FIG. 9. In contrast, in the related technology shown in FIG. 11, it is described in the third line of the "kernel 1" to execute a task with the calculated task_idx value using the secured shared resources.

As has been described above, the computer program (FIG. 10) for causing the parallel processing device 2 as the second exemplary embodiment of the present invention to operate, which is stored in the storage device 1005, is the one obtained by modifying the underlined portions in FIG. 10 from the computer program (in FIG. 11) for causing the parallel processing device of the related technology to operate. There is no need of modifying the process content of each of the tasks into which the process of an application is divided in a manner to enable parallel processing from that in the related technology.

Next, the effect of the second exemplary embodiment of the present invention will be described.

The parallel processing device as the second exemplary embodiment of the present invention can easily improve the operating rate of each core in a processing unit having a plurality of processor cores, in performing a process for which parallelism within a task is low but the number of tasks processable in parallel is large.

The reason is explained as follows. The intra-array thread number setting unit defines, utilizing that the thread configuration of a thread array is defined in a multidimensional space, the thread configuration within a thread array as a multidimensional one which is obtained by adding the task determination dimension to the dimensions of the thread configuration necessary for processing each task. As a result, the processing task determination unit and the task execution unit becomes able to execute a plurality of tasks concurrently by using the task determination dimension. There, the thread configuration for processing each task is the same as that employed also in related technologies, and accordingly, the task execution unit does not need to modify its processes with respect to each task (in particular, the process using the thread IDs). Further, the resource allocation unit secures resources necessary for processing each task as an array of a size equal to the concurrently executed task number, and thereby can easily allocate the resources to be shared within each task on the basis of the indices in the task determination dimension of thread IDs.

Third Exemplary Embodiment

Next, a third exemplary embodiment of the present invention will be described in detail with reference to drawings. Here, in each of the drawings referred to in the description of the present exemplary embodiment, to the same configurations as and steps of operations similar to those in the first exemplary embodiment of the present invention, the respective same signs are given, and their detail descriptions are omitted in the present exemplary embodiment.

Figure 12:
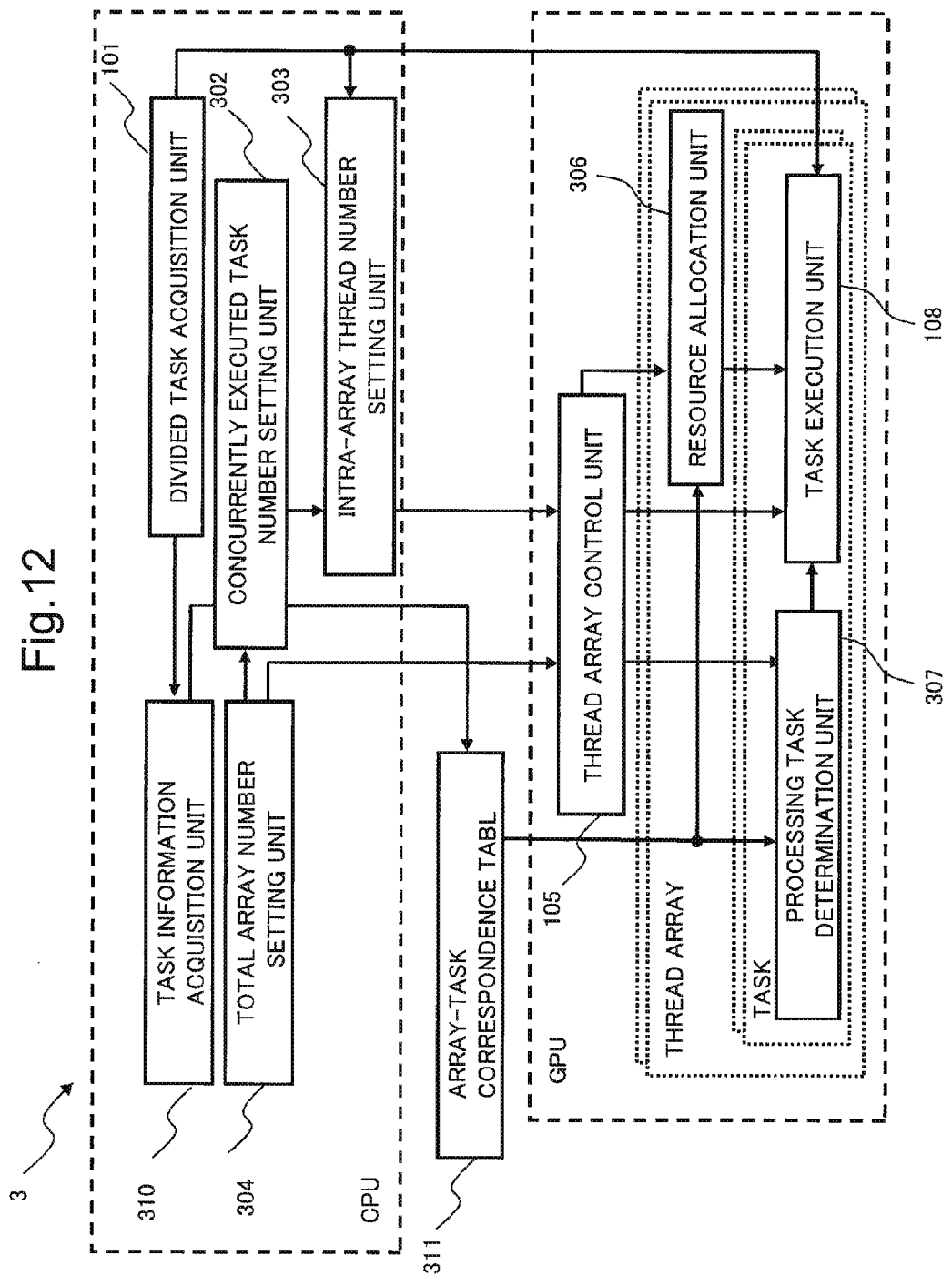
FIG. 12 is a functional block diagram of a parallel processing device as a third exemplary embodiment of the present invention.

First, with reference to FIG. 12, a description will be given of a functional block configuration of a parallel processing device 3 as the third exemplary embodiment of the present invention. A hardware configuration of the parallel processing device 3 is similar to the parallel processing device 1 as the first exemplary embodiment of the present invention, and accordingly its description is omitted in the present exemplary embodiment. In FIG. 12, the parallel processing device 3 is different from the parallel processing device 1 as the first exemplary embodiment of the present invention in that it comprises a concurrently executed task number setting unit 302 in place of the concurrently executed task number setting unit 102, an intra-array thread number setting unit 303 in place of the intra-array thread number setting unit 103, a total array number setting unit 104 in place of the total array number setting unit 304, a resource allocation unit 306 in place of the resource allocation unit 106, and a processing task determination unit 307 in place of the processing task determination unit 107, and further comprises a task information acquisition unit 310 and an array-task correspondence table 311. Here, the task information acquisition unit 310 is implemented by the CPU 1001. The CPU 1001 reads a computer program module and various sorts of information stored in the ROM 1003 or the storage device 1005, and executes the computer program using the RAM 1002 as a working area. The array-task correspondence table 311 is implemented by the RAM 1002 or the storage device 1005. The concurrently executed task number setting unit 302 constitutes, in combination with the task information acquisition unit 310 and the array-task correspondence table 311, a concurrently executed task number setting unit in the present invention.

The task information acquisition unit 310 acquires task information related to each task acquired by the divided task acquisition unit 101. For example, the task information may be information representing the load of each task.

The total array number setting unit 304 sets the total number of thread arrays used in parallel processing of an application to be processed. For example, the total array number may be set at a value which is calculated on the basis of the number of processor cores comprised in the GPU 1004 and is acquired via the input device 1006. For example, when employing a device targeted by CUDA described in Non-patent Document 3 as the GPU 1004, it is preferable to set the total array number at a multiple of the number of Streaming Multiprocessors (SMs). If done so, when the load per thread array is uniform, the load per SM also becomes uniform.

The concurrently executed task number setting unit 302 sets a specific concurrently executed task number for each thread array. For example, the concurrently executed task number setting unit 302 allocates tasks to the same number of thread arrays as the number set by the total array number setting unit 304, using the task load information acquired by the task information acquisition unit 310. For example, the concurrently executed task number setting unit 302 may allocate tasks with a lower load collectively to one thread array. The concurrently executed task number setting unit 302 may also allocate a task with a higher load to one thread array. In this way, the concurrently executed task number setting unit 302 may allocate the tasks to the thread arrays such that the load becomes the same for every thread array.

Further, the concurrently executed task number setting unit 302 records each correspondence relationship between a thread array and tasks allocated to the thread array into the array-task correspondence table 311. That is, the array-task correspondence table 311 stores information representing which thread array is to execute how many and which tasks.

The intra-array thread number setting unit 303 sets the intra-array thread number with respect to each thread array, according to the number of concurrently executed tasks allocated to the thread array.

The processing task determination unit 307 determines, for each thread, a task to be processed by the thread, on the basis of the array-task correspondence table 311, the thread array ID and the thread ID.

For each thread array, the resource allocation unit 306 acquires the number of tasks related to the thread array on the basis of the array-task correspondence table 311, and secures resources necessary for processing the acquired number of tasks.

A description will be given below, with reference to FIG. 13, of operation of the parallel processing device 3 configured as above.

First, subsequently to acquisition of information representing tasks created by dividing the process of an application into them (step S101), the total array number setting unit 304 sets the total array number (step S302). For example, the total array number setting unit 304 may set a value acquired via the input device 1006 as the total array number.

Next, the task information acquisition unit 310 acquires task information related to each of the divided tasks (step S303). For example, as each piece of task information, the task information acquisition unit 310 may acquire an estimated value, not the actual value, of the load of the task.

Next, the concurrently executed task number setting unit 302 allocates tasks to each thread array on the basis of the task information acquired as above. Then, the concurrently executed task number setting unit 302 records which thread array is to execute how many and which tasks into the array-task correspondence table 311 (step S304).

Next, by referring to the array-task correspondence table 311, the intra-array thread number setting unit 303 acquires the concurrently executed task number for each thread array. Then, the intra-array thread number setting unit 303 may determine the thread configuration within a thread array, in a similar way to that of the intra-array thread number setting unit 203 in the second exemplary embodiment of the present invention, to be a multidimensional configuration (in three dimensions as (x, y, z), here) obtained by adding a task determination dimension (z, here) to the thread configuration necessary for processing each task (two-dimensional configuration (x, y), here). In each thread array, the size of the task determination dimension is equal to the value of the concurrently executed task number for the thread array (step S305).

Next, the thread array control unit 105 generates thread arrays and threads on the basis of the set total array number and the set thread configuration of each thread array. Then, the thread array control unit 105 gives a thread array ID and a thread ID to each of the thread arrays and each of the threads, thus generated, respectively (step S105).

Then, the thread array control unit 105 controls parallel processing of the generated threads and thread arrays (step S106).

Figure 14:
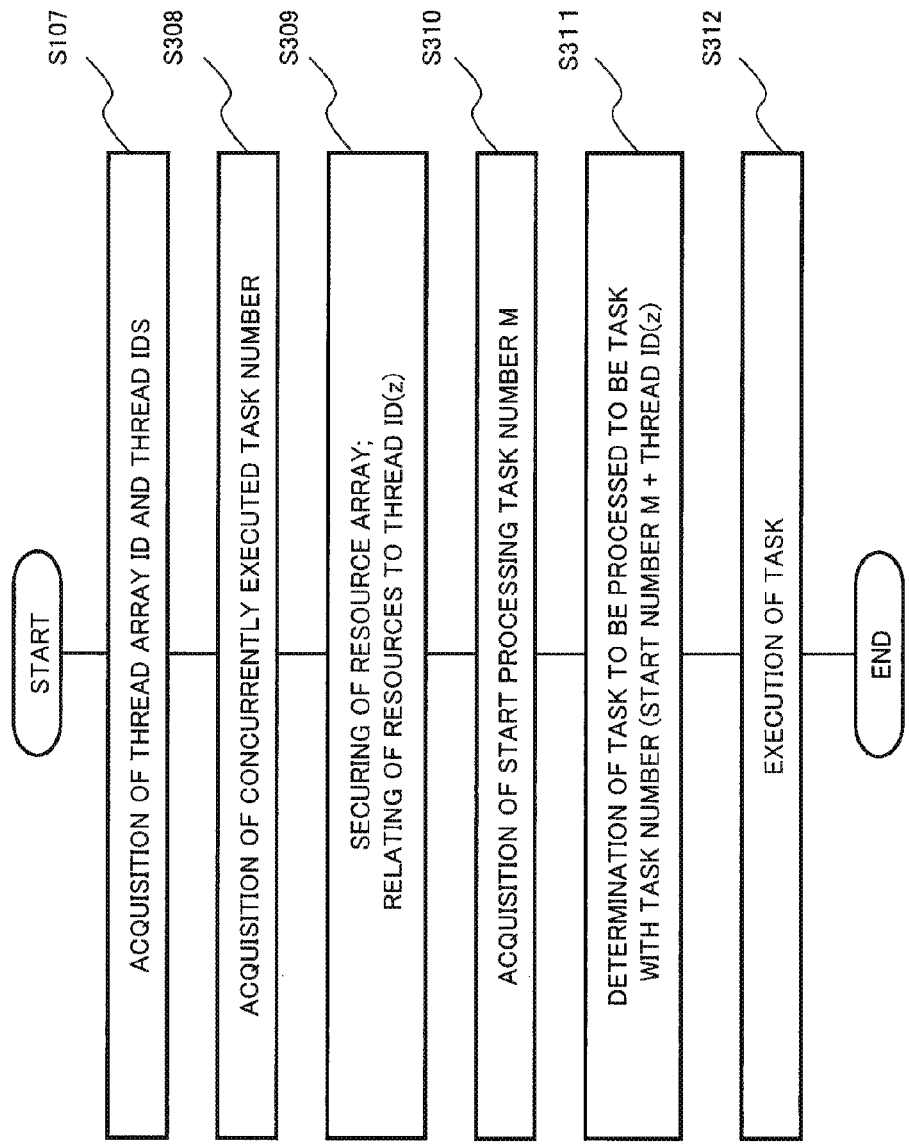
FIG. 14 is a flow chart as a continuation of FIG. 13.

Next, a description will be given of operation of the parallel processing device 3 in each thread array, which is controlled by the thread array control unit 105, with reference to FIG. 14. Here, it is assumed that, in the array-task correspondence table 311, the task numbers of tasks related to one thread array are given as consecutive numbers. It is also assumed that, of each thread ID, the value in the task determination dimension is an integer equal to or larger than zero and smaller than the concurrently executed task number.

First, in each thread array, the processing task determination unit 207 acquires the thread array ID and the thread IDs, similarly to the processing task determination unit 107 in the first exemplary embodiment of the present invention (step S107).

Next, by referring to the array-task correspondence table 311, the resource allocation unit 306 acquires the concurrently executed task number of the thread array (step S308).

Then, in each thread array, the resource allocation unit 306 secures resources as an array with a size equal to the acquired concurrently executed task number of the thread array. The resource allocation unit 306 allocates the secured resources, with respect to each task, to each thread to process the task according to the z-dimension value of the thread ID (step S309).

Next, by referring to the array-task correspondence table 311, the processing task determination unit 307 acquires a start task number m of the tasks to be processed in the thread array (Step S310).

Then, the processing task determination unit 307 determines a task to be processed by each thread to be the task of a task number obtained by adding the value in the task determination dimension of the thread ID to the start task number m (step S311).

Next, the task execution unit 108 causes each thread to execute the task of the task number thus determined by the processing task determination unit 307 (step S312).

With that, the description of operation of the parallel processing device 3 is finished.

Next, the effect of the third exemplary embodiment of the present invention will be described.

The parallel processing device as the third exemplary embodiment of the present invention can equalize processing times of processor cores and reduce the whole processing time, in performing a process for which parallelism within a task is low but the number of tasks processable in parallel is large.

Figure 15:
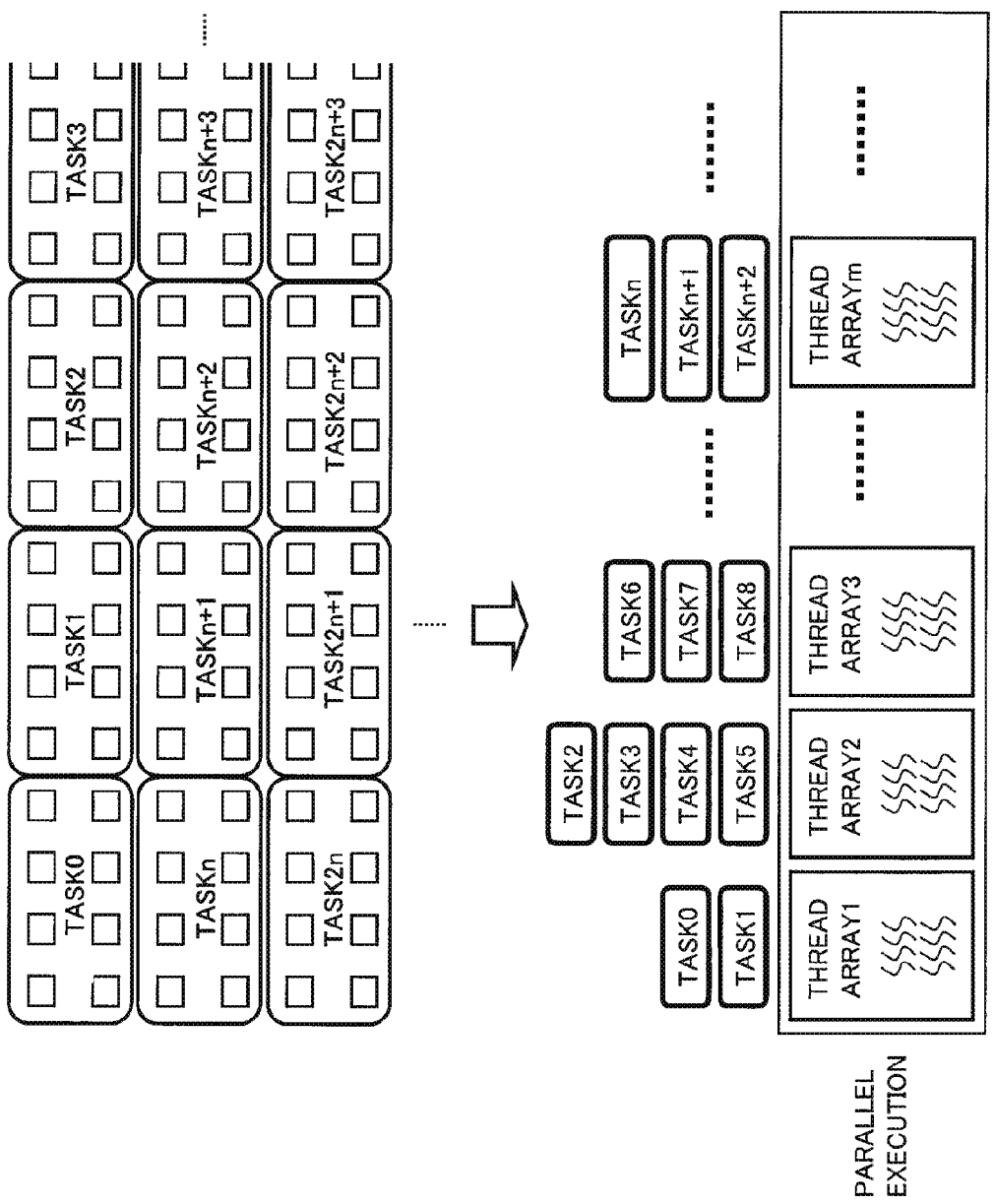
FIG. 15 is a schematic diagram for explaining an effect of the parallel processing device as the third exemplary embodiment of the present invention.

The reason will be described with reference to FIG. 15. As shown in FIG. 15, in the parallel processing device as the third exemplary embodiment of the present invention, the concurrently executed task number setting unit sets, with respect to each thread array, the concurrently executed task number of the thread array at a value specific to it. For example, on the basis of task information on the load of each task, or the like, the concurrently executed task number setting unit sets the concurrently executed task number of each thread array at a value specific to the thread array. As a result, even when the loads of tasks created by dividing the process of an application into them are not the same, the parallel processing device as the third exemplary embodiment of the present invention can equalize the loads of processor cores without modifying the process within the tasks.

Next, with reference to FIGS. 16 and 17, another example of the third exemplary embodiment of the present invention will be described In the other example of the third exemplary embodiment of the present invention, the concurrently executed task number setting unit 302 may set values of the concurrently executed task number specific to respective thread arrays using configuration information on a many-core accelerator instead of using task information.

Figure 16:
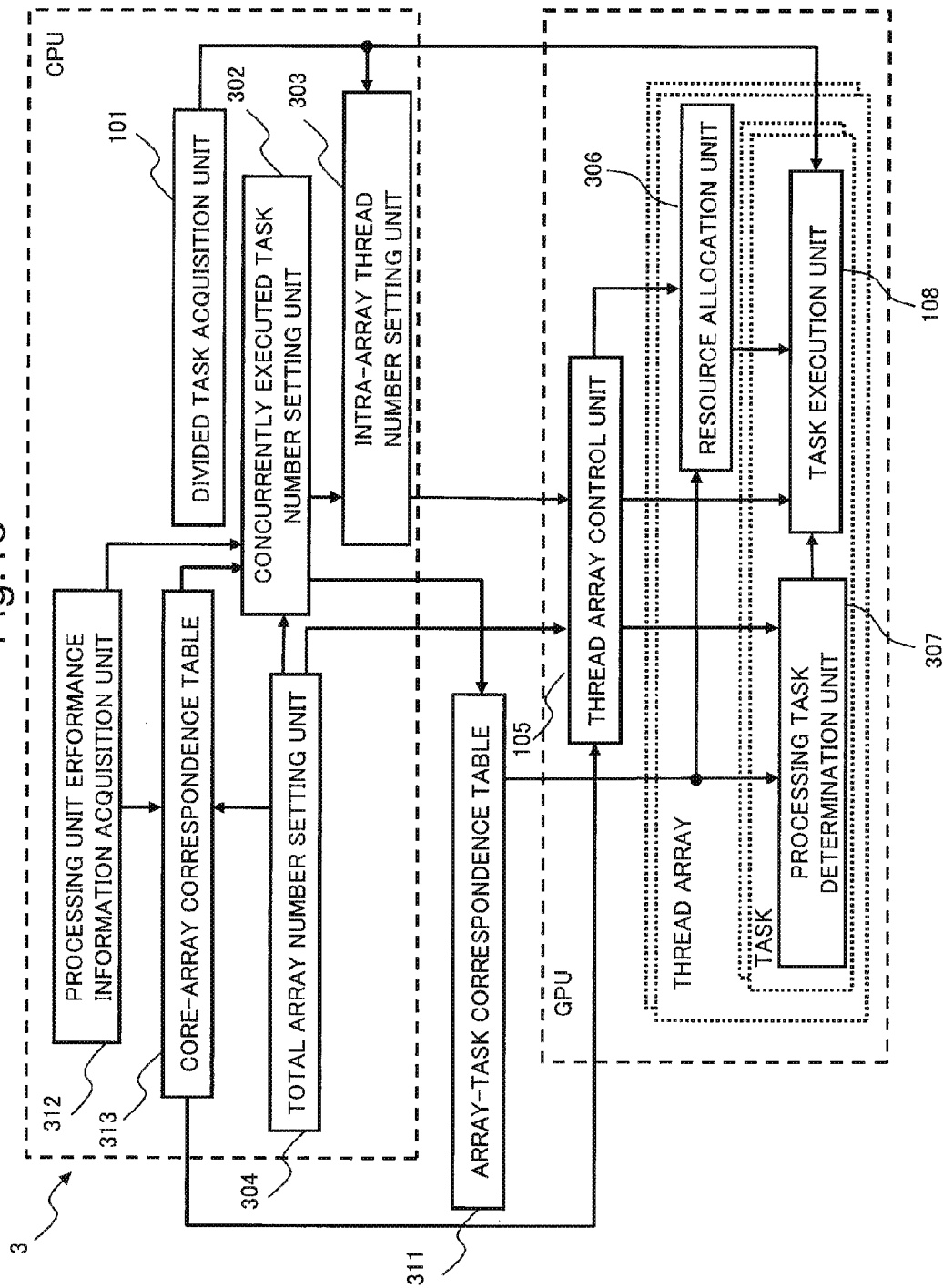
FIG. 16 is a functional block diagram of a parallel processing device as another form of the third exemplary embodiment of the present invention.

FIG. 16 shows a configuration of a parallel processing device 3 of that case. In FIG. 16, the parallel processing device 3 comprises a processing unit configuration information acquisition unit 312 and a core-array correspondence table 313, in place of the task information acquisition unit 310. In this case, the concurrently executed task number setting unit 302 constitutes, in combination with the processing unit configuration information acquisition unit 312 and the core-array correspondence table 312, one exemplary embodiment of the concurrently executed task number setting unit of the present invention.

The processing unit configuration information acquisition unit 312 acquires information representing the configuration of a many-core accelerator (GPU 1004) comprised in the computer device implementing the parallel processing device 3. For example, the processing unit configuration information acquisition unit 312 may acquire information representing the performance of each processor core comprised in the GPU 1004. Then, on the basis of the acquired configuration information on the many-core accelerator, the processing unit configuration information acquisition unit 312 determines correspondence relationships between the same number of thread arrays as the number set by the total array number setting unit 304 and the processor cores, and records them into the core-array correspondence table 313.

In that case, by referring to the core-array correspondence table 313, the concurrently executed task number setting unit 302 allocates tasks to the same number of thread arrays as the number set by the total array number setting unit 304. For example, the concurrently executed task number setting unit 302 may allocate a larger number of tasks collectively to a thread array related to a higher performance processor core. The concurrently executed task number setting unit 302 may also allocate a smaller number of tasks to a thread array related to a lower performance processor core.

Figure 17:
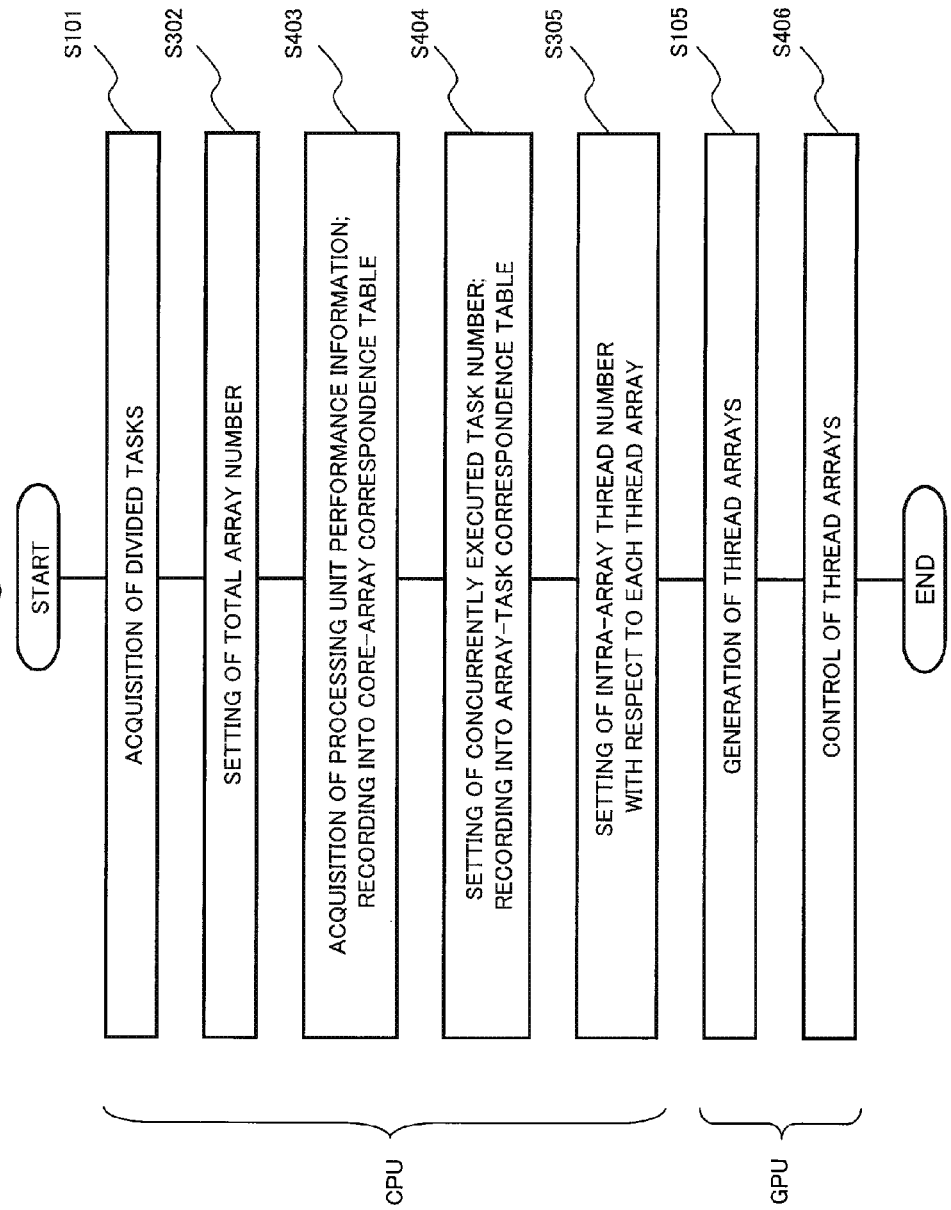
FIG. 17 is a flow chart illustrating operation of the parallel processing device as another form of the third exemplary embodiment of the present invention.

FIG. 17 shows operation of the parallel processing device 3 configured as above. In FIG. 17, the parallel processing device 3 executes the steps S403 to S404 and S406, in place of the steps S303 to S304 and S106 in the operation shown in FIG. 13.

In the step S403, the processing unit configuration information acquisition unit 312 acquires information representing the configuration of the many-core accelerator (GPU 1004). Then, on the basis of the acquired configuration information on the many-core accelerator, the processing unit configuration information acquisition unit 312 determines correspondence relationships between the same number of thread arrays as the number set by the total array number setting unit 304 and the processor cores, and records them into the core-array correspondence table 313.

In the step S404, on the basis of the core-array correspondence table 313, the concurrently executed task number setting unit 302 allocates, to each thread array, the same number of tasks as the concurrently executed task number specifically determined for the thread array.

In the step S406, according to the core-array correspondence table 313, the thread array control unit 105 performs control such that each thread array is parallel-processed by a corresponding processor core.

Figure 13:
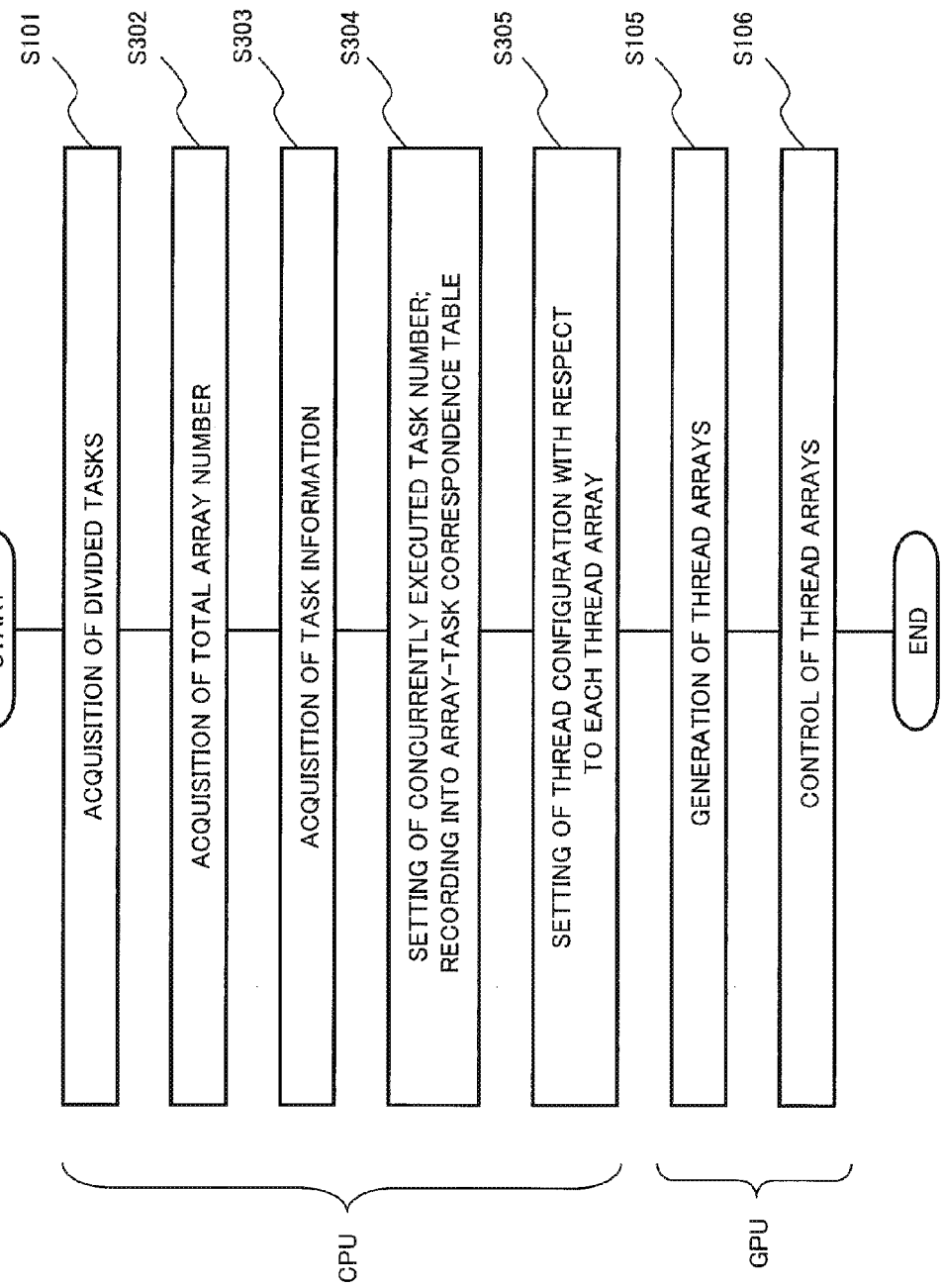
FIG. 13 is a flow chart illustrating operation of the parallel processing device as the third exemplary embodiment of the present invention.

In the other steps, the parallel processing device 3 operates in a similar way to that in the respective steps in FIG. 13. Then, in each of the thread arrays generated by the thread array control unit 105, the parallel processing device 3 executes the operations shown in FIG. 14 in a similar way. As a result, in each thread array, a group of tasks whose total task number is equal to the concurrently executed task number specific to the thread array are concurrently executed.

Similarly to the parallel processing device of the third exemplary embodiment of the present invention, the parallel processing device according to the other example of the third exemplary embodiment of the present invention, which is configured as above, can equalize processing times of the processor cores and reduce the whole processing time.

It is because the concurrently executed task number setting unit sets the concurrently executed task number of each thread array at a value specific to the thread array, on the basis of configuration information on a many-core accelerator. Accordingly, even when there is inequality in processing power among the processor cores comprised in a many-core accelerator used for parallel processing, the parallel processing device as the other example of the third exemplary embodiment of the present invention can adjust the concurrently executed task number of a thread array executed on each of the processor cores. As a result, the parallel processing device as the other example of the third exemplary embodiment of the present invention can equalize processing times of the processor cores and enables speedup of the processing.

In the third exemplary embodiment of the present invention, the description has been given of the examples where the concurrently executed task number setting unit sets the concurrently executed task number of each thread array at a value specific to the thread array on the basis of task load information and performance information on processor cores, respectively. Not limited to those ways, the concurrently executed task number setting unit in the third exemplary embodiment of the present invention may set the concurrently executed task number of each thread array at a value specific to the thread array on the basis of other task information related to each task, such as a memory size used by each task. Alternatively, the concurrently executed task number setting unit in the third exemplary embodiment of the present invention may set the concurrently executed task number of each thread array at a value specific to the thread array on the basis of other information related to the configuration of a many-core accelerator, such as the size of a memory and the number of processors comprised in the many-core accelerator.

Fourth Exemplary Embodiment

Next, a fourth exemplary embodiment of the present invention will be described in detail with reference to drawings. Here, in each of the drawings referred to in the description of the present exemplary embodiment, to the same configurations as and steps of operations similar to those in the first exemplary embodiment of the present invention, the respective same signs are given, and their detail descriptions are omitted in the present exemplary embodiment.

Figure 18:
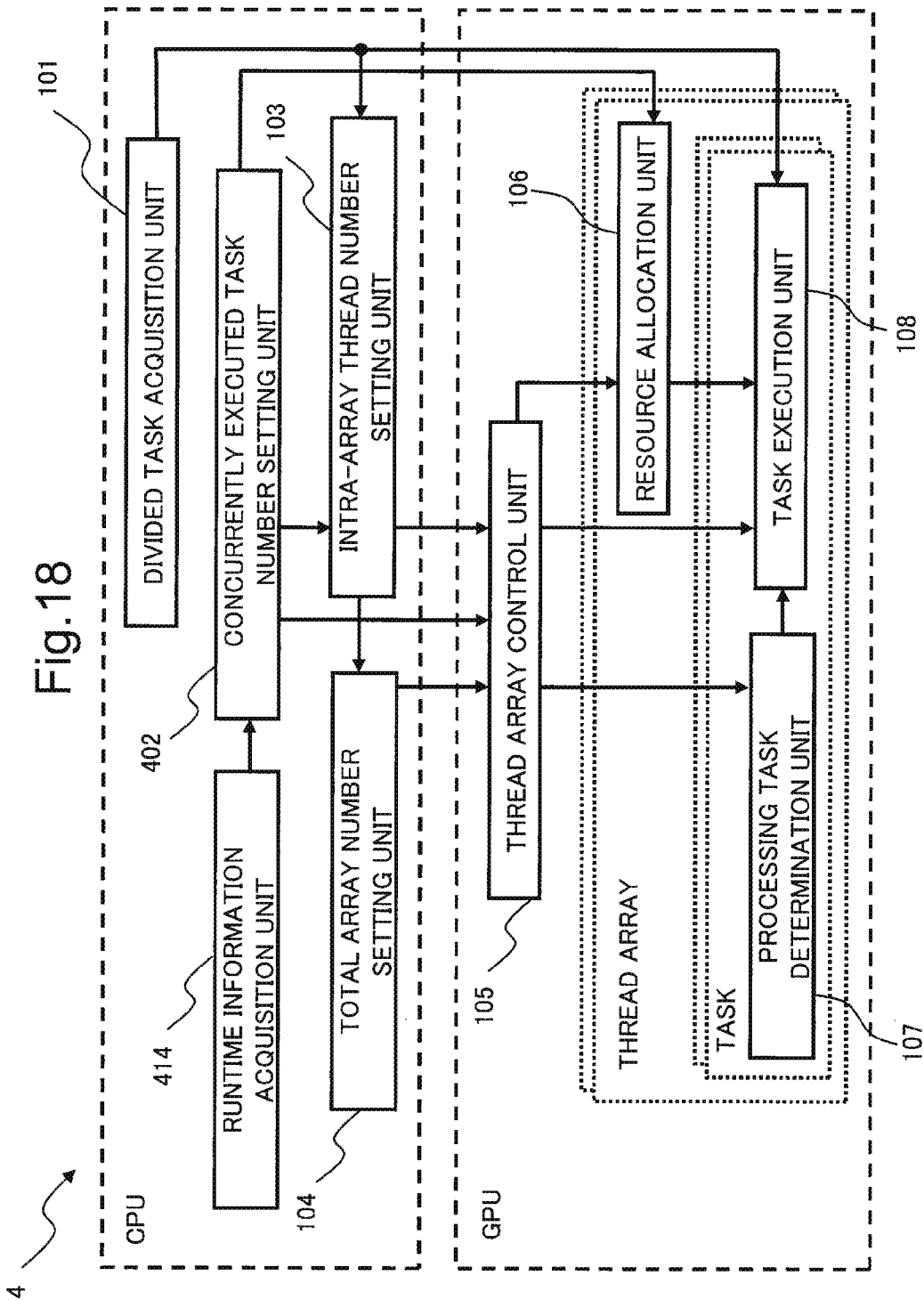
FIG. 18 is a functional block diagram of a parallel processing device as a fourth exemplary embodiment of the present invention.

First, a functional block diagram of a parallel processing device 4 as the fourth exemplary embodiment of the present invention will be described with reference to FIG. 18. Here, a hardware configuration of the parallel processing device 4 is similar to the parallel processing device 1 as the first exemplary embodiment of the present invention, and accordingly its description is omitted in the present exemplary embodiment. In FIG. 18, the parallel processing device 4 is different from the parallel processing device 1 as the first exemplary embodiment of the present invention in that it comprises a concurrently executed task number setting unit 402 in place of the concurrently executed task number setting unit 102, and further comprises a runtime information acquisition unit 414. Here, the concurrently executed task number setting unit 402 constitutes, in combination with the runtime information acquisition unit 414, one exemplary embodiment of the concurrently executed task number setting unit of the present invention.

The runtime information acquisition unit 414 acquires at least either of task information and processing unit configuration information during runtime of an application. As task information, the runtime information acquisition unit 414 may acquire, for example, the amount of resources such as a memory size each task uses, the number of threads necessary for each task, information representing the amount of each task's load, and the like. As processing unit configuration information, the runtime information acquisition unit 414 may acquire, for example, the number of processor cores and the size of a memory comprised in a many-core accelerator constituting the parallel processing device 4, information on the performance of each of the processor cores, and the like.

On the basis of the information acquired by the runtime information acquisition unit 414, the concurrently executed task number setting unit 402 sets the concurrently executed task number. At that time, the concurrently executed task number setting unit 402 may set the concurrently executed task number at a value common to all thread arrays, as done by the concurrently executed task number setting unit 102 in the first and second exemplary embodiments of the present invention. Alternatively, the concurrently executed task number setting unit 402 may set the concurrently executed task number at a specific value with respect to each thread array, as done by the concurrently executed task number setting unit 302 in the third exemplary embodiment of the present invention.

For example, on the basis of a memory size each task uses (task information) and a maximum memory size allowed to be used for each thread array (processing unit configuration information), the concurrently executed task number setting unit 402 may set the concurrently executed task number at a maximum value of the number of tasks within a range where the total memory size used by concurrently executed tasks in each array is equal to or smaller than the maximum memory size allowed to be used in one thread array.

For example, in a case of having obtained processing unit configuration information that the processor cores comprised in the GPU 1004 do not have the same performance, the concurrently executed task number setting unit 402 may set the concurrently executed task number at a larger value for a thread array executed by a faster processor core.

In another case, for example, of having obtained processing unit configuration information that the processor cores comprised in the GPU 1004 do not have the same memory size, the concurrently executed task number setting unit 402 may set the concurrently executed task number at a larger value for a thread array executed by a processor core having a larger memory size.

Figure 19:
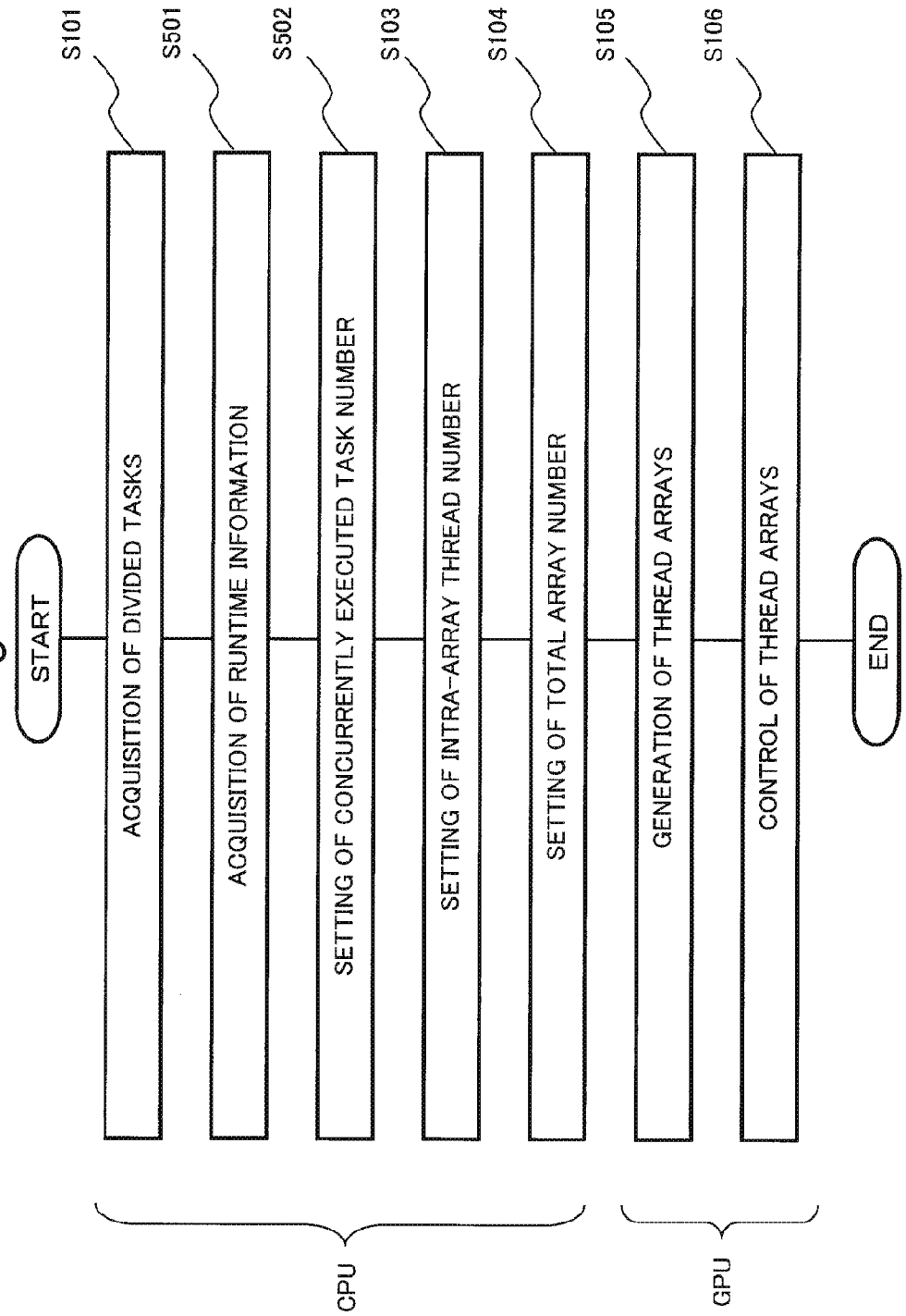
FIG. 19 is a flow chart illustrating operation of the parallel processing device as the fourth exemplary embodiment of the present invention.

A description will be given of operation of the parallel processing device 4 configured as above, with reference to FIG. 19.

First, subsequently to acquisition by the divided task acquisition unit 101 of information representing tasks created by dividing the process of an application into them (step S101), the runtime information acquisition unit 414 dynamically acquires at least either of task information and processing unit configuration information (step S501).

Next, the concurrently executed task number setting unit 402 sets the concurrently executed task number on the basis of the information acquired in the step S501 (step S502). For example, as described above, the concurrently executed task number setting unit 402 may set the concurrently executed task number, with respect to each thread array, at a maximum value of the number of tasks in a range where the total memory size used by concurrently executed tasks is equal to or smaller than the maximum memory size allowed to be used for one thread array.

After that, by operating in the steps S103 to S106 similarly to in the first exemplary embodiment of the present invention, the parallel processing device 4 generates thread arrays and threads and controls their parallel processing. Accordingly, in each of the thread arrays, through similar operation to that of the parallel processing device 1 shown in FIG. 4, a group of tasks whose total task number is equal to the concurrently executed task number set in the step S502 are processed in parallel.

With that, the description of operation of the parallel processing device 4 is finished.

Here, an additional description will be given of another case of the present exemplary embodiment where the concurrently executed task number setting unit 402 sets the concurrently executed task number at a specific value with respect to each thread array on the basis of runtime information. In that case, the parallel processing device 4 is configured to further comprise the array-task correspondence table 311 in the third exemplary embodiment of the present invention. Then, in the present case, after executing the step S501 in the operation shown in FIG. 19, the parallel processing device 4 may execute the steps S302, S304 and S305 shown in FIG. 13 in place of the steps S502, S103 and S104, respectively.

Next, the effect of the fourth exemplary embodiment of the present invention will be described.

The parallel processing device as the fourth exemplary embodiment of the present invention can deal with a variety of runtime environments of a processing unit having a plurality of processor cores and thereby improve the operating rate of each of the processor cores, in performing a process for which parallelism within a task is low but the number of tasks processable in parallel is large.

Figure 20:
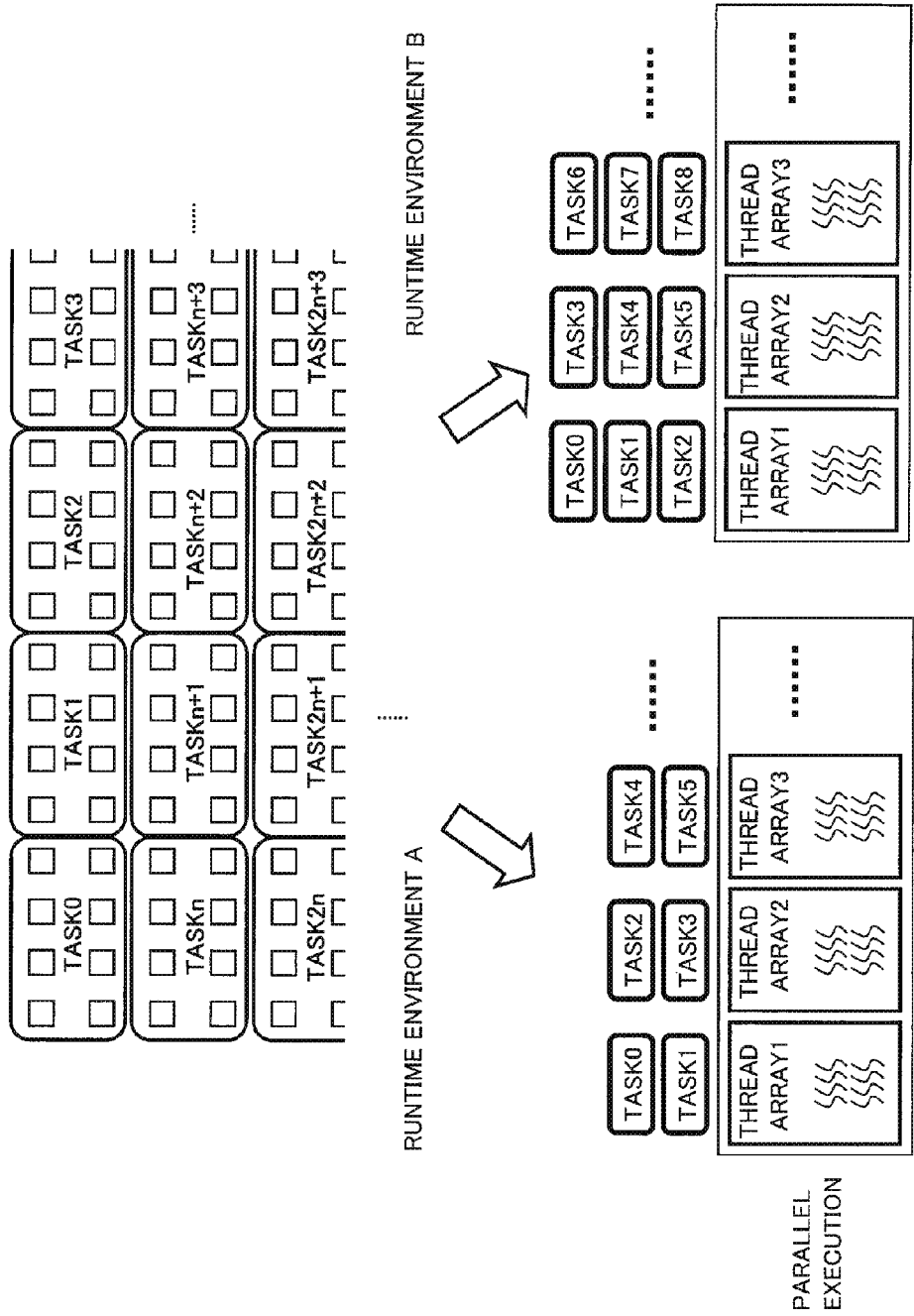
FIG. 20 is a schematic diagram for explaining an effect of the parallel processing device as the fourth exemplary embodiment of the present invention.

The reason will be described with reference to FIG. 20. As shown in FIG. 20, the parallel processing device of the present exemplary embodiment can dynamically modify the concurrently executed task number for each thread array according to task contents and the environment of a many-core accelerator used for parallel processing of the task contents. As a result, the parallel processing device of the present exemplary embodiment becomes able to improve the operating rate of each processor core and thereby complete processing of each task at high speed, without changing process contents of the tasks, even in a larger variety of runtime environments Fifth Exemplary Embodiment Next, a fifth exemplary embodiment of the present invention will be described in detail with reference to drawings. Here, in each of the drawings referred to in the description of the present exemplary embodiment, to the same configurations as and steps of operations similar to those in the first exemplary embodiment of the present invention, the respective same signs are given, and their detail descriptions are omitted in the present exemplary embodiment.

In the present exemplary embodiment, a description will be given of an optimization device which optimizes a computer program for causing the parallel processing devices as the first to fourth exemplary embodiments of the present invention. The optimization device as the present exemplary embodiment optimizes, according to runtime environment, a computer program describing parallel processing of tasks using a many-core accelerator.

Figure 21:
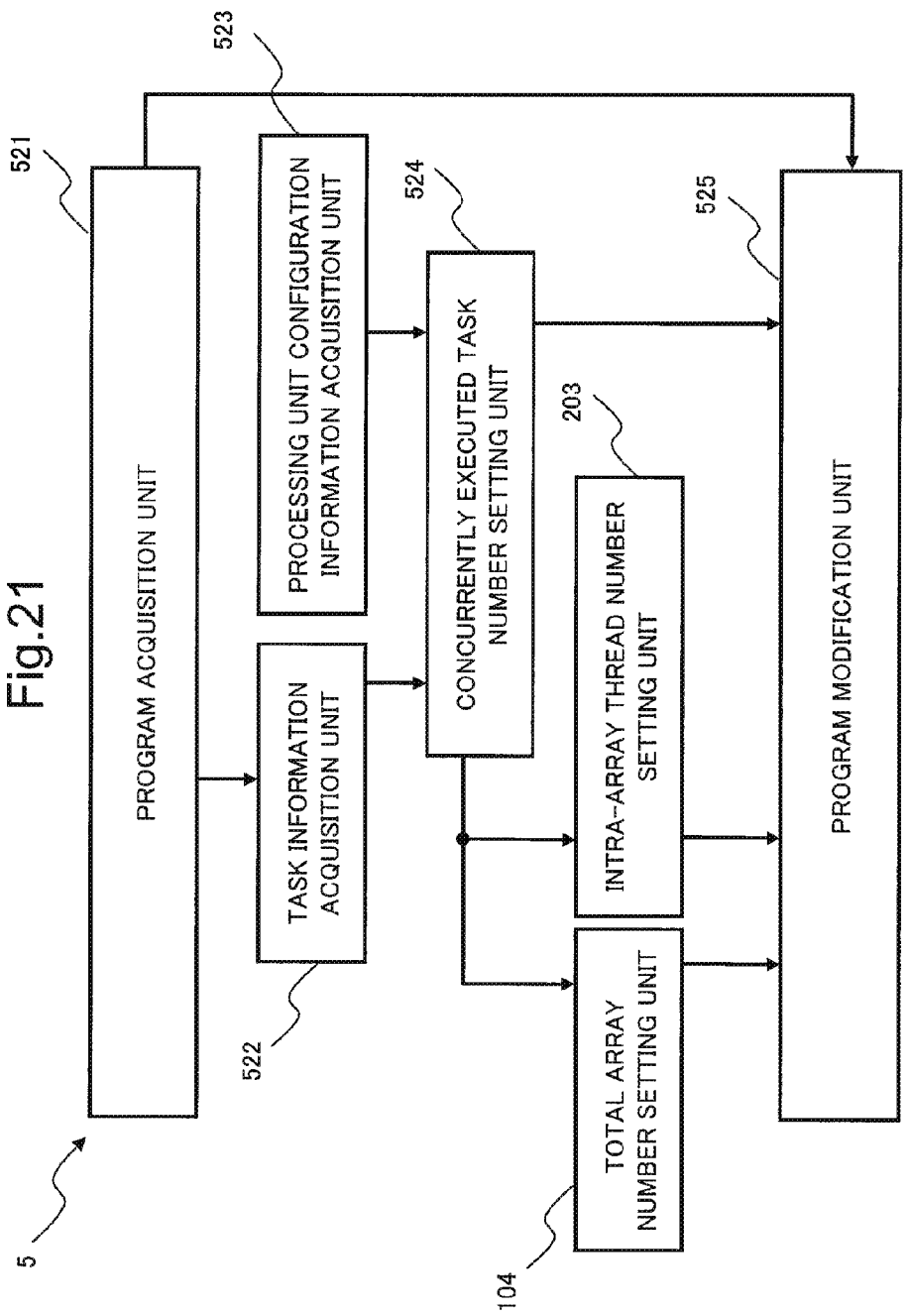
FIG. 21 is a functional block diagram of an optimization device as a fifth exemplary embodiment of the present invention.

First, a description will be given of a functional block configuration of an optimization device 5 as the fifth exemplary embodiment of the present invention, with reference to FIG. 21. Here, a hardware configuration of the optimization device 5 can be implemented by the same computer device as that implementing the parallel processing device 1 as the first exemplary embodiment of the present invention, and accordingly the description will be omitted in the present exemplary embodiment. In FIG. 21, the optimization device 5 comprises a program acquisition unit 521, a task information acquisition unit 522, a processing unit configuration information acquisition unit 523, a concurrently executed task number setting unit 524, an intra-array thread number setting unit 203, a total array number setting unit 104 and a program modification unit 525. Each of the functional blocks is implemented by the CPU 1001 which reads a computer program module and various sorts of information stored in the ROM 1003 or the storage device 1005 and executes the program using the RAM 1002 as a working area. The concurrently executed task number setting unit 524 constitutes, in combination with the task information acquisition unit 522 and the processing unit configuration information acquisition unit 523, one example of the concurrently executed task number setting unit of the present invention.

The program acquisition unit 521 acquires information representing a computer program describing parallel processing of tasks using a many-core accelerator. A computer program acquired here comprises at least a step of generating thread arrays for executing each of tasks into which the process of an application to be processed is divided in a manner to enable parallel processing and threads into which each of the tasks is divided in a manner to enable parallel processing, a step of, in each of the thread arrays, securing resources necessary for processing each task and allocating the resources to each task, a step of determining a task to be processed by each thread, and a step of causing each thread to execute the determined task using the allocated resources.

The task information acquisition unit 522 acquires task information related to tasks. As task information, for example, the task information acquisition unit 522 may acquire the amount of resources necessary for processing each task, the number of threads necessary for processing each task, information on the load of each task, or the like.

The processing unit configuration information acquisition unit 523 acquires processing unit configuration information on the configuration of the GPU 1004. As processing unit configuration information, for example, the processing unit configuration information acquisition unit 523 may acquire the amount of resources and the number of processor cores comprised in the GPU 1004 or performance information on each of the processor cores.

On the basis of at least either of such task information and processing unit configuration information, the concurrently executed task number setting unit 524 sets the concurrently executed task number representing the number of tasks concurrently executed in each thread array. For example, on the basis of a memory size each task uses (task information) and a maximum memory size allowed to be used for each thread array (processing unit configuration information), the concurrently executed task number setting unit 524 may set the concurrently executed task number at a maximum value of the number of tasks in a range where the total memory size used by concurrently executed tasks in each array is equal to or smaller than the maximum memory size allowed to be used in one thread array.

Similarly to the intra-array thread number setting unit 203 in the second exemplary embodiment of the present invention, the intra-array thread number setting unit 203 in the present exemplary embodiment sets a multidimensional thread configuration obtained by adding a task determination dimension with a size equal to the concurrently executed task number to a thread configuration necessary for processing each task.

Similarly to the total array number setting unit 104 in the second exemplary embodiment of the present invention, the total array number setting unit 104 in the present exemplary embodiment sets the total array number at a value obtained by dividing the total number of tasks constituting the application by the concurrently executed task number set as described above. Here, a value thus calculated is rounded up.

The program modification unit 525 modifies the computer program acquired by the program acquisition unit 521 such that the intra-array thread number, the total array number and the concurrently executed task number are applied to the computer program. Specifically, the program modification unit 525 modifies the step of generating threads and thread arrays into a step of generating them on the basis of the intra-array thread number and the total array number. The program modification unit 525 also modifies the step of allocating resources to tasks in each thread array into a step of securing resources necessary for executing the same number of tasks as the concurrently executed task number and allocating the resources to each task. The program modification unit 525 also modifies the step of determining a task to be executed by each thread into a step of determining the task to be any one of the same number of tasks as the concurrently executed task number which are executed within the thread array. The program modification unit 525 also modifies the step of causing each thread to execute a corresponding task into a step of causing each thread to execute a corresponding task using resources allocated to the task among resources secured in the thread array.

Figure 22:
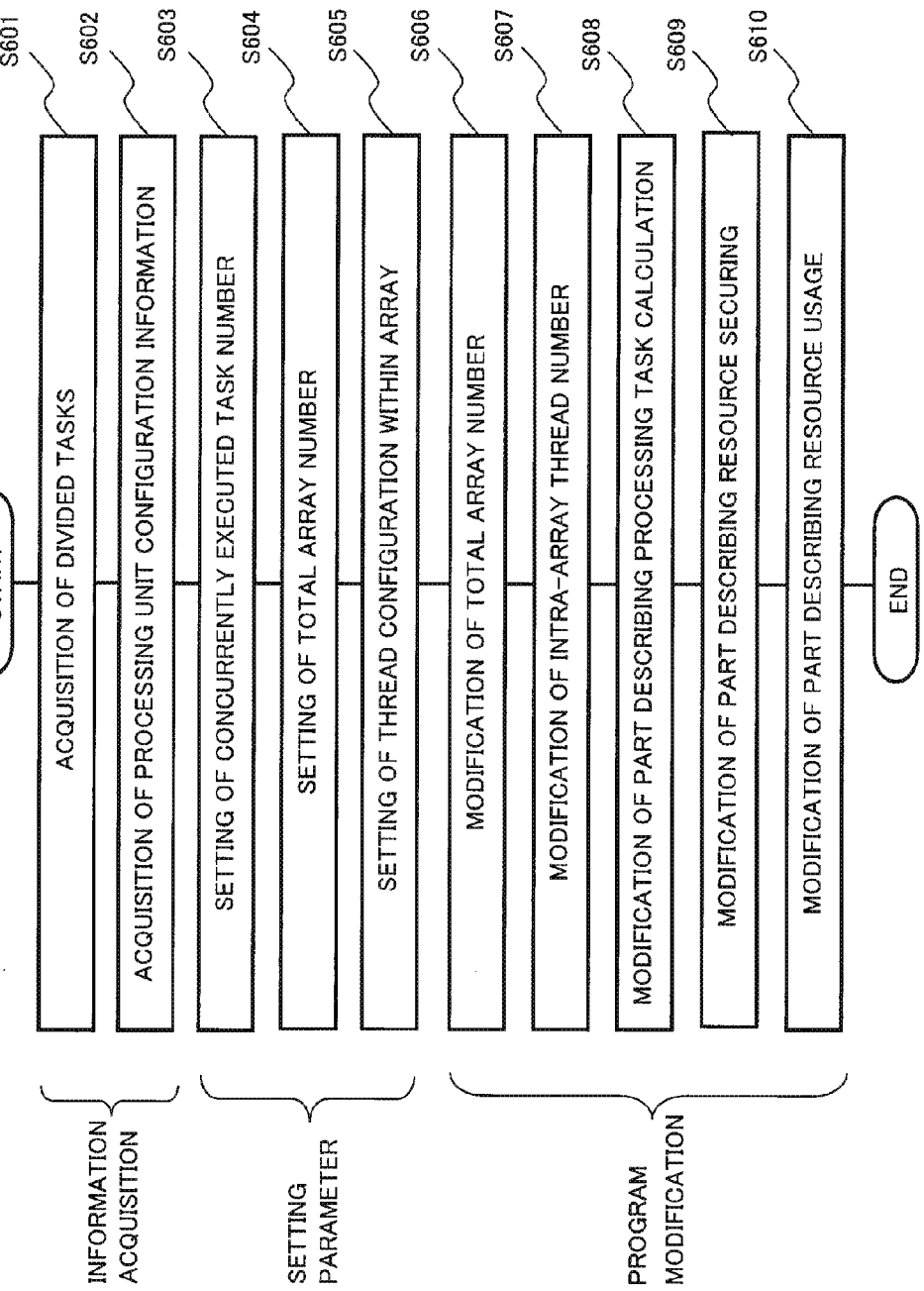
FIG. 22 is a flow chart illustrating operation of the optimization device as the fifth exemplary embodiment of the present invention.
Figure 23:
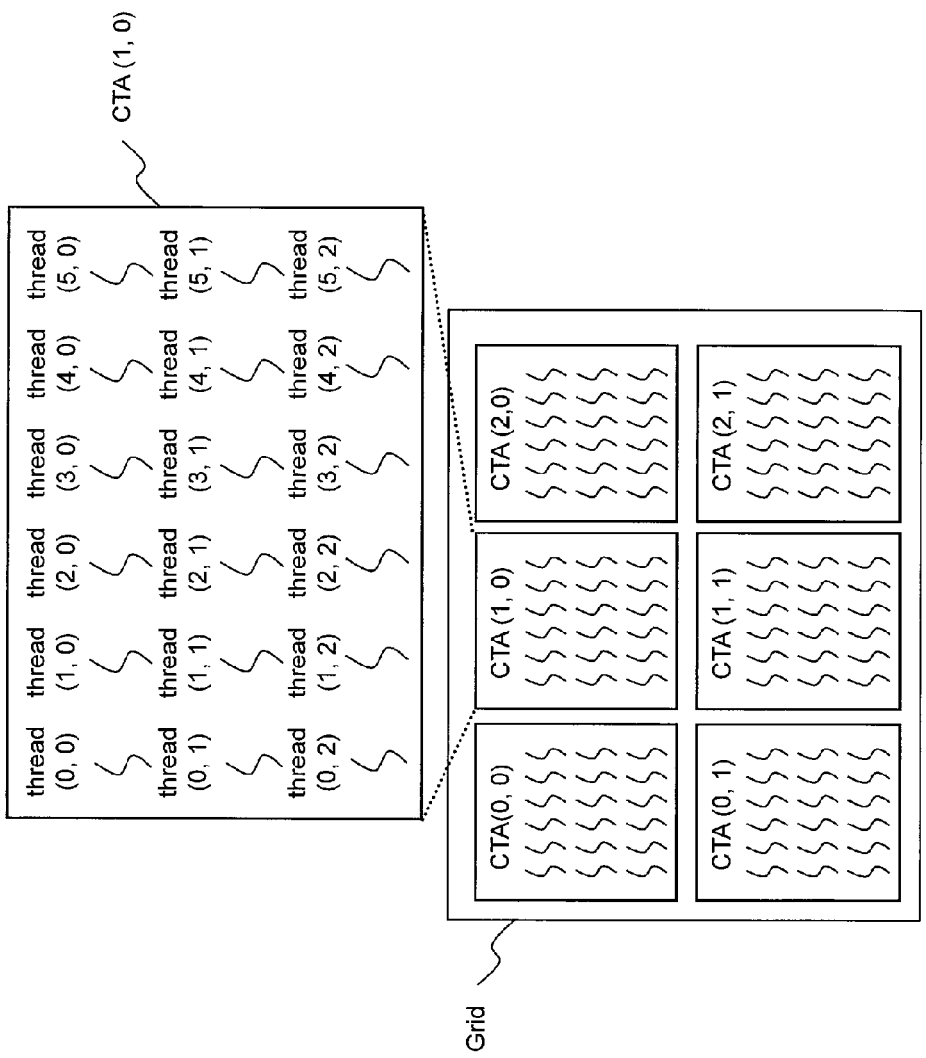
FIG. 23 is a schematic diagram illustrating inclusion relationships among grids, thread arrays and threads, in a related technology.

A description will be given of operation of the optimization device 5 configured as above, with reference to FIG. 22. Here, it is assumed that the program acquisition unit 521 has already acquired a computer program to be modified. The present description will be given of an example of the operation where the optimization device 5 optimizes the acquired computer program to become a computer program to be executed by the parallel processing device 2 as the second exemplary embodiment of the present invention.

First, the task information acquisition unit 522 acquires task information related to each of tasks described in the computer program. For example, the task information acquisition unit 522 acquires a memory size used for each of the tasks (step S601).

Next, the processing unit configuration information acquisition unit 523 acquires processing unit configuration information related to the configuration of the GPU 1004. For example, the processing unit configuration information acquisition unit 523 acquires a maximum memory size of the GPU 1004 allowed to be used for each thread array (step S602).

Next, on the basis of at least either of the task information and the processing unit configuration information, the concurrently executed task number setting unit 524 sets the concurrently executed task number representing the number of tasks concurrently executed in each thread array. For example, the concurrently executed task number setting unit 524 sets the concurrently executed task number at a maximum value of the number of tasks in a range where the total memory size used by concurrently executed tasks within each thread array is equal to or smaller than the maximum memory size allowed to be used in each thread array. (step S603).

Next, the total array number setting unit 104 sets the total array number at a value (rounded-up value) obtained by dividing the total task number by the concurrently executed task number (step S604).

Next, the intra-array thread number setting unit 103 sets a multidimensional thread configuration obtained by adding a task determination dimension with a size equal to the concurrently executed task number to a thread configuration necessary for processing each task (step S605).

Next, the program modification unit 525 modifies the total number of thread arrays to generate, which is described in the acquired computer program, into the total array number set by the total array number setting unit 104 (step S606).

Then, the program modification unit 525 modifies the thread configuration within each of thread arrays to generate, which is described in the acquired computer program, into the thread configuration set in the step S605 (step S607).

Then, the program modification unit 525 modifies the description of calculating the task number of a task to be processed by each thread, in the acquired computer program, such that the calculation is performed on the basis of the value in the task determination dimension of each thread ID (step S608).

Then, the program modification unit 525 modifies the description of securing resources in each thread array, in the acquired computer program, such that the resources are secured as a resource array with a size equal to the concurrently executed task number (step S609).

Then, the program modification unit 525 modifies the description of causing each thread to execute a task, in the acquired computer program, such that each thread is caused to execute a task using resources allocated to the task on the basis of the value in the task determination dimension of its thread ID (step S610).

With that, the optimization device 5 completes the operation.

As seen from the above description, the optimization device 5 does not need to modify the description of the process content of each task in the inputted computer program.

For example, the optimization device 5 operating as above can output the computer program shown in FIG. 10 by acquiring and then modifying the computer program shown in FIG. 11.

Next, the effect of the fifth exemplary embodiment of the present invention will be described.

The optimization device as the fifth exemplary embodiment of the present invention can modify a computer program describing a process for which parallelism within a task is low but the number of tasks processable in parallel is large into a computer program appropriate for improving the operating rate of each processor core, in accordance with many-core accelerators which need to have a variety of configuration as a result of change in model and generation.

It is because: the concurrently executed task number setting unit modifies the concurrently executed task number of each thread array according to task contents and the configuration of a many-core accelerator; and then, on the basis of the total thread array number and the intra-array thread number which are set on the basis of the concurrently executed task number, the program modification unit modifies an inputted computer program. For many-core accelerators, parameters related to parallelization such as the optimum number of threads particularly vary depending on the number of cores and core architecture. These parameters greatly influence the performance of a program. Accordingly, a programmer needs to change such parameters according to the environment. However, modifying parameters for each runtime execution environment is not easy and troublesome. In this respect, the optimization device of the present exemplary embodiment can eliminate the troublesomeness of a programmer's programming according to a runtime environment.

In each of the above-described exemplary embodiments of the present invention, the operation of each parallel processing device or of the optimization device described with reference to the corresponding flow chart may be stored in a storage device (recording medium) of the computer device as a computer program of the present invention, and may be read out and executed by the CPU and GPU. In that case, the present invention is implemented by the cord of the computer program or a recording medium storing the computer program.

Further, the above-described exemplary embodiments may be implemented in combination with each other.

Still further, the present invention is not limited to the above-described exemplary embodiments but may be implemented in various forms.

Part or the whole of the above-described exemplary embodiments may be described as, but not limited to, the following supplementary notes.

(Supplementary Note 1)

A parallel processing device which performs further parallel processing of a group of thread arrays each being a group of threads each representing a process unit enabling parallel processing, using a processing unit having a plurality of processor cores, the parallel processing device having:

a divided task acquisition unit which acquires information representing each of tasks into which the process of an application to be processed is divided in a manner to enable parallel processing;

a concurrently executed task number setting unit which sets a concurrently executed task number which is the number of tasks concurrently executed in each of the thread arrays;

an intra-array thread number setting unit which sets an intra-array thread number which is the number of threads within each of the thread arrays, on the basis of the number of threads able to be processed further in parallel in each of the tasks and the concurrently executed task number;

a total array number setting unit which sets a total array number which is the total number of the thread arrays, on the basis of the total number of threads necessary for processing the application and the intra-array thread number;

a thread array control unit which generates the threads and the thread arrays on the basis of the intra-array thread number and the total array number, and controls the processing unit to execute in parallel the process of each of the thread arrays;

a resource allocation unit which, in each of the thread arrays, secures resources necessary for processing the same number of tasks as the concurrently executed task number, and allocates the secured resources to each of the tasks;

a processing task determination unit which determines a task to be processed by each thread within each of the thread arrays; and a task execution unit which executes the same number of tasks as the concurrently executed task number in each of the thread arrays, by causing each of the threads in the thread array to execute the task determined by the processing task determination unit using the resources allocated by the resource allocation unit.

(Supplementary Note 2)

The parallel processing device according to supplementary note 1, wherein:

the intra-array thread number setting unit sets a thread configuration expressed as a multidimensional configuration obtained by adding a task determination dimension for identifying a task to be a processing object of each of the threads to the dimension(s) of a thread configuration necessary for processing each of the tasks; and the processing task determination unit determines a task to be processed by each of the threads on the basis of (the value in) the task determination dimension of the thread.

(Supplementary Note 3)

The parallel processing device according to supplementary notes 1 or 2, wherein the concurrently executed task number setting unit sets the concurrently executed task number at an individual value with respect to each of the thread arrays.

(Supplementary Note 4)

The parallel processing device according to any one of supplementary notes 1 to 3, wherein the concurrently executed task number setting unit sets the concurrently executed task number on the basis of at least either of task information related to each of the tasks and processing unit configuration information related to the configuration of the processing unit.

(Supplementary Note 5)

The parallel processing device according to supplementary note 4, wherein the concurrently executed task number setting unit acquires at least either of the task information and the processing unit configuration information during runtime of the application, and thereby sets the concurrently executed task number on the basis of the acquired information.

(Supplementary Note 6)

The parallel processing device according to supplementary notes 4 or 5, wherein the task information is at least one of the amount of resources necessary for processing each of the tasks, the number of threads necessary for processing each of the tasks and load information on each of the tasks.

(Supplementary Note 7)

The parallel processing device according to any one of supplementary notes 4 to 6, wherein the processing unit configuration information is at least one of the amount of resources held by the processing unit, the number of processor cores and performance information on each of the processor cores.

(Supplementary Note 8)

An optimization device which optimizes a computer program describing a process of performing further parallel processing of a group of thread arrays each being a group of threads each representing a process unit enabling parallel processing, using a processing unit having a plurality of processor cores, the optimization device comprising:

a program acquisition unit which acquires information representing a computer program including: a step of generating thread arrays to execute the process of each of tasks into which an application to be processed is divided in a manner to enable parallel processing and threads into which the process of each of the tasks is divided in a manner to enable further parallel processing, a step of securing and subsequently allocating resources necessary for processing each of the tasks, in each of the thread arrays, a step of determining a task to be processed by each of the threads, and a step of causing each of the threads to execute the determined task using the allocated resources;

a concurrently executed task number setting unit which sets the concurrently executed task number which is the number of tasks concurrently executed in each of the thread arrays, on the basis of at least one of task information related to the tasks and processing unit configuration information related to the configuration of the processing unit;

an intra-array thread number setting unit which sets the intra-array thread number on the basis of the number of threads to be necessary for each of the tasks and the concurrently executed task number;

a total array number setting unit which sets a total array number which is the total number of the thread arrays on the basis of the total number of threads necessary for processing the application and the intra-array thread number; and a program modification unit which modifies, of the computer program: the step of generating the threads and the thread arrays into a step of performing the generation on the basis of the intra-array thread number and the total array number, the step of securing and allocating resources in the thread arrays into a step of securing and allocating resources necessary for executing the same number of tasks as the concurrently executed task number, the step of determining a task to be processed by each of the threads into a step of performing the determination such that the task is determined to be any one of the same number of tasks as the concurrently executed task number executed in the thread array, and the step of causing the thread to execute the task into a step of also causing the thread to use resources allocated to the task in executing the task.

(Supplementary Note 9)

The optimization device according to supplementary note 8, wherein:

the intra-array thread number setting unit sets a thread configuration expressed as a multidimensional configuration obtained by adding a task determination dimension for identifying a task to be a processing object of each of the threads to the dimension(s) of a thread configuration necessary for processing each of the tasks; and the program modification unit modifies: the step of generating the threads and the thread arrays into a step of performing the generation in a manner to generate each of the thread arrays to contain the same number of threads as the intra-array thread number on the basis of the thread configuration, the step of determining a task to be processed by each of the threads into a step of determining a task to be processed by each of the threads on the basis of the task determination dimension, and the step of causing each of the tasks to execute the determined task into a step of also causing each of the tasks to use resources to be selected on the basis of the task determination dimension in executing the determined task.

(Supplementary Note 10)

A parallel processing method for performing further parallel processing of a group of thread arrays each being a group of threads each representing a process unit enabling parallel processing, using a processing unit having a plurality of processor cores, the parallel processing method comprising:

acquiring information representing each of tasks into which the process of an application to be processed is divided in a manner to enable parallel processing;

setting a concurrently executed task number which is the number of tasks concurrently executed in each of the thread arrays;

setting an intra-array thread number which is the number of threads within each of the thread arrays, on the basis of the number of threads able to be processed further in parallel in each of the tasks and the concurrently executed task number;

setting a total array number which is the total number of the thread arrays, on the basis of the total number of threads necessary for processing the application and the intra-array thread number;

generating the threads and the thread arrays on the basis of the intra-array thread number and the total array number, and controlling the processing unit to execute in parallel the process of each of the thread arrays;

in each of the thread arrays, securing resources necessary for processing the same number of tasks as the concurrently executed task number, and allocating the secured resources to each of the tasks;

determining a task to be processed by each thread within each of the thread arrays; and executing the same number of tasks as the concurrently executed task number in each of the thread arrays, by causing each of the threads in the thread array to execute the task determined by the processing task determination unit using the resources allocated by the resource allocation unit.

(Supplementary Note 11)

The parallel processing method according to supplementary note 10, wherein:

in the setting of the intra-array thread number, a thread configuration is determined as a multidimensional configuration obtained by adding a task determination dimension for identifying a task to be a processing object of each of the threads to the dimension(s) of a thread configuration necessary for processing each of the tasks; and in the determination of a task to be processed by each of the threads, a task to be processed by each of the threads is determined on the basis of (the value in) the task determination dimension of the thread.

(Supplementary Note 12)

A computer program for causing a parallel processing device, which performs further parallel processing of a group of thread arrays each being a group of threads each representing a process unit enabling parallel processing using a processing unit having a plurality of processor cores, to execute:

a divided task acquisition step of acquiring information representing each of tasks into which the process of an application to be processed is divided in a manner to enable parallel processing;

a concurrently executed task number setting step of setting a concurrently executed task number which is the number of tasks concurrently executed in each of the thread arrays;

an intra-array thread number setting step of setting an intra-array thread number which is the number of threads within each of the thread arrays, on the basis of the number of threads which can be processed further in parallel in each of the tasks and the concurrently executed task number;

a total array number setting step of setting a total array number which is the total number of the thread arrays, on the basis of the total number of threads necessary for processing the application and the intra-array thread number;

a thread array control step of generating the threads and the thread arrays on the basis of the intra-array thread number and the total array number, and controlling the processing unit to execute in parallel the process of each of the thread arrays;

a resource allocation step of, in each of the thread arrays, securing resources necessary for processing the same number of tasks as the concurrently executed task number, and allocating the secured resources to each of the tasks;

a processing task determination step of determining a task to be processed by each thread within each of the thread arrays; and a task execution step of executing the same number of tasks as the concurrently executed task number in each of the thread arrays, by causing each of the threads to execute the task determined by the processing task determination unit using the resources allocated by the resource allocation unit.

(Supplementary Note 13)

The computer program according to supplementary note 12, wherein:

in the intra-array thread number setting step, a thread configuration is set as a multidimensional configuration obtained by adding a task determination dimension for identifying a task to be a processing object of each of the threads to the dimension(s) of a thread configuration necessary for processing each of the tasks; and in the processing task determination step, a task to be processed by each of the threads is determined on the basis of (the value in) the task determination dimension of the thread.

(Supplementary Note 14)

An optimization method for optimizing a computer program describing a process of performing further parallel processing of a group of thread arrays each being a group of threads each representing a process unit enabling parallel processing using a processing unit having a plurality of processor cores, the optimization method comprising:

acquiring information representing a computer program including: a step of generating thread arrays to execute the process of each of tasks into which an application to be processed is divided in a manner to enable parallel processing and threads into which the process of each of the tasks is divided in a manner to enable further parallel processing, a step of securing and subsequently allocating resources necessary for processing each of the tasks in each of the thread arrays, a step of determining a task to be processed by each of the threads, and a step of causing each of the threads to execute the determined task using the allocated resources;

setting the concurrently executed task number which is the number of tasks concurrently executed in each of the thread arrays, on the basis of at least one of task information related to the tasks and processing unit configuration information related to the configuration of the processing unit;

setting the intra-array thread number on the basis of the number of threads to be necessary for each of the tasks and the concurrently executed task number;

setting a total array number which is the total number of the thread arrays on the basis of the total number of threads necessary for processing the application and the intra-array thread number; and modifying, of the computer program: the step of generating the threads and the thread arrays into a step of performing the generation on the basis of the intra-array thread number and the total array number, the step of securing and allocating resources in the thread arrays into a step of securing and allocating resources necessary for executing the same number of tasks as the concurrently executed task number, the step of determining a task to be processed by each of the tasks into a step of performing the determination such that the task is determined to be any one of the same number of tasks as the concurrently executed task number executed in the thread array, and the step of causing the thread to execute the task into a step of also causing the thread to use resources allocated to the task in executing the task.

(Supplementary Note 15)

The optimization method according to supplementary note 14, wherein:

in the setting of the intra-array thread number, a thread configuration is determined as a multidimensional configuration obtained by adding a task determination dimension for identifying a task to be a processing object of each of the threads to the dimension(s) of a thread configuration necessary for processing each of the tasks; and in the modification of steps of the program, the step of generating the threads and the thread arrays is modified into a step of performing the generation in a manner to generate each of the thread arrays to contain the same number of threads as the intra-array thread number on the basis of the thread configuration, the step of determining a task to be processed by each of the threads is modified into a step of determining a task to be processed by each of the threads on the basis of the task determination dimension, and the step of causing each of the tasks to execute the determined task is modified into a step of also causing each of the tasks to use resources to be selected on the basis of the task determination dimension in executing the determined task.

(Supplementary Note 16)

A computer program for optimizing a computer program describing a process of performing further parallel processing of a group of thread arrays each being a group of threads each representing a process unit enabling parallel processing using a processing unit having a plurality of processor cores, the computer program for the optimization causing a computer device to execute:

a program acquisition step of acquiring information representing a computer program including: a step of generating thread arrays to execute the process of each of tasks into which an application to be processed is divided in a manner to enable parallel processing and threads into which the process of each of the tasks is divided in a manner to enable further parallel processing; a step of securing and subsequently allocating resources necessary for processing each of the tasks, in each of the thread arrays; a step of determining a task to be processed by each of the threads; a step of causing each of the threads to execute the determined task using the allocated resources;

a concurrently executed task number setting unit which sets the concurrently executed task number which is the number of tasks concurrently executed in each of the thread arrays, on the basis of at least one of task information related to the tasks and processing unit configuration information related to the configuration of the processing unit;

an intra-array thread number setting step of setting the intra-array thread number on the basis of the number of threads to be necessary for each of the tasks and the concurrently executed task number;

a total array number setting step of setting a total array number which is the total number of the thread arrays on the basis of the total number of threads necessary for processing the application and the intra-array thread number; and a program modification step of modifying, of the computer program: the step of generating the threads and the thread arrays into a step of performing the generation on the basis of the intra-array thread number and the total array number, the step of securing and allocating resources in the thread arrays into a step of securing and allocating resources necessary for executing the same number of tasks as the concurrently executed task number, the step of determining a task to be processed by each of the threads into a step of performing the determination such that the task is determined to be any one of the same number of tasks as the concurrently executed task number executed in the thread array, and the step of causing the thread to execute the task into a step of also causing the thread to use resources allocated to the task in executing the task.

(Supplementary Note 17)

The computer program according to supplementary note 16, wherein:

in the intra-array thread number setting step, a thread configuration is determined as a multidimensional configuration obtained by adding a task determination dimension for identifying a task to be a processing object of each of the threads to the dimension(s) of a thread configuration necessary for processing each of the tasks; and In the program modification step, the step of generating the threads and the thread arrays is modified into a step of performing the generation in a manner to generate each of the thread arrays to contain the same number of threads as the intra-array thread number on the basis of the thread configuration, the step of determining a task to be processed by each of the threads is modified into a step of determining a task to be processed by each of the threads on the basis of the task determination dimension, and the step of causing each of the tasks to execute the determined task is modified into a step of also causing each of the tasks to use resources to be selected on the basis of the task determination dimension in executing the determined task.

This application is based upon and claims the benefit of priority from Japanese Patent Application No. 2011-112331, filed on May 19, 2011, the disclosure of which is incorporated herein in its entirety by reference.

Although the present invention has been described above with reference to the exemplary embodiments, the present invention is not limited to the above-described exemplary embodiments. Various changes and modifications which can be understood by those skilled in the art may be made to the configurations and details of the present invention, within the scope of the present invention.

REFERENCE SIGNS LIST 1, 2, 3, 4 parallel processing device
5 optimization device
101 divided task acquisition unit
102, 302, 402, 524 concurrently executed task number setting unit
103, 203, 303 intra-array thread number setting unit
104, 304 total array number setting unit
105 thread array control unit
106, 206, 306 resource allocation unit
107, 207, 307 processing task determination unit
108 task execution unit
310, 522 task information acquisition unit
311 array-task correspondence table
312, 523 processing unit configuration information acquisition unit
313 core-array correspondence table
414 runtime information acquisition unit
521 program acquisition unit
525 program modification unit
900 application execution unit
911 intra-CTA (per-CTA) thread number setting unit
912 CTA number setting unit
913 task division unit
924 CTA control unit
925 processing task determination unit
926 task execution unit
931 parameter modification unit
932 execution time acquisition unit
933 optimum parameter selection unit
941 application merging unit
942 processing application selection unit
1001 CPU
1002 RAM
1003 ROM
1004 GPU
1005 storage device
1006 input device

What is claimed is:

1. A parallel processing device which includes a hardware processing unit having a plurality of processor cores, a parallel processing of a group of thread arrays each being a group of threads each representing a process unit enabling parallel processing, the parallel processing device comprising:

a divided task acquisition unit which acquires information representing each of tasks into which the process of an application to be processed is divided in a manner to enable parallel processing;

a concurrently executed task number setting unit which sets a concurrently executed task number which is the number of tasks concurrently executed in each of the thread arrays;

an intra-array thread number setting unit which sets an intra-array thread number which is the number of threads within each of the thread arrays, on the basis of the number of threads able to be processed further in parallel in each of the tasks and the concurrently executed task number;

a total array number setting unit which sets a total array number which is the total number of the thread arrays, on the basis of the total number of threads necessary for processing the application and the intraarray thread number;

a thread array control unit which generates the threads and the thread arrays on the basis of the intra-array thread number and the total array number, and controls the processing unit to execute in parallel the process of each of the thread arrays;

a resource allocation unit which, in each of the thread arrays, secures resources necessary for processing the same number of tasks as the concurrently executed task number, and allocates the secured resources to each of the tasks;

a processing task determination unit which determines a task to be processed by each thread within each of the thread arrays; and a task execution unit which executes the same number of tasks as the concurrently executed task number in each of the thread arrays, by causing each of the threads in the thread array to execute the task determined by the processing task determination unit using the resources allocated by the resource allocation unit.

2. The parallel processing device according to claim 1, wherein:

the intra-array thread number setting unit sets a thread configuration expressed as a multidimensional configuration obtained by adding a task determination dimension for identifying a task to be a processing object of each of the threads to the dimension(s) of a thread configuration necessary for processing each of the tasks; and the processing task determination unit determines a task to be processed by each of the threads on the basis of (the value in) the task determination dimension of the thread.

3. The parallel processing device according to claim 1, wherein the concurrently executed task number setting unit sets the concurrently executed task number at an individual value with respect to each of the thread arrays.

4. The parallel processing device according to claim 2, wherein the concurrently executed task number setting unit sets the concurrently executed task number at an individual value with respect to each of the thread arrays.

5. The parallel processing device according to claim 1, wherein the concurrently executed task number setting unit sets the concurrently executed task number on the basis of at least either of task information related to each of the tasks and processing unit configuration information related to the configuration of the processing unit.

6. The parallel processing device according to claim 2, wherein the concurrently executed task number setting unit sets the concurrently executed task number on the basis of at least either of task information related to each of the tasks and processing unit configuration information related to the configuration of the processing unit.

7. The parallel processing device according to claim 3, wherein the concurrently executed task number setting unit sets the concurrently executed task number on the basis of at least either of task information related to each of the tasks and processing unit configuration information related to the configuration of the processing unit.

8. The parallel processing device according to claim 4, wherein the concurrently executed task number setting unit sets the concurrently executed task number on the basis of at least either of task information related to each of the tasks and processing unit configuration information related to the configuration of the processing unit.

9. The parallel processing device according to claim 5, wherein the concurrently executed task number setting unit acquires at least either of the task information and the processing unit configuration information during runtime of the application, and thereby sets the concurrently executed task number on the basis of the acquired information.

10. The parallel processing device according to claim 6, wherein
the concurrently executed task number setting unit acquires at least either of the task information and the processing unit configuration information during runtime of the application, and thereby sets the concurrently executed task number on the basis of the acquired information.

11. The parallel processing device according to claim 7, wherein
the concurrently executed task number setting unit acquires at least either of the task information and the processing unit configuration information during runtime of the application, and thereby sets the concurrently executed task number on the basis of the acquired information.

12. The parallel processing device according to claim 8, wherein
the concurrently executed task number setting unit acquires at least either of the task information and the processing unit configuration information during runtime of the application, and thereby sets the concurrently executed task number on the basis of the acquired information.

13. An optimization device which optimizes a computer program describing a process of performing, including a hardware processing unit having a plurality of processor cores, a parallel processing of a group of thread arrays each being a group of threads each representing a process unit enabling parallel processing, the optimization device comprising:
a program acquisition unit which acquires information representing a computer program including: a step of generating thread arrays to execute the process of each of tasks into which an application to be processed is divided in a manner to enable parallel processing and threads into which the process of each of the tasks is divided in a manner to enable further parallel processing, a step of securing and subsequently allocating resources necessary for processing each of the tasks in each of the thread arrays, a step of determining a task to be processed by each of the threads, and a step of causing each of the threads to execute the determined task using the allocated resources;
a concurrently executed task number setting unit which sets the concurrently executed task number which is the number of tasks concurrently executed in each of the thread arrays, on the basis of at least one of task information related to the tasks and processing unit configuration information related to the configuration of the processing unit;
an intra-array thread number setting unit which sets the intra-array thread number on the basis of the number of threads to be necessary for each of the tasks and the concurrently executed task number;
a total array number setting unit which sets a total array number which is the total number of the thread arrays on the basis of the total number of threads necessary for processing the application and the intra array thread number; and
a program modification unit which modifies, of the computer program: the step of generating the threads and the thread arrays into a step of performing the generation on the basis of the intra-array thread number and the total array number, the step of securing and allocating resources in the thread arrays into a step of securing and allocating resources necessary for executing the same number of tasks as the concurrently executed task number, the step of determining a task to be processed by each of the threads into a step of performing the determination such that the task is determined to be any one of the same number of tasks as the concurrently executed task number executed in the thread array, and the step of causing the thread to execute the task into a step of also causing the thread to use resources allocated to the task in executing the task.

14. A parallel processing method for performing, by using a processing unit having a plurality of processor cores, a parallel processing of a group of thread arrays each being a group of threads each representing a process unit enabling parallel processing, the parallel processing method comprising:
acquiring information representing each of tasks into which the process of an application to be processed is divided in a manner to enable parallel processing;
setting a concurrently executed task number which is the number of tasks concurrently executed in each of the thread arrays;
setting an intra-array thread number which is the number of threads within each of the thread arrays, on the basis of the number of threads able to be processed further in parallel in each of the tasks and the concurrently executed task number;
setting a total array number which is the total number of the thread arrays, on the basis of the total number of threads necessary for processing the application and the intra-array thread number;
generating the threads and the thread arrays on the basis of the intra-array thread number and the total array number, and controlling the processing unit to execute in parallel the process of each of the thread arrays;
in each of the thread arrays, securing resources necessary for processing the same number of tasks as the concurrently executed task number, and allocating the secured resources to each of the tasks;
determining a task to be processed by each thread within each of the thread arrays; and
executing the same number of tasks as the concurrently executed task number in each of the thread arrays, by causing each of the threads in the thread array to execute the task determined by the processing task determination unit using the resources allocated by the resource allocation unit.

15. A non-transitory computer readable media storing a computer program for causing a parallel processing device, which performs, by using a processing unit having a plurality of processor cores, a parallel processing of a group of thread arrays each being a group of threads each representing a process unit enabling parallel processing to execute:
a divided task acquisition step of acquiring information representing each of tasks into which the process of an application to be processed is divided in a manner to enable parallel processing;

a concurrently executed task number setting step of setting a concurrently executed task number which is the number of tasks concurrently executed in each of the thread arrays;
an intra-array thread number setting step of setting an intra-array thread number which is the number of threads within each of the thread arrays, on the basis of the number of threads which can be processed further in parallel in each of the tasks and the concurrently executed task number;
a total array number setting step of setting a total array number which is the total number of the thread arrays, on the basis of the total number of threads necessary for processing the application and the intra array thread number;
a thread array control step of generating the threads and the thread arrays on the basis of the intra-array thread number and the total array number, and controlling the processing unit to execute in parallel the process of each of the thread arrays;
a resource allocation step of, in each of the thread arrays, securing resources necessary for processing the same number of tasks as the concurrently executed task number, and allocating the secured resources to each of the tasks;
a processing task determination step of determining a task to be processed by each thread within each of the thread arrays; and
a task execution step of executing the same number of tasks as the concurrently executed task number in each of the thread arrays, by causing each of the threads to execute the task determined by the processing task determination unit using the resources allocated by the resource allocation unit.

16. An optimization method for optimizing a computer program describing a process of performing, by using a processing unit having a plurality of processor cores, a parallel processing of a group of thread arrays each being a group of threads each representing a process unit enabling parallel processing the optimization method comprising:
acquiring information representing a computer program including: a step of generating thread arrays to execute the process of each of tasks into which an application to be processed is divided in a manner to enable parallel processing and threads into which the process of each of the tasks is divided in a manner to enable further parallel processing, a step of securing and subsequently allocating resources necessary for processing each of the tasks in each of the thread arrays, a step of determining a task to be processed by each of the threads, a step of causing each of the threads to execute the determined task using the allocated resources;
setting the concurrently executed task number which is the number of tasks concurrently executed in each of the thread arrays, on the basis of at least one of task information related to the tasks and processing unit configuration information related to the configuration of the processing unit;
setting the intra-array thread number on the basis of the number of threads to be necessary for each of the tasks and the concurrently executed task number;
setting a total array number which is the total number of the thread arrays on the basis of the total number of threads necessary for processing the application and the intra-array thread number; and
modifying, of the computer program: the step of generating the threads and the thread arrays into a step of performing the generation on the basis of the intra-array thread number and the total array number, the step of securing and allocating resources in the thread arrays into a step of securing and allocating resources necessary for executing the same number of tasks as the concurrently executed task number, the step of determining a task to be processed by each of the tasks into a step of performing the determination such that the task is determined to be any one of the same number of tasks as the concurrently executed task number executed in the thread array, and the step of causing the thread to execute the task into a step of also causing the thread to use resources allocated to the task in executing the task.

17. A non-transitory computer readable media storing a computer program for optimizing a computer program describing a process of performing by using a processing unit having a plurality of processor cores, a parallel processing of a group of thread arrays each being a group of threads each representing a process unit enabling parallel processing the computer program for the optimization causing a computer device to execute:
a program acquisition step of acquiring information representing a computer program including: a step of generating thread arrays to execute the process of each of tasks into which an application to be processed is divided in a manner to enable parallel processing and threads into which the process of each of the tasks is divided in a manner to enable further parallel processing, a step of securing and subsequently allocating resources necessary for processing each of the tasks, in each of the thread arrays, a step of determining a task to be processed by each of the threads, a step of causing each of the threads to execute the determined task using the allocated resources;
a concurrently executed task number setting unit which sets the concurrently executed task number which is the number of tasks concurrently executed in each of the thread arrays, on the basis of at least one of task information related to the tasks and processing unit configuration information related to the configuration of the processing unit;
an intra-array thread number setting step of setting the intra-array thread number on the basis of the number of threads to be necessary for each of the tasks and the concurrently executed task number;
a total array number setting step of setting a total array number which is the total number of the thread arrays on the basis of the total number of threads necessary for processing the application and the intra array thread number; and
a program modification step of modifying, of the computer program: the step of generating the threads and the thread arrays into a step of performing the generation on the basis of the intra-array thread number and the total array number, the step of securing and allocating resources in the thread arrays into a step of securing and allocating resources necessary for executing the same number of tasks as the concurrently executed task number, the step of determining a task to be processed by each of the threads into a step of performing the determination such that the task is determined to be any one of the same number of tasks as the concurrently executed task number executed in the thread array, and the step of causing the thread to execute the task into a step of also causing the thread to use resources allocated to the task in executing the task.

18. A parallel processing device including, a hardware processing unit having a plurality of processor cores, performing parallel processing of a group of thread arrays each being a group of threads each representing a process unit enabling parallel processing, the parallel processing device comprising:

divided task acquisition means which acquires information presenting each of tasks into which the process of an application to be processed is divided in a manner to enable parallel processing;

concurrently executed task number setting means which sets a concurrently executed task number which is the number of tasks concurrently executed in each of the thread arrays;

intra-array thread number setting means which sets an intra-array thread number which is the number of threads within each of the thread arrays, on the basis of the number of threads able to be processed further in parallel in each of the tasks and the concurrently executed task number;

total array number setting means which sets a total array number which is the total number of the thread arrays, on the basis of the total number of threads necessary for processing the application and the intraarray thread number;

thread array control means which generates the threads and the thread arrays on the basis of the intra-array thread number and the total array number, and controls the processing unit to execute in parallel the process of each of the thread arrays;

resource allocation means which, in each of the thread arrays, secures resources necessary for processing the same number of tasks as the concurrently executed task number, and allocates the secured resources to each of the tasks;

processing task determination means which determines a task to be processed by each thread within each of the thread arrays; and task execution means which executes the same number of tasks as the concurrently executed task number in each of the thread arrays, by causing each of the threads in the thread array to execute the task determined by the processing task determination means using the resources allocated by the resource allocation means.

* * * * *